US012672940B2

(12) United States Patent
Cinader et al.

(10) Patent No.: US 12,672,940 B2
(45) Date of Patent: Jul. 7, 2026

(54) TRANSFER APPARATUS FOR ORTHODONTIC APPLIANCES AND RELATED METHODS OF MANUFACTURING

(71) Applicant: Solventum Intellectual Properties Company, Maplewood, MN (US)

(72) Inventors: David K. Cinader, Woodbury, MN (US); Rainer Dittmann, Munich (DE); Michael K Domroese, Woodbury, MN (US); Thomas K. Mueller, Gauting (DE); Dietmar Blees, Loehne (DE); Özcan Dönmez, Kirchdorf/Bad Woerishofen (DE); Daniel D. Oberpertinger, Herrsching (DE); Ralf M. Paehl, Melle (DE); Shane C. Pedersen, St. Paul, MN (US); Nicholas A Stark, Woodbury, MN (US); Michaela Urban, Seefeld (DE)

(73) Assignee: Solventum Intellectual Properties Company, Eagan, MN (US)

( * ) Notice: Subject to any disclaimer, the term of this patent is extended or adjusted under 35 U.S.C. 154(b) by 58 days.

(21) Appl. No.: 18/601,953

(22) Filed: Mar. 11, 2024

(65) Prior Publication Data

US 2024/0238069 A1 Jul. 18, 2024

Related U.S. Application Data

(63) Continuation-in-part of application No. PCT/IB2023/058931, filed on Sep. 8, 2023.

(Continued)

(51) Int. Cl.
*A61C 7/14* (2006.01)

(52) U.S. Cl.
CPC .................................... *A61C 7/146* (2013.01)

(58) Field of Classification Search
CPC .............. A61C 7/146; A61C 7/12; A61C 7/14
See application file for complete search history.

(56) References Cited

U.S. PATENT DOCUMENTS 4,134,208 A 1/1979 Pearlman
4,978,007 A 12/1990 Jacobs et al.
(Continued)

FOREIGN PATENT DOCUMENTS

CA 2932100 A1 7/2023
CN 112386348 A 2/2021
(Continued)

OTHER PUBLICATIONS

International Search Report for PCT/IB2023/058931 mailed on Jan. 10, 2024, 6 pages.

*Primary Examiner* — Ralph A Lewis

(57) ABSTRACT

A method of making a transfer apparatus includes providing a physical mockup having a shape that corresponds to a positive shape of a patient's dental arch and one or more carrier assemblies that each include a crane body releasably connected to an orthodontic appliance. A transfer apparatus may be formed over the physical mockup, with the transfer tray representing a negative replica of at least a portion of the mockup. The transfer apparatus may be used to seat the appliance on a patient's dental arch, after which point the appliance can be separated from the crane body and bonded to the associated tooth.

20 Claims, 28 Drawing Sheets

Related U.S. Application Data

(60) Provisional application No. 63/405,037, filed on Sep. 9, 2022.

(56) References Cited

U.S. PATENT DOCUMENTS

| | | | |
|---|---|---|---|
| 5,015,180 A | 5/1991 | Randklev | |
| 5,429,229 A | 7/1995 | Chester et al. | |
| 5,569,691 A | 10/1996 | Guggenberger et al. | |
| 6,123,544 A * | 9/2000 | Cleary | A61C 7/146 433/74 |
| 6,127,449 A | 10/2000 | Bissinger et al. | |
| 6,183,249 B1 | 2/2001 | Brennan et al. | |
| 6,648,638 B2 | 11/2003 | Castro et al. | |
| 6,677,393 B1 | 1/2004 | Zech et al. | |
| 6,739,869 B1 | 5/2004 | Taub et al. | |
| 6,739,870 B2 | 5/2004 | Lai et al. | |
| 7,134,874 B2 | 11/2006 | Chishti et al. | |
| 7,210,929 B2 | 5/2007 | Raby et al. | |
| 7,291,011 B2 | 11/2007 | Stark et al. | |
| 7,354,268 B2 | 4/2008 | Raby et al. | |
| 7,435,083 B2 | 10/2008 | Chishti et al. | |
| 7,726,968 B2 | 6/2010 | Raby et al. | |
| 7,762,815 B2 | 7/2010 | Cinader et al. | |
| 7,869,983 B2 | 1/2011 | Raby et al. | |
| 7,940,258 B2 | 5/2011 | Stark et al. | |
| 8,007,579 B2 | 8/2011 | Klettke et al. | |
| 8,194,067 B2 | 6/2012 | Raby et al. | |
| 8,517,727 B2 | 8/2013 | Raby et al. | |
| 9,205,601 B2 | 12/2015 | DeSimone et al. | |
| 9,259,295 B2 | 2/2016 | Christoff et al. | |
| 9,360,757 B2 | 6/2016 | DeSimone et al. | |
| 9,480,540 B2 | 11/2016 | Cinader et al. | |
| 9,622,835 B2 | 4/2017 | See et al. | |
| 10,136,965 B2 | 11/2018 | Wiechmann | |
| 10,368,961 B2 | 8/2019 | Paehl et al. | |
| 10,383,706 B2 | 8/2019 | Portalupi | |
| 2005/0277084 A1 | 12/2005 | Cinader et al. | |
| 2007/0031775 A1 * | 2/2007 | Andreiko | A61C 7/146 433/24 |
| 2008/0286710 A1 | 11/2008 | Cinader et al. | |
| 2009/0286196 A1 | 11/2009 | Wen et al. | |
| 2010/0190125 A1 * | 7/2010 | Lee | A61C 7/146 700/118 |
| 2010/0260405 A1 | 10/2010 | Cinader | |
| 2014/0255864 A1 * | 9/2014 | Machata | A61C 7/146 433/3 |
| 2016/0074139 A1 * | 3/2016 | Machata | A61C 7/146 433/3 |
| 2017/0319296 A1 | 11/2017 | Webber et al. | |
| 2017/0325911 A1 * | 11/2017 | Marshall | A61C 7/146 |
| 2018/0071057 A1 * | 3/2018 | Rudman | A61C 7/34 |
| 2018/0271622 A1 | 9/2018 | Kopelman | |
| 2018/0303583 A1 | 10/2018 | Tong et al. | |
| 2019/0046297 A1 | 2/2019 | Kopelman et al. | |
| 2019/0298494 A1 | 10/2019 | Webber et al. | |
| 2019/0328493 A1 | 10/2019 | Griffin et al. | |
| 2020/0015938 A1 | 1/2020 | Owen | |
| 2020/0146779 A1 * | 5/2020 | Zhang | A61C 7/146 |
| 2020/0275996 A1 | 9/2020 | Tong et al. | |
| 2020/0345459 A1 * | 11/2020 | Schueller | A61C 7/146 |
| 2021/0178639 A1 | 6/2021 | Lukacs et al. | |
| 2021/0228317 A1 | 7/2021 | Ciriello et al. | |
| 2021/0259812 A1 * | 8/2021 | O'Leary | A61C 7/002 |
| 2022/0039917 A1 | 2/2022 | Winchell et al. | |
| 2022/0233277 A1 | 7/2022 | Erskine-Smith | |
| 2022/0265399 A1 | 8/2022 | Calle Bonet | |
| 2023/0026846 A1 * | 1/2023 | Hansen | B05D 5/10 |
| 2023/0042808 A1 * | 2/2023 | Hansen | A61C 7/146 |
| 2024/0238069 A1 * | 7/2024 | Cinader | B33Y 70/00 |

FOREIGN PATENT DOCUMENTS

| | | | |
|---|---|---|---|
| CN | 113425428 B | 9/2022 | |
| DE | 102020114956 A1 | 12/2021 | |
| DE | 102013203888 B4 | 7/2022 | |
| EP | 1512724 B1 | 4/2007 | |
| EP | 2072029 B1 | 10/2012 | |
| EP | 2827794 B1 | 6/2016 | |
| EP | 3193773 B1 | 12/2020 | |
| EP | 3638189 B1 | 8/2021 | |
| EP | 3868328 B1 | 9/2023 | |
| IN | 202041057144 A | 1/2021 | |
| WO | 2014078537 A1 | 5/2014 | |
| WO | 2016191162 A1 | 12/2016 | |
| WO | 2016191534 A1 | 12/2016 | |
| WO | 2018222395 A1 | 12/2018 | |
| WO | 2018231583 A1 | 12/2018 | |
| WO | 2019048963 A1 | 3/2019 | |
| WO | 2020104873 A1 | 5/2020 | |
| WO | 2020157598 A1 | 8/2020 | |
| WO | 2021130624 A1 | 7/2021 | |
| WO | 2021245480 A1 | 12/2021 | |
| WO | 2021245484 A1 | 12/2021 | |
| WO | 202219870 A1 | 1/2022 | |
| WO | 2022161078 A1 | 8/2022 | |
| WO | 2024018305 A1 | 1/2024 | |

* cited by examiner

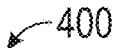

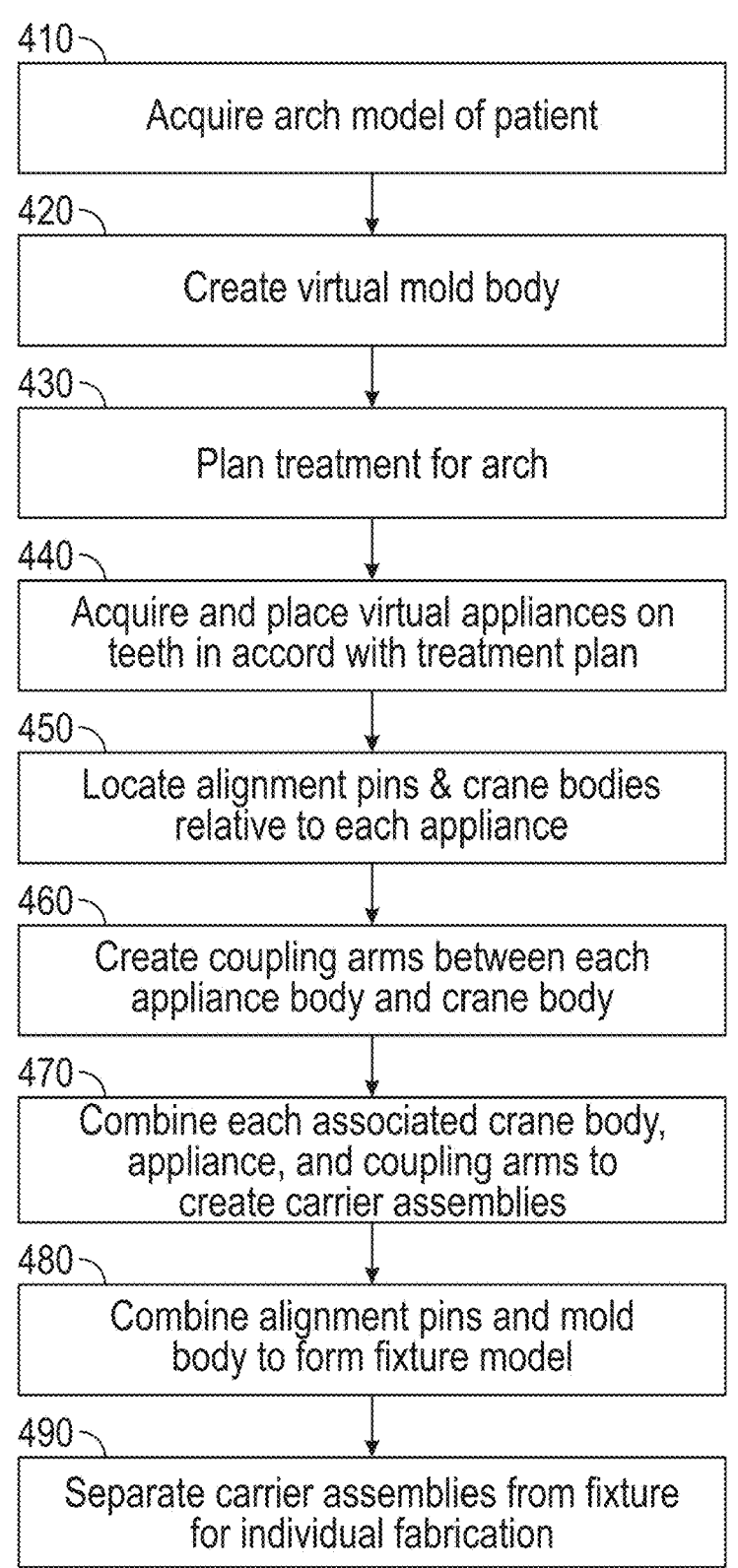

410 — Acquire arch model of patient

420 — Create virtual mold body

430 — Plan treatment for arch

440 — Acquire and place virtual appliances on teeth in accord with treatment plan 450 — Locate alignment pins & crane bodies relative to each appliance 460 — Create coupling arms between each appliance body and crane body 470 — Combine each associated crane body, appliance, and coupling arms to create carrier assemblies 480 — Combine alignment pins and mold body to form fixture model 490 — Separate carrier assemblies from fixture for individual fabrication

FIG. 13

TRANSFER APPARATUS FOR ORTHODONTIC APPLIANCES AND RELATED METHODS OF MANUFACTURING

BACKGROUND

Orthodontic appliances are used in orthodontic treatments for moving one or more teeth from an initial position (sometimes referred to as malposition or malocclusion) to a desired position in a patient's dentition. For example, the patient's teeth may be moved such that their labial sides are aligned with each other to achieve or maximize an aesthetically pleasant appearance of the overall dentition. Further in some cases one or more teeth may be moved to correct a malocclusion. The movement of teeth is typically achieved in traditional orthodontic braces by a pre-biased archwire which is attached via brackets to the teeth, and which applies a force to the teeth toward the desired position over a longer period. The ends of orthodontic archwires are often connected to small appliances known as buccal tubes that are, in turn, secured to the patient's molar teeth. In many instances, a set of brackets, buccal tubes and an archwire is provided for each of the upper and lower dental arches.

Orthodontic treatment may also involve the use of alignment trays, such as clear or transparent, polymer-based tooth positioning trays, often referred to as clear tray aligners (CTAs). For example, orthodontic treatment with CTAs may include forming a tray having shells that engage one or more teeth. Each shell may be deformed from an initial position of a tooth, e.g., a malocclusion position. The deformed position of a respective shell of the CTA may apply a force to a respective tooth toward a desired position of the tooth that is an intermediate position between the initial position and a final position resulting from the orthodontic treatment.

In some examples, small attachments may be bonded to the teeth to improve force application or achieve desired tooth movements. In many types of orthodontic techniques, the precise position of the appliances, be they attachments or brackets, on the teeth is an important factor for helping to ensure that the teeth move to their intended final positions. Proper placement of attachments may ensure proper engagement and interaction of the attachment with one or more CTAs. The design of the attachment may provide a desired physical leverage which creates a desired force on a tooth to produce a specific movement of the tooth during treatment. Attachments are typically constructed of varying materials, shapes and sizes, and can be bonded to the labial or lingual surfaces of teeth in order to interact with CTAs and removable appliances in a variety of different ways. Attachments can be applied to a patient's teeth prior to treatment with aligners. Attachments may also be fabricated prior to attachment to the tooth surface. Attachments may also be substantially assembled at the orthodontic practitioner's office prior to, or in conjunction with, positioning on the patient's tooth (e.g., molded composites, etc.).

Generally, bondable orthodontic appliances may be attached to the teeth by a direct bonding procedure or an indirect bonding procedure. In the direct bonding procedure, the appliance is commonly grasped with a pair of tweezers or other hand instrument and placed by the practitioner on the surface of the tooth in its desired location, using a quantity of adhesive to fix the appliance to the tooth. In the indirect bonding procedure, a transfer tray is constructed with wall sections having a shape that matches the configuration of at least part of the patient's dental arch, and appliances such as orthodontic attachments are releasably connected to the tray at certain, predetermined locations.

After an adhesive is applied to the base of each appliance (or the tooth), the tray is placed over the patient's teeth and remains in place until the adhesive has hardened. The tray is then detached from the teeth as well as from the appliances such that the appliances previously connected to the tray are bonded to the respective teeth at their intended, predetermined locations.

Indirect bonding techniques offer several advantages over direct bonding techniques. For example, it is possible with indirect bonding techniques to bond a plurality of appliances to a patient's dental arch simultaneously, thereby avoiding the need to bond each appliance in individual fashion. Additionally, or alternatively, the transfer tray may improve accuracy of attachment placement. The increased placement accuracy of the appliances that is often afforded by indirect bonding procedures helps ensure that the patient's teeth are moved to their proper, intended positions at the conclusion of treatment.

Due to their small size and shape, appliances, and attachments in particular, may be difficult to manipulate for placement in a transfer tray. Furthermore, when a transfer tray is seated on a patient's teeth, the close proximity of the tray to the teeth can induce capillary force on the adhesive placed on the appliance base and/or the tooth. Such capillary action is likely to transport at least a portion of the adhesive composition away from the appliance bonding location, leading to a reduction in initial bonding success or, even if successfully bonded, adequate bond strength between the appliance and the tooth.

SUMMARY OF THE INVENTION

Prior methods of bonding attachments to teeth commonly relied on either the placement of preformed attachments in an indirect bonding tray or the creation of an attachment directly on the tooth surface. Both methods introduced various errors in the bonding process, appliance fidelity, and treatment effectiveness. Attachments are typically difficult to handle when preformed given their relatively small dimensions, leading to difficulties placing in a tray or directly on teeth. Failures to properly place lead to misdirected forces and suboptimal engagement with the associated CTA. Attempts to create transfer apparatuses along with attachments result in difficult geometries for additive manufacturing and challenges of excess customization that can slow commercial operations. Forming an appliance on the surface of the tooth is fraught with its own challenges, typically centered on the difficulty of ensuring an adequate bond to the tooth surface and sufficient material strength in the formed attachment body. The present inventors sought to solve these and other problems by providing a preformed appliance that could be formed with a transfer apparatus.

In one aspect, the present disclosure provides a physical mockup for creating a transfer apparatus. The mockup comprises a representation of at least a portion of a dental arch, the dental arch including a plurality of teeth, each tooth including an occlusal surface, a lingual surface, and a labial surface; wherein one or more teeth include an alignment pin projecting upward from the occlusal surface. A carrier assembly can be received on each alignment pin to aid in locating an appliance on a tooth surface. The carrier can comprise a crane including a crane body having a tooth-facing surface, the facing surface configured to not contact an occlusal surface of the tooth when the transfer body is installed on the dental arch, the orthodontic appliance, the appliance including a base for bonding the appliance to the tooth and a body including a perimeter; one or more coupling arms configured to connect the crane to the appliance, wherein the coupling arms are frangible between the crane and the appliance.

In another aspect, the present disclosure provides a method for creating a transfer tray for one or more orthodontic appliances. The method comprises providing a physical mockup comprising: a representation of at least a portion of a dental arch, the dental arch including a plurality of teeth, each tooth including an occlusal surface, a lingual surface, and a labial surface; wherein one or more teeth include an alignment pin projecting upward from the occlusal surface. The method proceeds to installing, for each tooth including an alignment pin, an appliance carrier on the alignment pin. The carrier comprises a crane including a crane body having a tooth-facing surface, the facing surface configured to not contact an occlusal surface of the tooth when the transfer body is installed on the dental arch, the orthodontic appliance, the appliance including a base for bonding the appliance to the tooth and a body including a perimeter; one or more coupling arms configured to connect the crane to the appliance, wherein the coupling arms are frangible between the crane and the appliance. Once the carrier assemblies are positioned, the method proceeds to forming a tray over the mockup and the carrier.

In another aspect, the present disclosure provides a system for indirect bonding of orthodontic appliances. The system comprises a transfer body defining a shell configured to receive an outer surface of a tooth of a dental arch and including an interior surface substantially conforming to the contour of at least one tooth of the dental arch, wherein the transfer body defines at least one recess within the shell; and an orthodontic appliance carrier arranged relative to the occlusal surface of the tooth. The carrier comprises a crane including a crane body having a tooth-facing surface, the facing surface configured to not contact an occlusal surface of the tooth when the transfer body is installed on the dental arch, the orthodontic appliance, the appliance including a base for bonding the appliance to the tooth and a body including a perimeter; one or more coupling arms configured to connect the crane to the appliance, wherein the coupling arms are frangible between the crane and the appliance.

In yet another aspect, the present disclosure provides a carrier for use in bonding an orthodontic appliance to a patient's tooth. The carrier comprises a crane including a crane body having a tooth-facing surface, the facing surface configured to not contact an occlusal surface of the tooth when the crane is installed on the dental arch, the orthodontic appliance, the appliance including a base for bonding the appliance to the tooth and a body including a perimeter; one or more coupling arms configured to connect the crane to the appliance, wherein the coupling arms are frangible between the crane and the appliance.

For the purpose of this specification, the term "virtual" refers to a three-dimensional computer representation of an object, preferably based on a mathematical representation of a three-dimensional shape in data form and processable by a computer. Such virtual objects in the form of data including their visualizations (for example wire frames or digital renderings) are widely known in the field of Computer Aided Design (CAD).

For the purpose of the present specification the term "set of" refers to a "plurality of".

As used herein, "orthodontic appliance" includes orthodontic brackets, orthodontic attachments, buccal tubes, orthodontic bands, buttons, and cleats, in particular orthodontic brackets and orthodontic attachments.

As used herein, "hardenable" is descriptive of a material or composition that can be cured (e.g., polymerized or crosslinked) or at least partially solidified, for example, by removing solvent (e.g., by evaporation and/or heating); heating to induce polymerization and/or crosslinking; irradiating to induce polymerization and/or crosslinking; and/or by mixing one or more components to induce polymerization and/or crosslinking. As used herein, "hardened" refers to a material or composition that has been cured (e.g., polymerized or crosslinked) or solidified.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The terms "substantially" and "essentially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

As used herein, "anterior teeth" includes the central incisors, lateral incisors, canines, and first bicuspids.

As used herein, "posterior teeth" includes the second bicuspid, the first molar, the second molar, and the third molar (if patient still retains wisdom teeth).

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

"Mesial" means in a direction toward the center of the patient's curved dental arch.

"Distal" means in a direction away from the center of the patient's curved dental arch.

"Occlusal" means in a direction toward the outer tips of the patient's teeth and is inclusive of "incisal".

"Gingival" means in a direction toward the patient's gums or gingiva.

"Facial" means in a direction toward the patient's cheeks or lips.

"Lingual" means in a direction toward the patient's tongue.

In several places throughout the application, guidance is provided through lists of examples, which examples can be used in various combinations. In each instance, the recited list serves only as a representative group and should not be interpreted as an exhaustive list.

BRIEF DESCRIPTION OF THE FIGURES

FIG. 13 is a workflow for creating a virtual mockup to aid in the creation of the physical mockup of FIGS. 1 and 2;

While the above-identified figures set forth several embodiments of the disclosure, other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION OF THE ILLUSTRATIVE EMBODIMENTS

Figure 1:
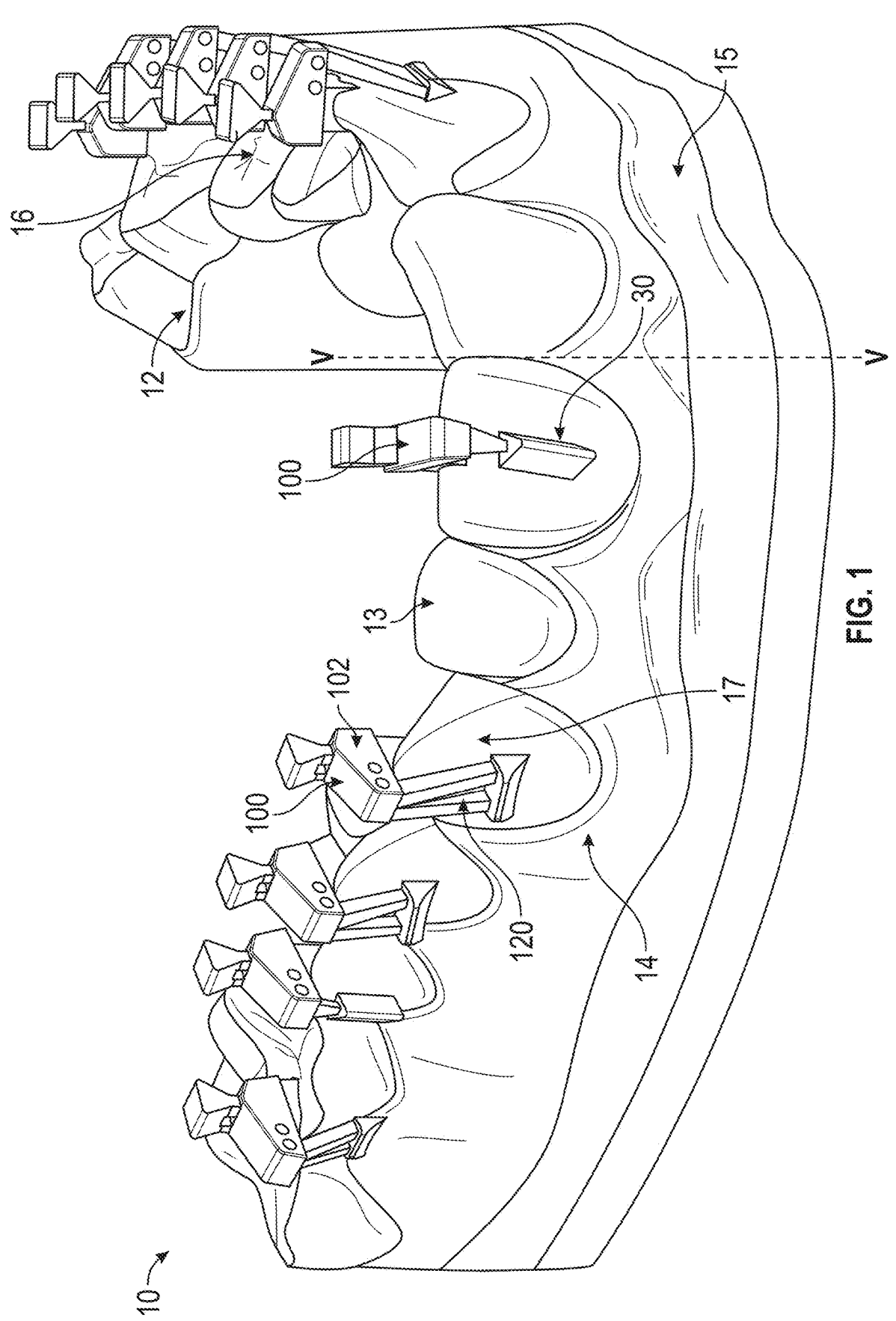
FIG. 1 is a perspective view of a physical mockup having a set of carrier assemblies for orthodontic appliances according to embodiments of the disclosure.
Figure 2:
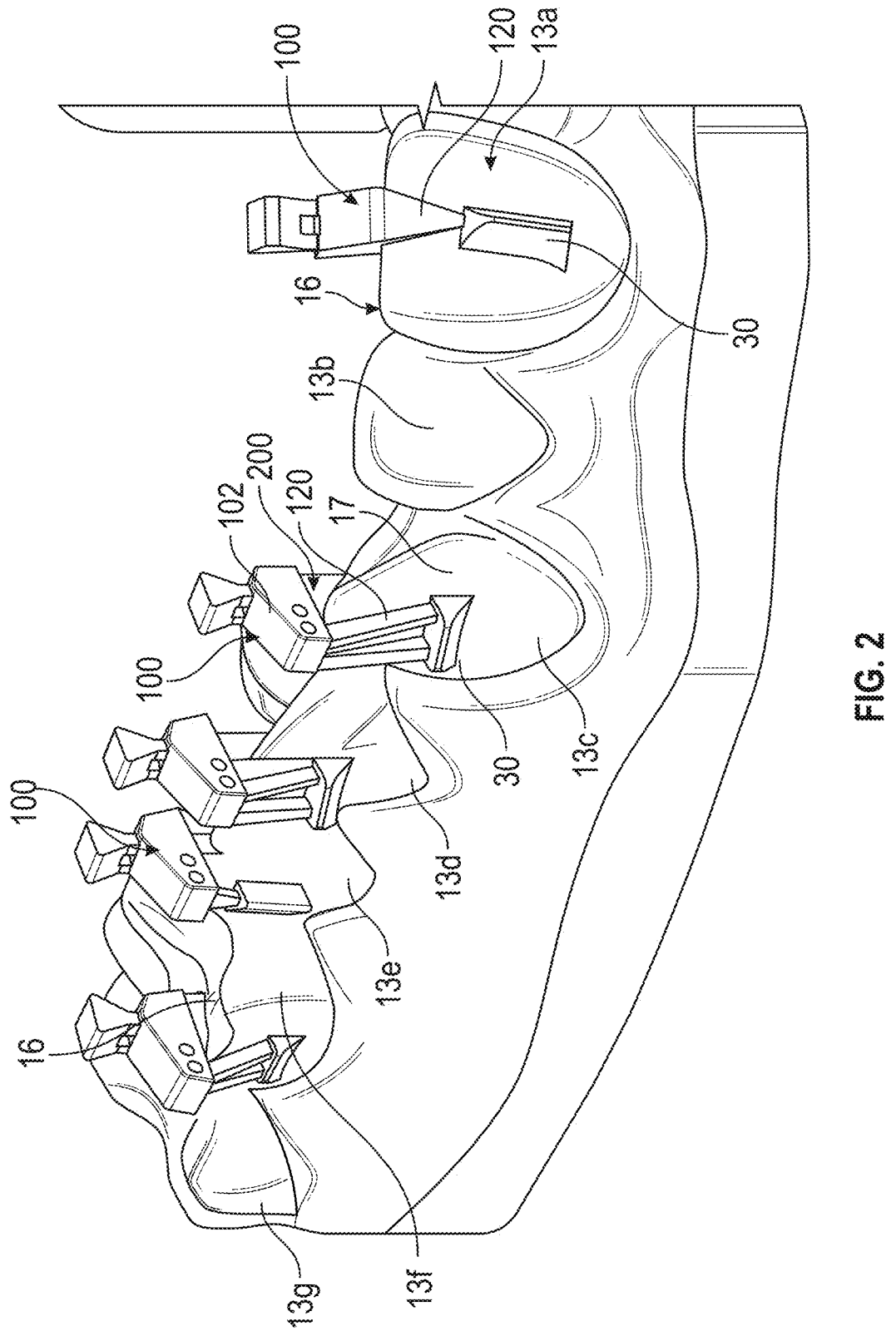
FIG. 2 is a perspective view of the physical mockup of FIG. 1, enlarged to depict half of the dental arch.

FIGS. 1 and 2 show a physical mockup 10 representing the positive shape of a patient's dental arch 12 including a plurality of teeth 13 and gingiva 14. The physical mockup 10 may be used for physically shaping a transfer apparatus (not shown in FIG. 1 or 2) for bonding orthodontic appliances at predetermined locations on a patient's teeth. The transfer apparatus forms a negative replica of at least part of the physical mockup 10. Such a transfer apparatus (see e.g., FIG. 24) may for example be obtained from taking an impression from the physical mockup 10, from overmolding the physical mockup 10 or from any other technique in which the positive physical model 10 is used for, preferably directly, shaping a negative replica.

The transfer apparatus so created from the mockups of the present disclosure may be used to bond orthodontic appliances at prescribed positions and orientations on a patient's dental arch. As used herein, "position" refers to the locating of the appliance at a particular point on the surface of a tooth and "orientation" is the location of appliance relative to an axis or plane of the mockup or the dental arch. An appliance can have a change in orientation that does not change its position on the surface of the tooth. For example, an appliance can be positioned at a particular point on the surface of a tooth and then can be oriented by rotating it, for example, about an axis perpendicular to the surface of the tooth.

While the mockups of the present disclosure can be used to create transfer apparatuses for multiple orthodontic appliances (brackets, anchors, buttons, etc.), the appliances 30 depicted in FIG. 1 have the shape and function of orthodontic attachments for CTAs. As depicted in greater detail in FIGS. 3A and 3B, the appliance 30 includes an appliance body 31 ("body 31") that is configured to be bonded to the teeth to improve force application by a CTA to achieve desired tooth movements. Body 31 may have any suitable shape, such as a custom-formed shape that is unique to a particular application, patient, tooth, and/or region of a tooth. Body 31 may be sized such that body 31 is difficult to manipulate, e.g., using a tool such as tweezers. For example, body 31 may have a maximum dimension of 30 millimeters (mm) or less and a minimum dimension of 0.25 mm or greater. For typical orthodontic attachments, the body 31 may have a maximum dimension of 15 mm or less.

Figure 3A:
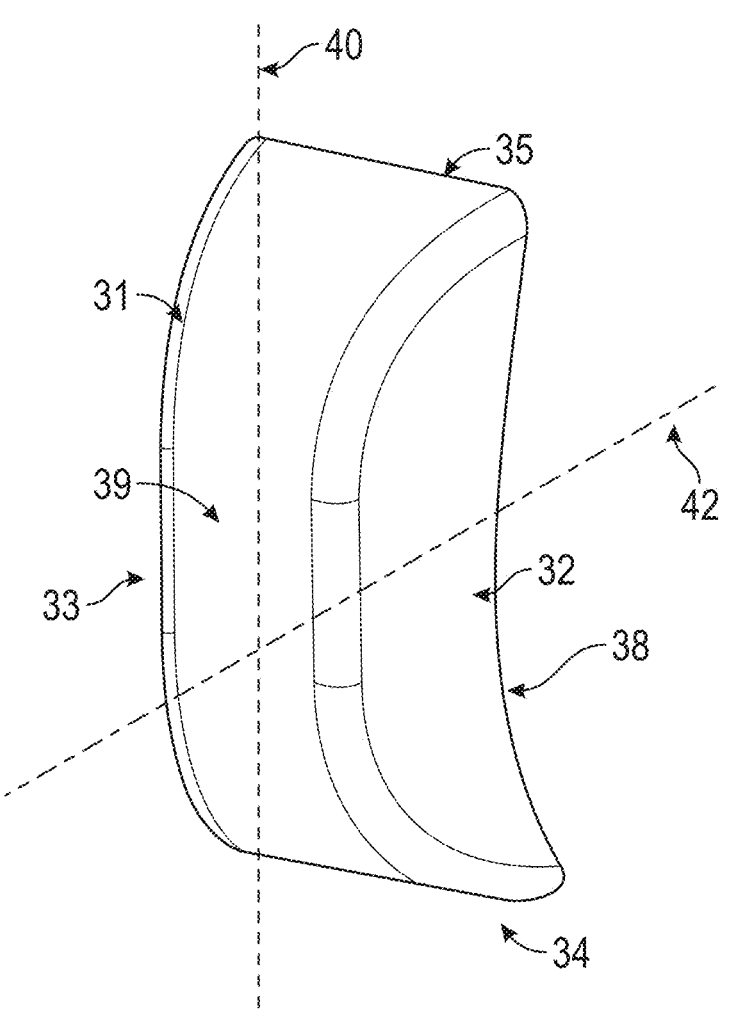
FIG. 3A is a perspective view of an orthodontic appliance in the form of an attachment according to embodiments of the disclosure.
Figure 3B:
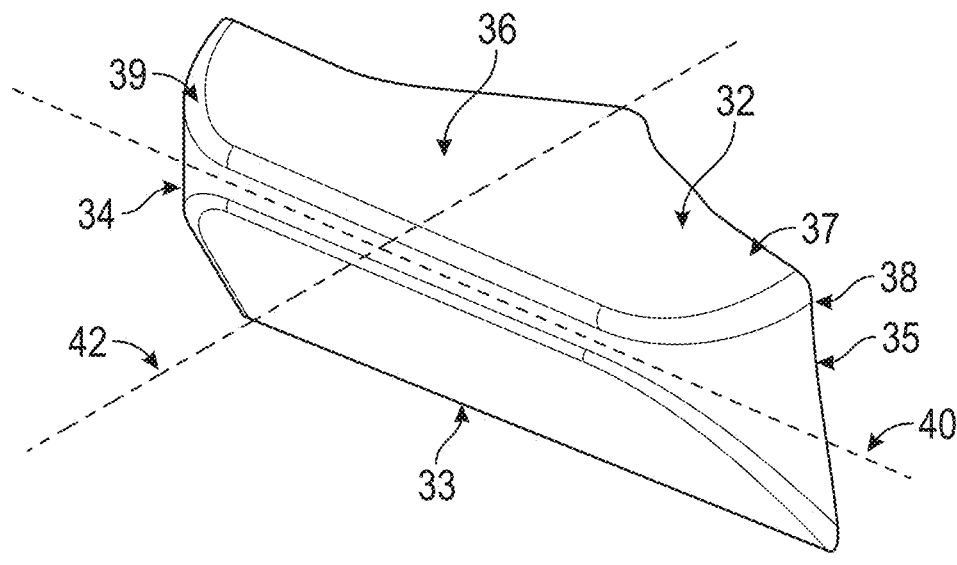
FIG. 3B is a perspective view of another orthodontic appliance in the form of an attachment according to embodiments of the disclosure.

As depicted in FIGS. 3A and 3B, the body 31 has a generally rectangular shape and includes opposing long edges 32, 33. The long edges 32, 33 are joined by short edges 34, 35. Any one of edges 32, 33, 34, 35 may be concave, convex, linear, or combinations thereof. The long edges 32, 33 each can optionally include a concave middle section with generally linear sections proximate the short edges 34, 35. The short edges 34, 35 themselves are generally linear, though this is not required.

A bonding surface 38 of body 31 may be shaped to correspond to a contour of a portion of a tooth of a patient. In one or more embodiments, the bonding surface 38 of one or more appliances 30 can include any suitably shaped surface that is not necessarily customized to fit a particular surface of a tooth, i.e., a "generic" base. The bonding surface 38 may include compound curvature corresponding to the expected or average convex curvature of a particular tooth of the dental arch. Corresponding to the contour of the tooth may improve strength of an adhesive bond between body 31 and the tooth, reduce an amount of adhesive required for the bond, or both. For example, the bonding surface 38 can be shaped to bond at the facial axis of the clinical crown ("FACC") of a particular tooth of a particular dental arch. The FACC is defined as the curved line formed by the intersection of the mid-sagittal plane and the facial surface of a given tooth. In some examples, bonding surface 38 may include etched, sandblasted, and/or embossed patterns intended to facilitate more secure bonding.

The bonding surface 38 can have a tooth facing surface contour that is customized to fit any suitable surface of a tooth. For example, in one or more embodiments, the bonding surface 38 has a tooth-facing surface contour that is customized to fit a labial surface of a given tooth. Having a customized bonding surface 38 can allow the appliance 30 to be configured with a lower profile for patient comfort. Any suitable technique or combination of techniques can be utilized to form customized bondable surfaces, e.g., the techniques described in U.S. Pat. No. 10,136,965 (Wiechmann, et al.), and U.S. Patent Publication No. 2005/0277084 (Cinader, Jr., et al.) and including, for example, the Boolean subtraction of a virtual tooth from a virtual appliance bonding surface in CAD or other software.

The body 31 may include any suitable shape that is configured to transfer a force from a CTA to the tooth, retain the CTA on the tooth, or both. For example, one or more portions of body 31 may be hemispherical, rectilinear, curvilinear, or irregular in shape. In some examples, any surface of the body 31 may include one or more surface features, including, but not limited to, one or more tapers, undercuts, overhangs, recesses, negative drafts, or other features configured to engage or otherwise interact with a CTA or a transfer tray. As illustrated in FIG. 3B, body 31 may define a beveled buccal/lingual facing surface 39. In some examples, a beveled body 31 may improve release of body 31 from a transfer tray after bonding to a tooth and/or improve transfer of force from a CTA to the tooth by concentrating contact of the CTA with body 31 at the apex of the bevel or provide a lead-in for engagement with there is a mismatch in position between a CTA and tooth.

The appliance 30 includes a long axis 40 (i.e., longitudinal axis), as well as a central axis 42 normal to the long axis 40 and extending through the both the bonding surface 38 and the facing surface 39. The axes 40, 42 extend through the approximate center of the appliance, which may be both the mesial-distal and occlusal-gingival center, though the precise identity will depend on appliance 30 orientation on the bonding surface. The long axis 40 extends between the short edges 34, 35. Both of the long axis 40 and central axis 42 can, in certain embodiments, be useful for locating the appliance 30 at the desired position and orientation on the tooth, as well as dictating certain aspects of the physical mockup 10, as further explored below.

Returning to FIGS. 1 and 2, the mockup 10 includes a support body (i.e., mold body) 15 extending below the gingiva 14 to provide stability for improved ease of mockup creation and subsequent transfer apparatus manufacturing. The bottom of the mold body is typically substantially planar, creating a base plane "B". The mockup further includes a vertical axis "V" that is perpendicular to the occlusal plane of the dental arch, which can be determined using techniques known in the art and further describe below. The vertical axis V can be normal to the base plane B in some locations along the arch 12, but this is not typical or necessary.

In the physical mockup 10 the patient's teeth 13 are represented in the malocclusion at the beginning of either treatment or a new stage of treatment. The exemplary mockup 10 shown in the drawings is representative of the patient's upper dental arch, although it should be understood the methods and systems of the present disclosure are equally suitable for the patient's lower dental arch. The entire, upper dental arch 12 is depicted in FIG. 1, while half the arch is depicted in FIG. 2 for descriptive clarity. Referring to the half arch of FIG. 2, the teeth 13 of the mockup 10 include an upper central 13a, upper lateral 13b, upper cuspid 13c, upper first bicuspid 13d, upper second bicuspid 13e, upper first molar 13f, and upper second molar 13g. Alternatively, the physical mockup may include the entire dental arch (FIG. 1) or a lesser portion thereof (for example, an arch quadrant or a single tooth, not shown) depending on the number of appliances intended to be bonded to the teeth during a given bonding procedure.

An orthodontic appliance carrier assembly 100 is located adjacent the occlusal surface 16 of each tooth 13 to which an orthodontic appliance 30 is to be bonded. Each carrier 100 is configured to locate the associated appliance 30 proximate the mockup tooth surface (here labial tooth surface 17) at the prescribed or otherwise intended bonding position and orientation. Each carrier 100 is connected to the associated appliance 30 via one or more coupling arms 120 that project from a crane body 102 of the carrier 100 in a generally gingival direction. Also as depicted, each tooth 13 of the dental arch 12 receives an appliance 30 except the second molars, an upper central and an upper bonded to all of the teeth 13 in the dental arch 12 or may be attached to only certain selected teeth as may be desired by the practitioner or otherwise prescribed according to an orthodontic treatment plan. Each appliance 30 on physical mockup 10 has been correctly positioned on the appliance bonding surface 17 of tooth 13 and oriented such that it can provide the desired force to the teeth of the patient when combined with another dental appliance (e.g., CTA) or appliance component (e.g., archwire or polymer band).

The mockup 10 of this embodiment and the appliances of other embodiments, unless otherwise indicated, are described herein using a reference frame attached to a labial surface of a tooth on the upper jaw. Consequently, terms such as labial, lingual, mesial, distal, occlusal, and gingival used to describe the mockup 10, carrier assembly 100, and appliance 30 are relative to the chosen reference frame. The embodiments, however, are not limited to the chosen reference frame and descriptive terms, as the appliance 30 may be used on other tooth surfaces and in other orientations within the oral cavity. For example, the carrier assembly may be disposed to locate appliances proximate to the lingual surface of the tooth or locate appliances on both the lingual and labial tooth surface. Those of ordinary skill in the art will recognize that the descriptive terms used herein may not directly apply when there is a change in reference frame. Nevertheless, the embodiments are intended to be independent of absolute location and orientation within the oral cavity and the relative terms used to describe embodiments are merely provide a clear description of the embodiments in the drawings. For the remainder of the application, the appliance bonding surface is inclusive of the labial, lingual, and occlusal (for e.g., bite stops) surfaces, but is depicted as the labial surface.

In presently preferred embodiments, the crane body 102 does not contact or include a surface having the contour of the associated occlusal tooth surface 16. Instead, each carrier assembly 100 is releasably associated with (i.e., received on or in) an alignment pin 200 (visible on upper cuspid 13c and depicted in more detail in FIG. 4-6) that includes geometry and/or mating features to aid in arresting travel of the crane body 102 prior to occlusal surface 16 contact. In this way and by obviating the need for intimate occlusal contact, aspects of the carrier assembly 100 and alignment pin 200, further explored below, can be standardized to improve manufacturing efficiency and bonding precision when the mockups of the present disclosure are used to create a transfer apparatus (e.g., a tray).

Figure 4:
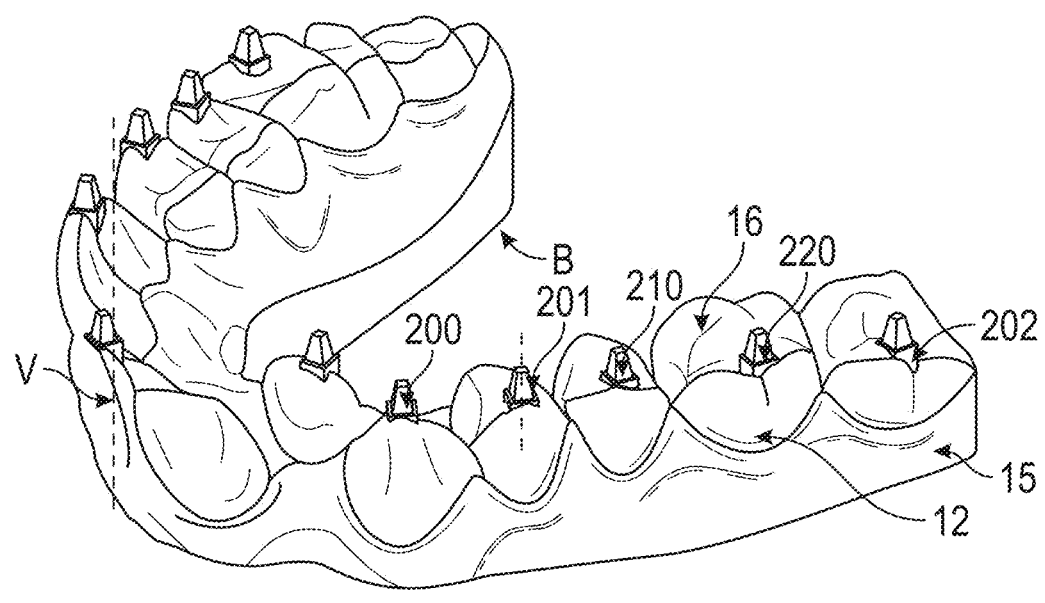
FIG. 4 is an perspective view of a fixture model including a mold body and alignment pins according to embodiments of the disclosure.
Figure 5:
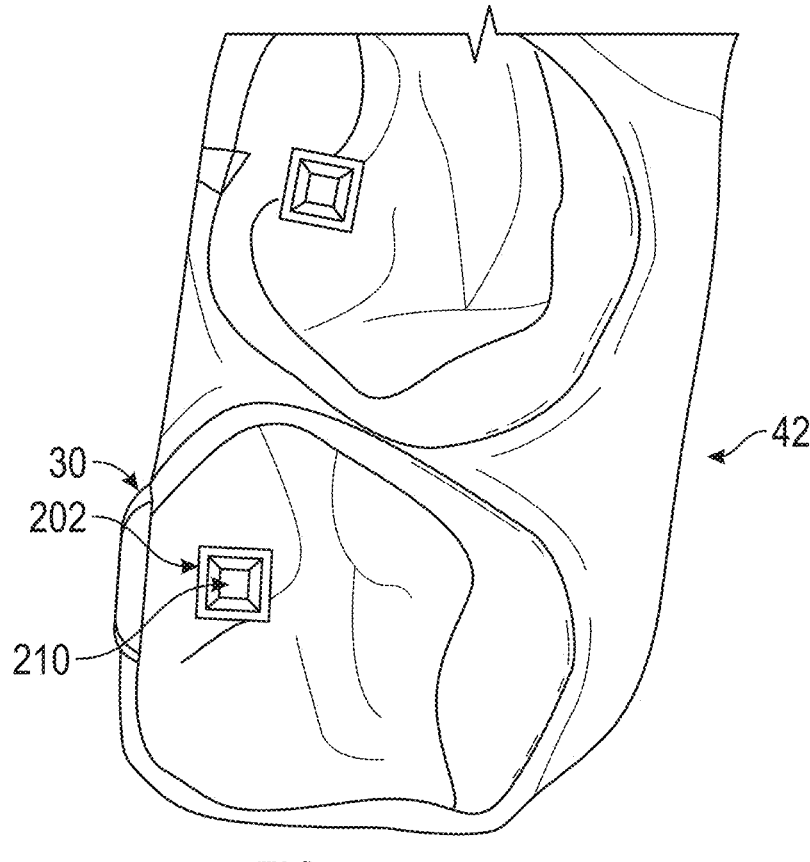
FIG. 5 is an occlusal view of the fixture model of FIG. 4.
Figure 6:
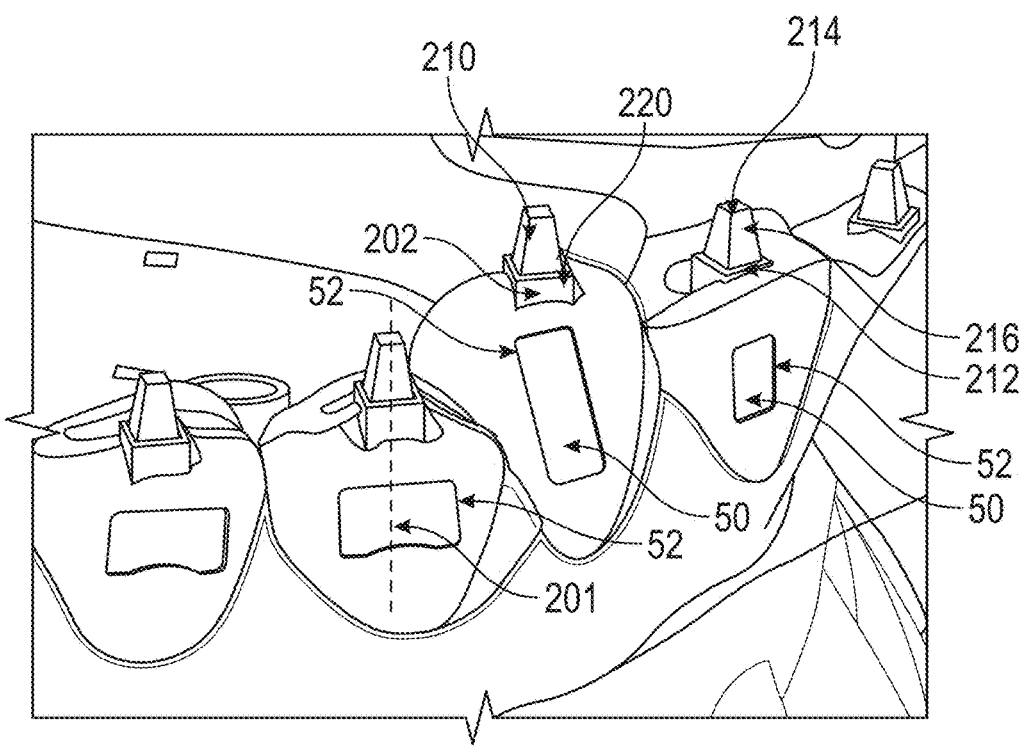
FIG. 6 is an enlarged, perspective view of the fixture model of FIGS. 4 & 5.

FIGS. 4-6 depict the mockup 10 without associated carrier assemblies 100. The combination of the dental arch 12, mold body 15 and alignment pins 200 can be referred to as a fixture model hereafter. An alignment pin 200 projects upward from the occlusal surface 16 of each tooth 13 to which an orthodontic appliance 30 is to be bonded (hereinafter, a bonding tooth). In presently preferred implementations, each alignment pin 200 projects vertically outward from an associated occlusal surface 16 aligned with its vertical axis 201 normal to the base plane B of the mold body 15. Alternatively, one or more alignment pins 200 may include a vertical axis 201 aligned with the vertical axis V. Either orientation can advantageously enable the carrier assembly 100 to be easily placed on the alignment pin 200 and for the subsequently formed transfer apparatus to be more easily detached from the mockup 10. In presently preferred circumstances, however, the axis 201 is aligned substantially normal to the base plane B, and each vertical axis 201 of each alignment pin in the mockup 10 is essentially in parallel to all other vertical axes 201.

The alignment pin 200 includes a body 202, a head portion 210, and a shoulder 220 located at the base 212 of the head 210, nearer the occlusal surfaces 16. The head portion 210 as a whole may be conical, frusto-conical, pyramidal, frusto-pyramidal, or any other appropriate shape that limits rotation about the vertical axis. The rotation limiting shape may include one or more facets that alone or in combination inhibit rotation (e.g., a half moon, a clover, etc.) In some embodiments. the head 210 includes a decreasing taper in a cross-sectional dimension between the base 212 and apex 214 of the head 210. For example, the head may include one or more side surfaces having a negative draft angle of at least 5 degrees and no greater than 15 degrees, providing one or more canted surfaces 216. The presence of canted surfaces on the head can aid in the arrangement of a carrier assembly on the alignment pin 200, and removal of a transfer apparatus from the mockup 10. In other embodiments, the head has substantially continuous cross-sectional dimensions.

Figure 29:
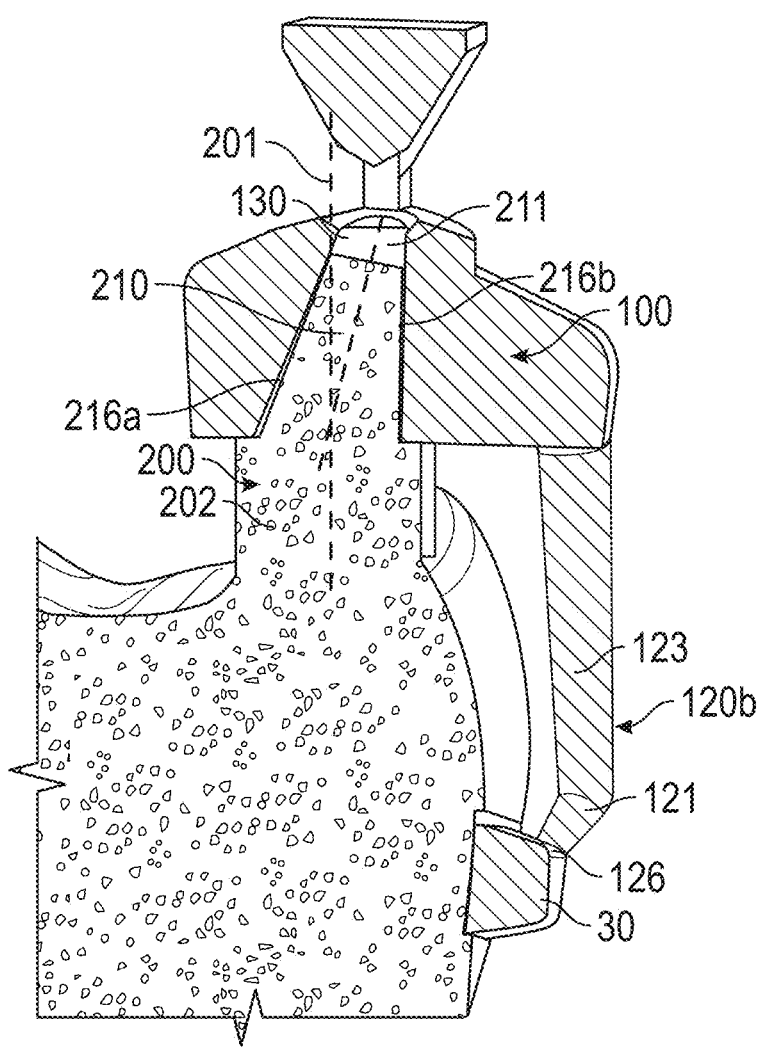
FIG. 29 is a schematic cross-sectional view of another embodiment of an alignment pin and carrier assembly according to the present disclosure.

The disparate degrees of canting of surfaces on the head 210 may produce a head axis 211 that is not aligned with the vertical axis V or the body 202. In alternative implementations, as shown in FIG. 29, the vertical axis 211 of the head portion 210 of one or more alignment pins 200 may be tilted relative to the vertical axis V and/or the vertical axis 201. The head portion 210 in the embodiment of FIG. 29 includes a head surface 216b that is essentially vertical, with an opposing canted surface 216a that is more severely angled than those canted surfaces 216 in other depicted embodiments. Providing an essentially vertical surface can, in certain circumstances, enhance the retention of the carrier assembly 100 on the model 10.

The body 202 has a generally rectangular cross-section consistent with the cross-sectional shape of the head 210. The body 202 at the shoulder 220 has larger cross-sectional dimensions than the head portion 210, providing an occlusal stop surface adjacent the base 212. The shoulder 220 is disposed at a predetermined height from the occlusal surfaces 16 of the bonding tooth 13. The height is determined such that the shoulder rests comfortably above, in the z-direction, the occlusal tooth surfaces 16. In this manner, the shoulder 220 arrests vertical travel of the carrier assembly 100 and the crane body 102 does not contact the occlusal surfaces 16. When vertical travel arrested along the axis 201, the appliance 30 is typically located at the prescribed bonding position and orientation on the bonding tooth surface. In certain embodiments, the occlusal stop surface/shoulder 220 has a height of at least about 0.2 mm, and in some embodiments at least about 0.3 mm. A shorter height may, in certain circumstances, promote undesired occlusal surface contact, while a taller height may require longer coupling arms 120 and larger transfer apparatuses, leading to unintentional fractures or patient discomfort.

In presently preferred implementations, the alignment pin 200 is located proximate the appliance bonding surface at a location such that the vertical axis 201 is aligned generally perpendicular to the central axis 42 of the appliance 30 when the associated appliance 30 is located on the mockup 10. In such implementations, an edge of the body 202 is oriented substantially parallel to the long axis 40 of the appliance and/or substantially perpendicular to central axis 42 (See FIG. 5). The vertical axis 201 of the alignment pin is spaced from the appliance bonding surface a distance sufficient for the appliance 30 and carrier assembly 100 to be reliably removed from the mockup 10. For example, the distance between a plane tangent to the bonding surface and the vertical axis is about 1.8 mm.

The shape and cross-sectional dimensions of the alignment pin 200 may be the same for each bonding tooth, allowing for improved standardization of manufacturing and assembly. In other embodiments, at least one of vertical axis, the shape, and the cross-sectional dimensions may be modified, to allow correspondence between a given carrier assembly and a particular bonding tooth. For instance, a conical head 210 may indicate correspondence with a carrier assembly for an anterior tooth, while a frusto-pyramidal assembly indicates correspondence with a carrier assembly for a posterior tooth. Alternatively or additionally, the alignment pin or surrounding tooth surfaces can include indicia identifying the associate carrier assembly. The indicia may include text, symbols. coloring, scribe lines, or the like.

Another indicator for appliance/carrier assembly placement may be found on the appliance bonding surface in FIG. 6. The intended placement location for the appliance 30 can include a depression 50 shaped to receive the appliance at the prescribed position and orientation. The depression 50 has a boundary 52 substantially matching the shape of the bonding surface 38 of the associated appliance 30. The depression 50 is recessed from the surrounding bonding surface of the tooth 13. In exemplary implementations, the depression 50 is recessed about 100 microns from the surrounding bonding surface. The depression 50 aids in both locating the appliance 30 on the mockup 10 and reducing or eliminating superfluous gaps between the appliance and tooth when the appliance is seated in the patient's mouth, leading to improved bonding to the tooth surface. A depression 50 may also offer improved registration with the bonding surface 38, as well as indicating the proper orientation of the appliance to one assembling the mockup. A depression 50 can also aid in positioning the bonding surface 38 nearer the tooth than the wall surfaces of a transfer apparatus. ensuring the transfer apparatus does not interfere with the appliance bonding at the bonding site. In the same or other embodiments, a depression 50 can provide space to receive a compressible material prior to arranging the associated carrier assembly, such that the compressible material can subsequently be fixed to the bonding surface 38.

Figure 32:
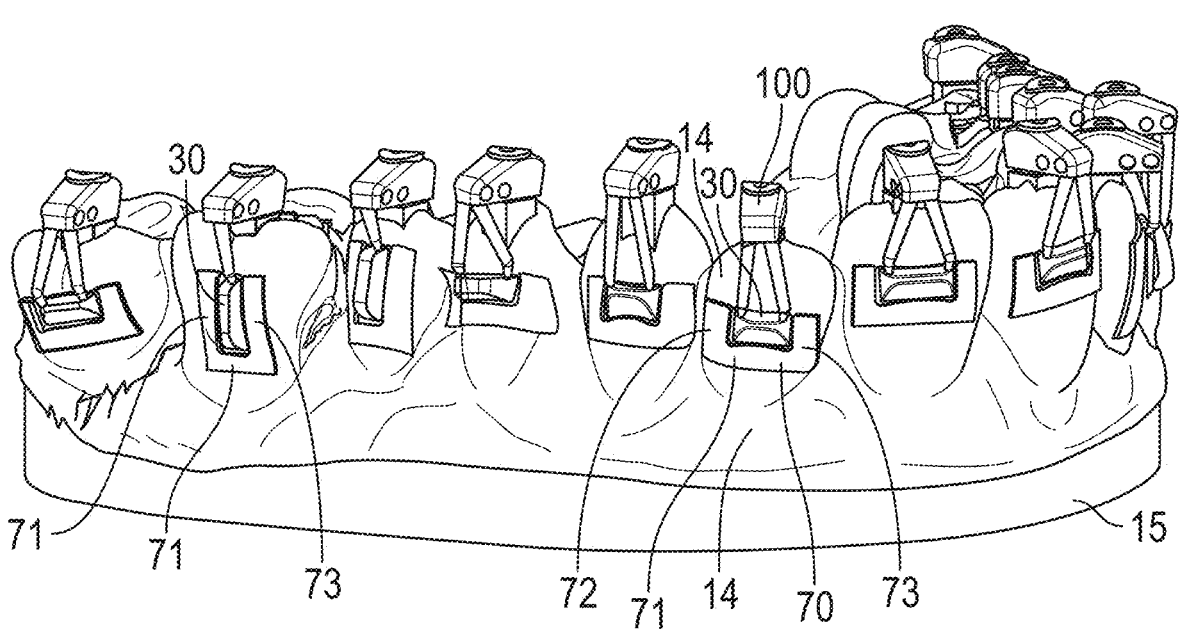
FIG. 32 is a perspective view of a physical mockup having a set of carrier assemblies for orthodontic appliances according to embodiments of the disclosure.
Figure 33:
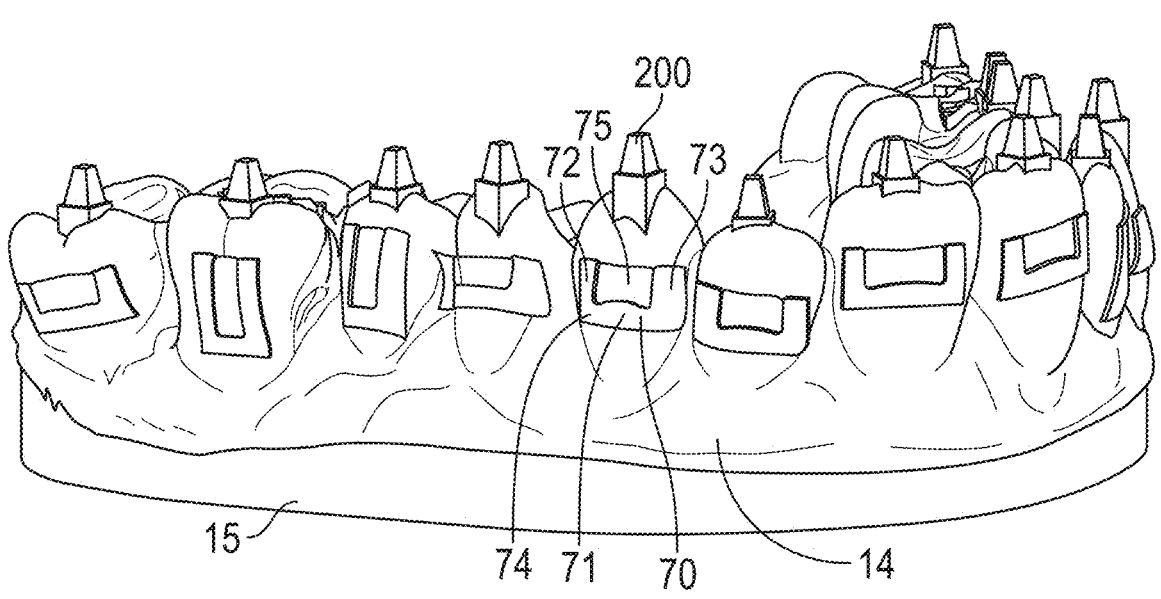
FIG. 33 is a perspective view of the physical mockup of FIG. 32, with the carrier assemblies removed.
Figure 34:
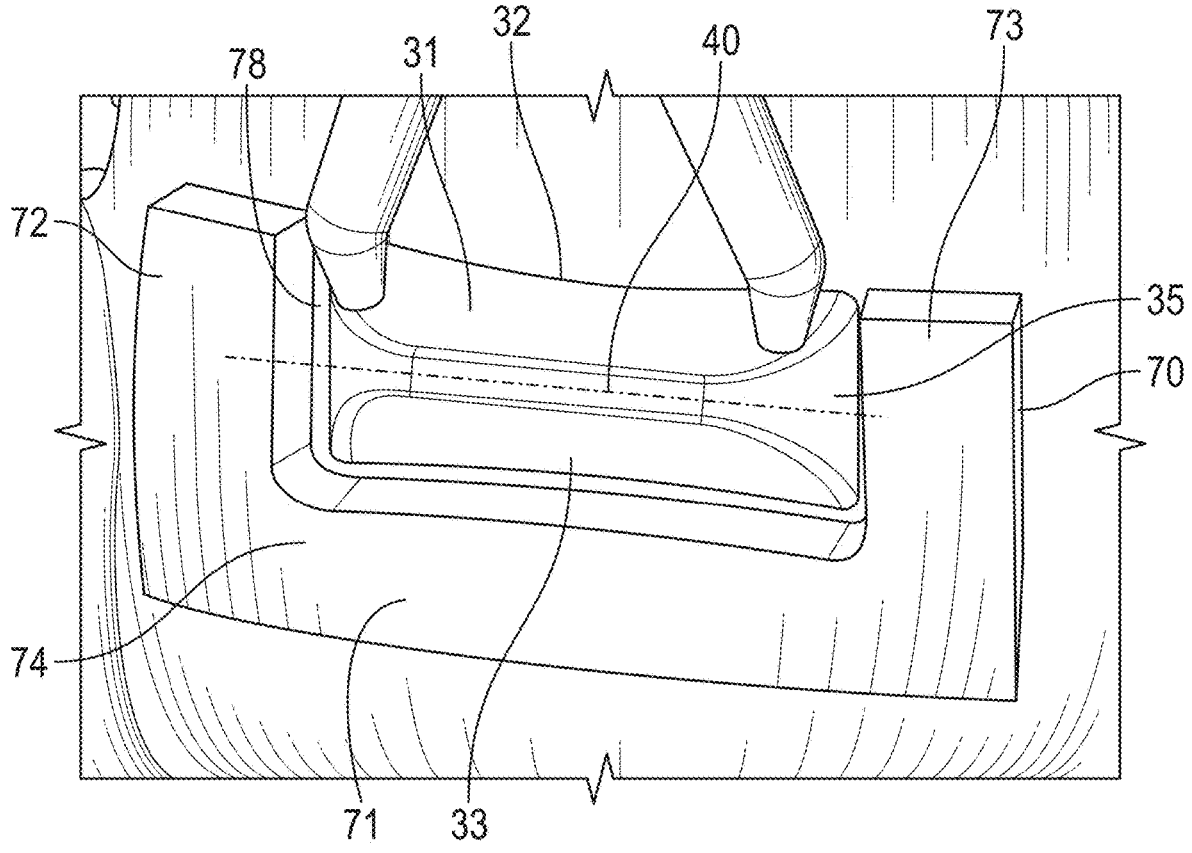
FIG. 34 is an enlarged is a carrier assembly received on an alignment pin on a tooth in a mockup of FIG. 32.

An additional indication of appliance placement, along with other primary benefits described below, may be provided by a capillary force inhibiting wall 70 projecting outward from the facial surface 17 of each tooth 13, as depicted in FIGS. 32-34. The wall 70 forms a mesa-like structure partially surrounding the appliance 30 when the carrier assembly 100 is received on the fixture model. The wall 70 as depicted has a general U-shape, with a base 71 extending generally mesial-distally and two legs 72, 73 extending generally occlusal-gingivally. Other embodiments. not shown, may be generally L-shaped with a base and a single leg.

The legs 72, 73 cooperate with the base 71 to define a pocket 75 having a width "W" that is greater than the length of whichever edge 32, 33, 34, 35 of the appliance body 31 is arranged closet to the gingiva 14. This leads to an overall mesial-distal width of the wall 70 that is also greater than the length of the gingival most edge of the appliance. As depicted, the legs 72, 73 are arranged substantially parallel to one another, and substantially perpendicular to the base 71. In other embodiments, the legs may be divergent, or the legs may be parallel to one another but oblique relative to the base. The wall only partially surrounds the appliance 30, so that the carrier assembly may be placed on the alignment pin and subsequently removed with a formed transfer tray, as set out below. Accordingly, it is typically not be necessary for the wall 70 to be located on the occlusal-most edge of the appliance 30, but in some embodiments a portion of a wall may also be located on the occlusal in such that the wall surrounds the entirety or substantial entirety of the appliance 30 perimeter.

One of either the base 71 or the legs 72, 73 are arranged substantially parallel to the long axis of the appliance 30. For appliance 30 placement with a short edge 34, 35 nearer the gingiva 13, such as upper first molar 13f, the legs 72, 73 are substantially parallel to the long axis 40. For appliance 30 placement with a long edge 32, 33 nearer the gingiva 13, such as upper second molar 13g and upper lateral 13c, the base 71 is instead substantially parallel to the long axis 40. As depicted, the legs 72, 73 extend the full length of a respective edge 32, 33, 34, 35 of the appliance 30, and in presently preferred circumstances a length of the legs 72, 73 at least generally corresponds to the length of the associated appliance body edge 32, 33, 34, 35. In other embodiments, the legs 72, 73 may be shorter than the associated edge, though still dimensioned sufficiently to form the pocket 75.

The wall 70 is not intended or designed to contact or otherwise engage with any surfaces of the appliance 30. Each wall 70 is deliberately offset from the appliance 30, leaving a gap 78 between the wall 70 surfaces and the side edges 32, 33, 34, 35 of the appliance body 31. This gap 78 at least partially surrounds the appliance 30 and provides adequate distance from the appliance, typically within a range of 50 microns to 200 microns, with presently preferred in the range of about 100 microns to 150 microns. Each of the base 71 and legs 72,73 have a thickness measured in planes generally parallel to the bonding tooth surface 17 between about 200 microns and 1.2 mm.

Each wall 70 has a height "H", measured from an outer face 74 to the tooth surface 14. The height "H" is generally shorter than the buccolabial height of the appliance 30. In certain embodiments, the height "H" may increase or remain constant over a portion of tooth surface 14. In other embodiments, the height "H" tapers over a least a portion of the wall 70 that is taller adjacent the appliance 30 than the gingiva 15. The heigh "H" is typically in the range from 100 micron to 700 micron. Exemplary heights include 250 microns and 500 microns. Taller wall heights may cause difficulty in removing a formed transfer apparatus from the physical mockup, while shorter heights may not sufficiently inhibit capillary action to justify inclusion of the wall on the fixture model. A wall of sufficient height will help create the confines of a void when a transfer apparatus is formed over the physical mockup. That void will exist between transfer apparatus and a tooth on which the apparatus is seated, and will operate to inhibit capillary action.

The outer face 74 and side edges the walls depicted in FIGS. 32-34 are each essentially planar. In other embodiments, the walls may have any suitable cross-sectional shape or combination of shapes (e.g., trapezoidal, dome-shaped, etc.) For instance, the outer surface 74 may be rounded, with planar side surfaces to aid in removal of a subsequently formed transfer apparatus. Each wall 70 on the mockup 10 may each have the same or different cross-sectional shape. In other embodiments. certain groups of wall may share the same cross-sectional shape amongst each other, and be different from the cross-sectional shape of a group situated in a different quadrant or location on the dentition 12.

Turning back to FIGS. 7 and 8, the carrier assembly 100 and alignment pin 200 on the upper cuspid 13c are depicted in closer detail. The carrier assembly 100 includes a crane body 102 having a generally polygonal cross-sectional shape, taken in directions along the occlusal plane. The crane body 102 is received on the head 210 of the alignment pin 200. The body 102 includes first and second canted surfaces 103, 104 meeting at an apex 105. A tooth-facing surface 106 is located opposite the apex 105, with opposing side surface 107, 108 extending between the facing surface 106 and the apex 105. As depicted, the tooth-facing surface 106 is substantially planar, but the facing surface 106 may be concave, convex, or include compound curvature. The transition between any two adjacent surfaces (e.g., first canted surface 103 and side surface 107) is typically arcuate with a defined curvature, such that crane body 102 lacks sharp edges. The transition can be a variety of radius sizes depending on the overall size of the crane body 102.

Portions of the first canted surface 103 and facing surface 106 project outward in a facial direction from occlusal and labial surfaces 16c, 17c of the tooth 13c. The rear or lingual edge of the body 109 remains disposed over the occlusal surfaces 16c, while the front or labial edge 110 is generally not coplanar with any labial surface 17c of the tooth 13c. First and second coupling arms 120a and 120b project from a coupling region 111 of the facing surface 106, proximate the labial edge 110, in a gingival direction towards appliance 30. In other embodiments not depicted, coupling arms may project from another surface of the body generally proximate a labial-most edge.

The geometry (i.e., dimensions and shape) of the crane body 102 may be substantially similar for each carrier assembly 100 positioned on the mockup 10. The crane body 102 has an overall length from rear edge 109 to front edge 110 sufficient to position the coupling region 111 away from the surfaces of the tooth. The use of standard crane body 102 geometry can, in certain circumstances, improve both the design and manufacturability of the carrier assemblies, according to techniques explored in further detail below. In alternative implementations, the geometry of the crane body 102 may vary based on the intended bonding surface. For instance, a crane body having wider mesial-distal dimensions may be indicative of a bonding location for the appliance on a posterior tooth or positioning multiple appliances on one or more surfaces.

The side surfaces 107, 108 include retention apertures 118 extending therebetween. The retention apertures 118 aid in the retention of the carrier assembly 100 within a transfer apparatus and can improve the manufacturability of the assembly 100, particular with respect to exemplary additive manufacturing techniques explored below. In alternative, or addition to, the retention apertures 118, any of the body 102 surfaces may include protrusive retention features (pins, etc.) or a roughened surface. The surface roughness may be created directly for the design of the crane body 102 or added in a post-processing step. Any surface of the crane body 102 may include indicia identifying the associated tooth or phase of treatment relevant to the appliance 30. The indicia may include text, symbols, coloring, or the like.

A grasping element 150 extends upward from the apex 105. The grasping element 150 includes a body 151 having a generally triangular cross-sectional shape and a frangible section 152 including generally rectangular sprues 153 proximate the apex 105. The shapes of the grasping element body 151 and frangible sprues 153 are not critical. The grasping element 150 can be useful for positioning the carrier assembly on the mockup 10 via hand tool, robot, or any other viable technique. The grasping elements 150 allow for individual placement of the carrier assemblies, though can be joined together for simultaneous placement of two or more carrier assemblies on portions of the arch 12. The frangible section 152 permits the separation of the grasping element 150 from the crane body 102 prior to creation of a transfer apparatus, as further described below.

Though depicted as generally aligned to the crane body 102 with the frangible section 152 parallel to the long axis 40 of the attachment 30 and the front surface 110, the position and/or orientation of the grasping element 150 may be adjusted to aid in its eventual removal. For instance, a group of grasping elements 150 may be rotated such that frangible section 152 of each carrier assembly 100 is arranged substantially in parallel to the frangible section(s)

152 of one or more adjacent carrier assemblies 100 when all are received on the mockup 10. In other embodiments, a group of grasping elements 150 may be rotated such that the frangible section 152 of each carrier assembly 100 is arranged substantially colinear with the frangible sections 152 of one or more adjacent carrier assemblies 100 when all are received on the mockup 10. By arranging the grasping elements 150 in this manner, the portions of the carrier assemblies 100 occlusal to the apex 105 may be easier to remove en masse before creation of a transfer apparatus, as further detailed below.

The body 102 further includes a recess 130 (see FIG. 8) with an opening 132 on the facing surface 106 for receipt of the alignment pin 200. The recess 130 is disposed near the rear/lingual edge 109 of the body 102 opposite the coupling region. The recess 130, as depicted, is closed on one end and terminates at an interior surface 134 through at least a portion of the crane body 102 height before reaching the apex 105. In other embodiments, a crane body may feature a recess extending the full height of the body 102 from facing surface to the apex, with openings on both ends. The center of the opening 132 is located within a plane "E" that extends through the height of the crane body 102 (and typically colinear with the vertical axis 201 of the alignment pin 200). The appliance 30 is located below the facing surface 106 at a position such that the bonding surface 38 is not coincident or coplanar with the plane E, ensuring the crane body 102 can be placed on the pin 200 without interference from the tooth surface 13c.

The recess 130 is dimensioned to releasably receive the alignment pin 200 and inhibit rotation of the carrier assembly 100 about the vertical axis 201 of the pin, while also aiding in aligning the appliance with the vertical axis 201 so that the appliance arrives at the prescribed bonding location. The central axis of the recess essentially aligns with the head axis 211, which can result in a parallel relationship to the vertical axis V or itself canted, as depicted in FIG. 29. As depicted in, for example, FIGS. 4, 28, and 29, the recess 130 may feature a trapezoidal cross-sectional shape in a plane perpendicular to the occlusal plane. The cross-sectional shape (e.g., triangular, rectangular, elliptical, etc.), of the recess can be uniform along a length of the body, or in other implementations the shape may vary. The opening 132 may be triangular, rectangular (including square), circular, ovular, or polygonal. The recess 130 as a whole may be conical, frusto-conical. pyramidal, frusto-pyramidal, or any other appropriate shape. In some embodiments, the recess 130 includes a decreasing taper in a cross-sectional dimension, measured parallel to the opening, as the apex 105 is approached. In other embodiments, the recess 130 has substantially continuous cross-sectional dimensions.

The orientation, shape, and cross-sectional dimensions of the recess 130 may be the same for each carrier assembly 100, allowing for improved standardization of manufacturing and assembly. In other embodiments, at least one of the orientation, shape, and cross-sectional dimensions may be modified to allow correspondence between a given carrier assembly and a particular type of bonding tooth. For instance, a circular shape may indicate correspondence with a carrier assembly for an anterior tooth, while a rectangular indicates correspondence with a carrier assembly for a posterior tooth.

The inhibition or prohibition of rotation about the vertical axis 201 and/or head axis 211 is typically achieved when the opening of the recess 130 and the cross-sectional shape of the head 210 taken perpendicular to the vertical axis 201 and/or head axis are similar if not substantially identical.

This correspondence is not strictly necessary as, for example, a reversible friction fit between a conical head 210 and conical recess 130 may nonetheless adequately inhibit rotation of the carrier assembly 100. Alternatively, the recess 130 may have a conical shape that nonetheless does not substantially rotate about a rectangular or other polygonal head, with each shape providing a facet to inhibit rotation. As depicted, the recess 130 and head 210 each include a frusto-pyramidal shape, with a rectangular opening 132 on the facing surface 106. The negative contour in the recess 130 corresponds generally to the positive contour of the upper part of the positioning pin, with the pin having a small offset in dimensions (e.g., 0.05 mm) to ensure the opening 132 reaches the shoulder 220.

Figure 27:
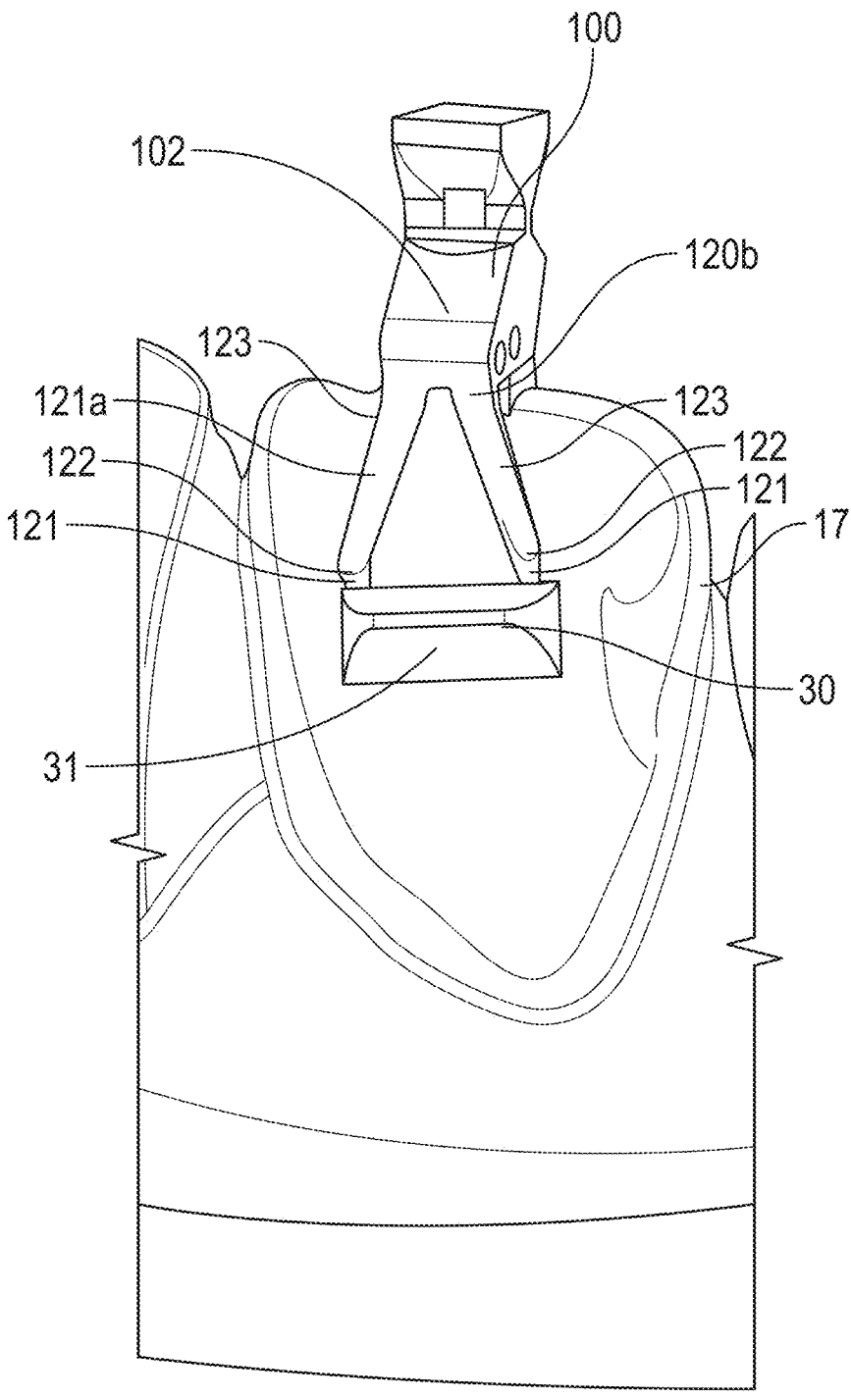
FIG. 27 is a perspective view of another embodiment of a carrier assembly received on an alignment pin on a tooth in a mockup of the present disclosure.
Figure 28:
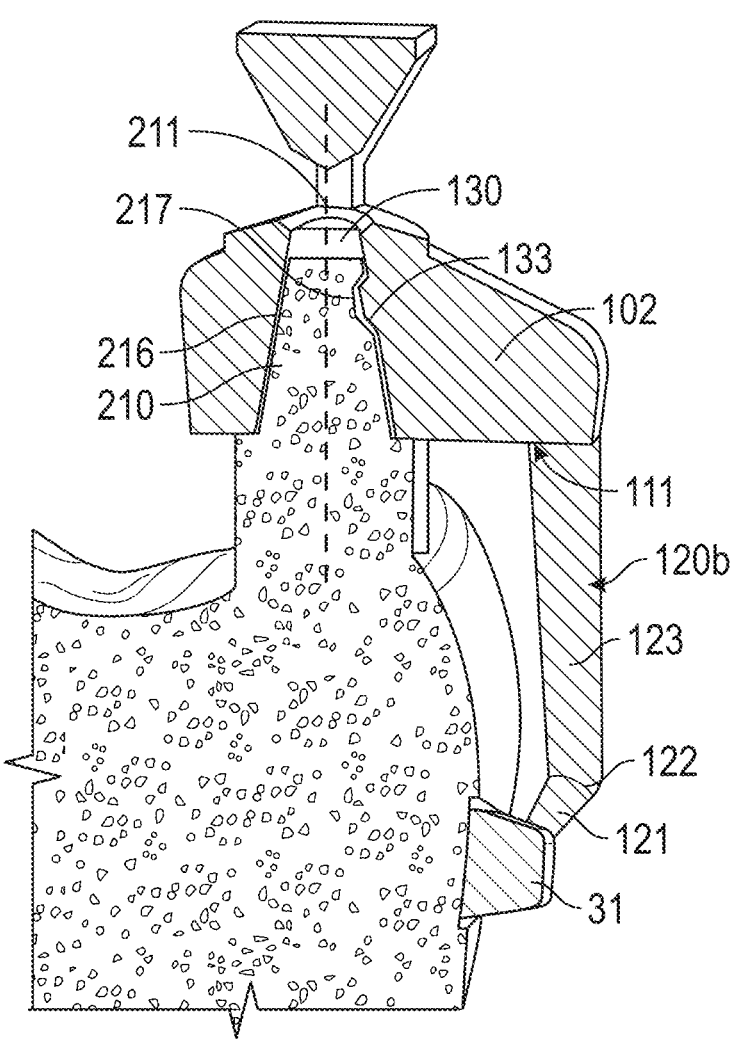
FIG. 28 is a schematic cross-sectional view of the carrier assembly and alignment pin of FIG. 27.

The head portion 210 and recess 130 may further include retentive features to mate with corresponding features on the carrier assembly. For instance and as shown in the embodiment of FIGS. 27 and 28, the head portion 210 may include one or more wells 217 intrusive to the canted surface 216. The well 217 is dimensioned to mate with a bump 133 projecting from an interior wall within the recess 130. As should be appreciated, the bump could alternatively be formed on the canted surface, with a corresponding well within the recess. The addition of retentive features can aid in securely holding carrier assembly on the alignment pin, particularly during assembly of multiple carrier assemblies on the physical mockup, or handling of the physical mockup in manufacturing after the carriers are assembled to the mockup.

When arranged on the alignment pin 200, the coupling region 111 is positioned a sufficient distance from a plane tangential to the apex of the tooth surface 17*c* such that coupling arms 120 do not contact the tooth surface 17*c* above the height of contour and at least partially travel from crane body 102 to appliance 30 in a direction back towards the tooth 13*c*. Reducing contact between the coupling arms 120 and the tooth 13*c* tends, in certain circumstances, to (a) improve the release of the carrier assembly 100 from the physical mockup and (b) aid in the separation of the appliance 30 from the crane body 102, as any adhesive used to bond the appliance to the tooth is less likely to reach the coupling arms 120. As seen most clearly in FIG. 8, the rear surface of the coupling arms 120*a*, 120*b* form an acute angle "F" with the facing surface 106. In some embodiments, the angle F is at least about 30 degrees, at least about 35 degrees, at least about 40 degrees, at least about 45 degrees. In presently preferred embodiments, the angle "F is no greater than about 85 degrees, no greater than about 80 degrees, no greater than about 75 degrees.

Figure 7:
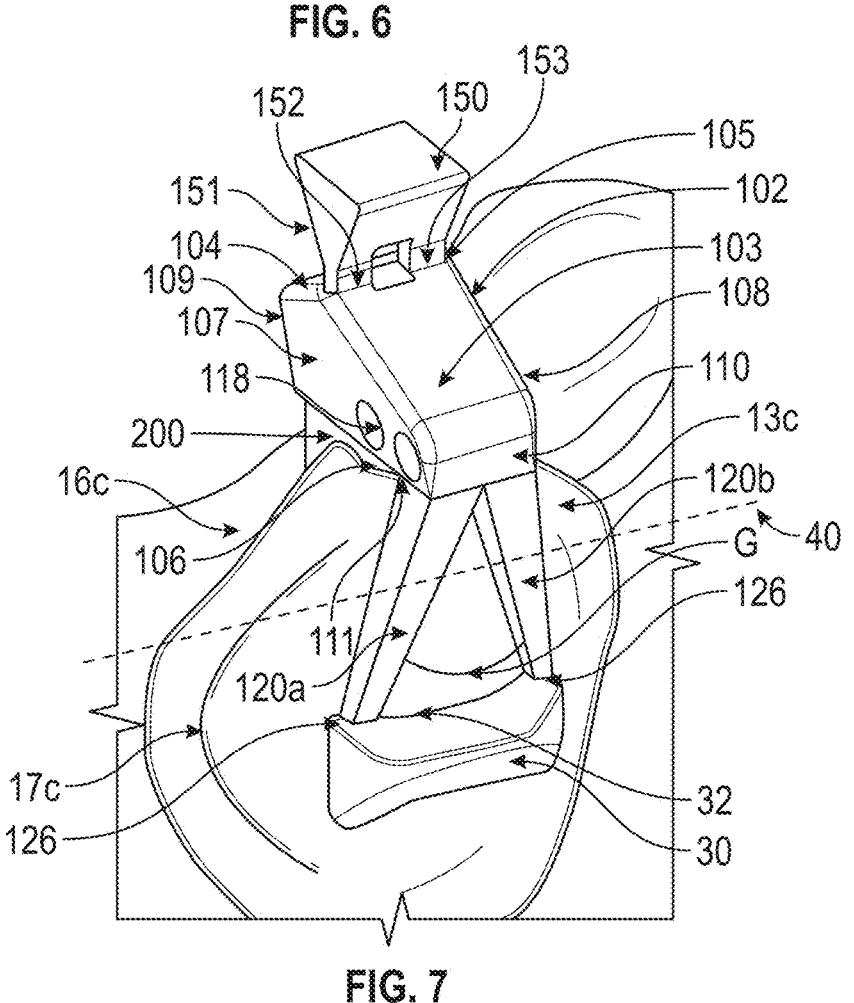
FIG. 7 is a perspective view of a carrier assembly received on an alignment pin in the mockup of FIGS. 1 and 2.
Figures 8, 9:
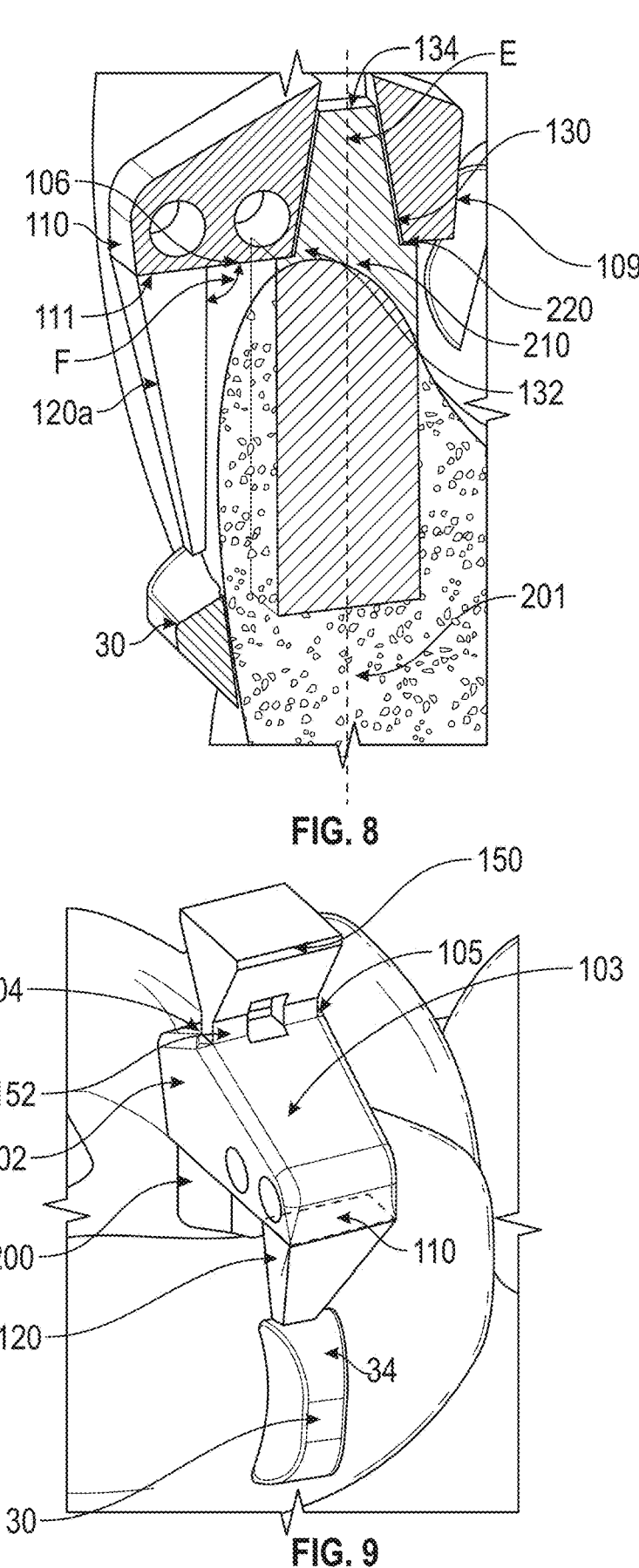
FIG. 8 is a schematic cross-sectional view of the carrier assembly and alignment pin of FIG. 7.
FIG. 9 is a perspective view of a second carrier assembly received on an alignment pin in the mockup of FIGS. 1 and 2.

Although illustrated in FIGS. 7 and 8 as including two coupling arms 120*a* and 120*b*, in some examples, carrier assembly 100 may include one coupling arm or more than two coupling arms. The number of coupling arms may, in certain embodiments, be dictated by at least one of (a) the orientation of the long axis 40 relative to an axis perpendicular to the base plane B; (b) the orientation of the long axis 40 appliance relative to vertical axis V; and (c) the dimensions of the appliance 30. Generally, but not exclusively, an appliance 30 oriented with a long axis 40 within no greater than 35 degrees of parallel to the vertical axis V (or the axis perpendicular to the base plane B) can be positioned with a single coupling arm 120, while an appliance 30 having a long axis 40 oriented within greater than 35 degrees to 90 degrees of parallel to the vertical axis V (or the axis perpendicular to the base plane B) can be positioned with two or more coupling arms 120. For instance, the carrier assembly 100 for upper central 13*a* (depicted in greater detail in FIG. 9) features a single coupling arm to place an appliance 30 having the long axis 40 oriented substantially parallel to the vertical axis V of the physical mockup 10. An appliance having a length along the long axis 40 greater than about 4 mm typically, but not exclusively, includes a least three coupling arms 120.

The coupling arms 120 can be joined to the appliance 30 at various connection points (collectively, connections 126) on the body 31. In presently preferred implementations, the connections 126 are spaced in the direction of the facing surface 39 from an edge of the bonding surface 38, providing adequate clearance for the coupling arms 120 from the bonding tooth surface. For carrier assemblies featuring two coupling arms 120, the connection points 126 are typically arranged on one long edge 32, 33 of the body 31 at opposing corners. For carrier assemblies featuring a single coupling arm, the connection 126 is typically arranged on one of the short edges 34, 35 at the occlusal-most point on the body 31 (i.e., the edge nearest facing surface 106). For carrier assemblies including a generally rectangular appliance with a long edge dimension greater than about 4 mm, a third coupling arm may connect to the center of the appliance at a third connection on appliance body. The third connection on the body may be coincident or in a plane parallel to the central axis of the appliance. For appliances benefiting from two or more coupling arms, the connections 126 typically include at least one connection 126 on each of the mesial and distal ends of the appliance 30 (as depicted in FIG. 7).

The coupling arms 120*a* and 120*b* of FIGS. 7 and 8 diverge along the path from the facing surface 106 to connections points 126 on the appliance body 31. The angle "G" between the arms 120*a*, 120*b* is generally dependent upon the dimensions of the appliance 30. In some embodiments, the angle "G" is at least about 30 degrees, at least about 25 degrees, at least about 20 degrees, at least about 15 degrees. In presently preferred embodiments, the angle "G" is no greater than about 1 degree, no greater than about 12 degrees, no greater than about 13 degrees, no greater than about 14 degrees, no greater than about 15 degrees.

In some examples, it may be advantageous to use more than two coupling arms for a larger attachment body and/or to increase the robustness of the article during fabrication and handling, thereby preventing premature breakage of the frangible sections, thus more than two connections point may be incorporated into any of the articles described above if desired. For instance, the two diverging coupling arms 120*a* and 120*b* of FIG. 7 may instead be in the form of a singular fin, with multiple connection points on the body 31.

The coupling arms 120 are frangible when bending, twisting, compression, or tension forces are applied, such as, for example, to coupling arms 120 or carrier assembly 100 by a handling tool. In some examples, a size and/or a shape of coupling arms 120 may be selected to have a sufficient structural integrity to allow handling of carrier assembly 100 while also breaking easily when desired. Stress is concentrated by virtue of coupling arms 120 having a reduced cross-sectional area at or near connection 126 with an abrupt increase in area at a surface 39 of the body 31 at the same location. Coupling arms 120 may be broken by using a tool to bend or twist one of the crane body 102 or coupling arm 120 or to shear by pushing or pulling coupling arms 120. In the same or other implementations, the coupling arms 120 may include stress concentration features such as perforations, notches, scores, or otherwise weakened regions to aid in the separation of the arm 120 from the appliance 30. In the same or other implementations, the coupling arms 120 can be made from a relatively rigid material that can be broken at or near the connection 126.

The cross-sectional shape (e.g., triangular, rectangular, elliptical, circular, ovular, etc.), of the coupling arms 120 can be uniform along a length of the body, or in other implementations the shape may vary. The connection 126 may be triangular, rectangular (including square), circular, ovular, or polygonal. The coupling arms 120 as a whole may be conical, frusto-conical, pyramidal, frusto-pyramidal, or any other appropriate shape. To aid in the separation, each coupling arm 120 typically has an area between about 0.05 mm$^2$ and 0.75 mm$^2$, though the size of the connection area may change based on one or more of appliance body and coupling arm geometry.

In some embodiments, one or more of coupling arms include a decreasing taper in a cross-sectional dimension as the appliance 30 is approached. Force may then be applied to the coupling arms 120 and the thicker portion adjacent the crane body 102 can resist the potential for the support to break during the placement of the appliance. Furthermore, a tapered coupling arm may negate the need for a cutting tool and separation of the appliance 30 from the coupling arm 120 may only require the user to apply a compressive or tensile force on the thinner support end to initiate the break. Additionally, when the crane body 102 and appliance 30 are separated, there may be reduced volume of the coupling arm 120 still attached to the appliance 30. In presently preferred implementations, the coupling arms 120 included a square, elliptical, or circular cross-sectional shape with a decreasing taper.

In certain presently preferred embodiments, each coupling arm features a plurality of segments as depicted in FIGS. 28-31. The first segment 121 extends from the connection point at an angle normal to the appliance body 31, with a generally increasing taper, to a pivot point 122. The second segment 123 extends from the pivot point 122 to the coupling region 111 of the crane body 102 in a direction roughly returning towards the tooth surface. A multi-segment coupling arm, as exemplified in FIGS. 28-31, can aid in the separation of the carrier assembly from the attachment, and ensure that the coupling arm 120 does not contact or interfere with the tooth surface of the mockup or the patient's mouth. The clearance between the coupling arm(s) 120 and the tooth surfaces can also offer a space to insert a tool to aid in the separation of the appliance 30 from the carrier assembly 100. The segmented coupling arm(s) can further provide more predictable and desirable separation forces when breaking the attachment from the carrier assembly. The segmented coupling arm(s), featuring a controlled connection deliberately normal to the appliance body, may be used with any embodiments of the present disclosure.

In some examples, after breaking coupling arms 120, a vestige or a nub may be left on or within the body 31 at connection 126. In some examples, the vestige or nub may be removed using any variety of automated cutting and/or polishing tools. In other examples, the vestige or nub may be removed using pressure and friction generated by operation of a hand tool (e.g., a dental probe). In yet other examples, the vestige or nub may remain if it does not interfere with appliance engagement or patient comfort. If using a segmented coupling arm described above, the size of the vestige or nub may be reduced compared to other coupling arms of the present disclosure.

Figure 30:
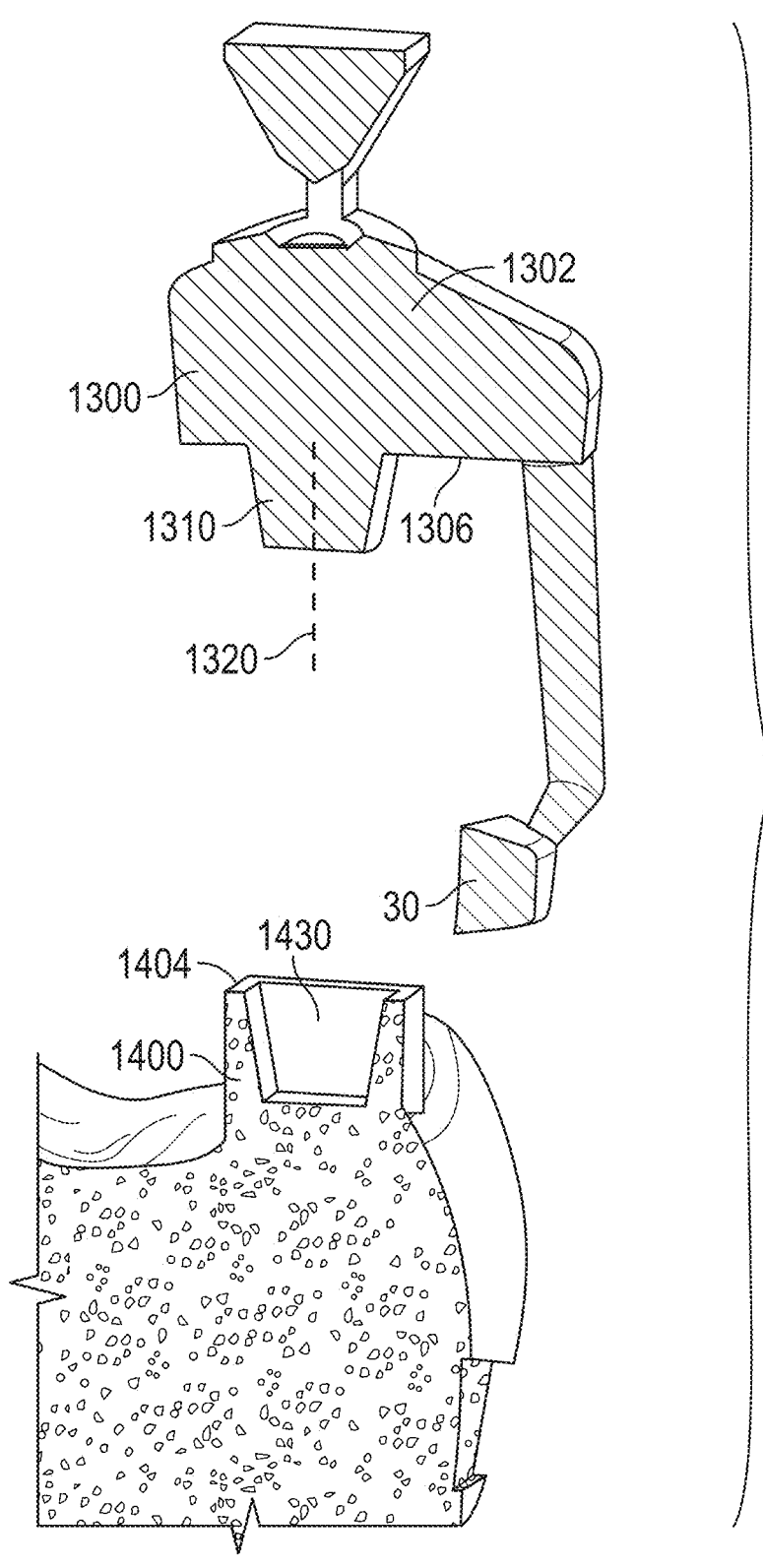
FIG. 30 is an exploded, perspective view of another embodiment of a carrier assembly and associated alignment pin on a tooth in a mockup of the present disclosure.
Figure 31:
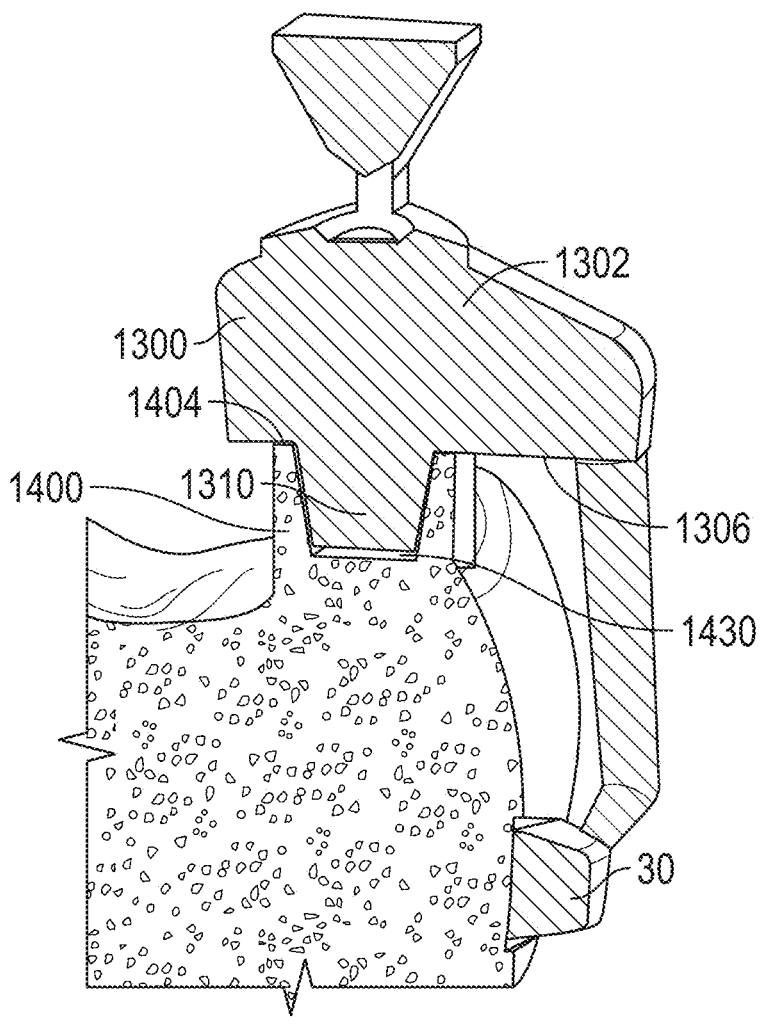
FIG. 31 is a schematic cross-sectional view of the carrier assembly and alignment pin of FIG. 30.

The mating relationship between the carrier assembly and head portion of the alignment pin has been thus far shown with aspects of the alignment pin received in the carrier assembly. In FIGS. 30-31, an alternative relationship is depicted in which the carrier assembly 1300 features a protuberance 1310 on the facing surface 1306, and the alignment pin 1400 includes a recess 1430 formed adjacent and beneath the shoulder 1404 for the receipt of the protuberance 1310. The protuberance 1310 may be conical, frusto-conical, pyramidal, frusto-pyramidal, or any other appropriate shape, as would be the case with head portion 210. The recess 1430 is dimensioned to releasably receive the protuberance 1310 and inhibit rotation of the carrier assembly 1300 about the vertical axis 1320 of the protuberance 1310, while also aiding in aligning the appliance 30 so that the appliance 30 arrives at the prescribed bonding location. Considerations for other structures in the carrier assembly 1300 not mentioned are the same as the corresponding features in carrier assembly 100, and need not be repeated here. The mating relationship between alignment pin 1400 and carrier assembly 1300 of FIGS. 30 and 31 may be used with any of the other embodiments in the present disclosure.

Figure 10:
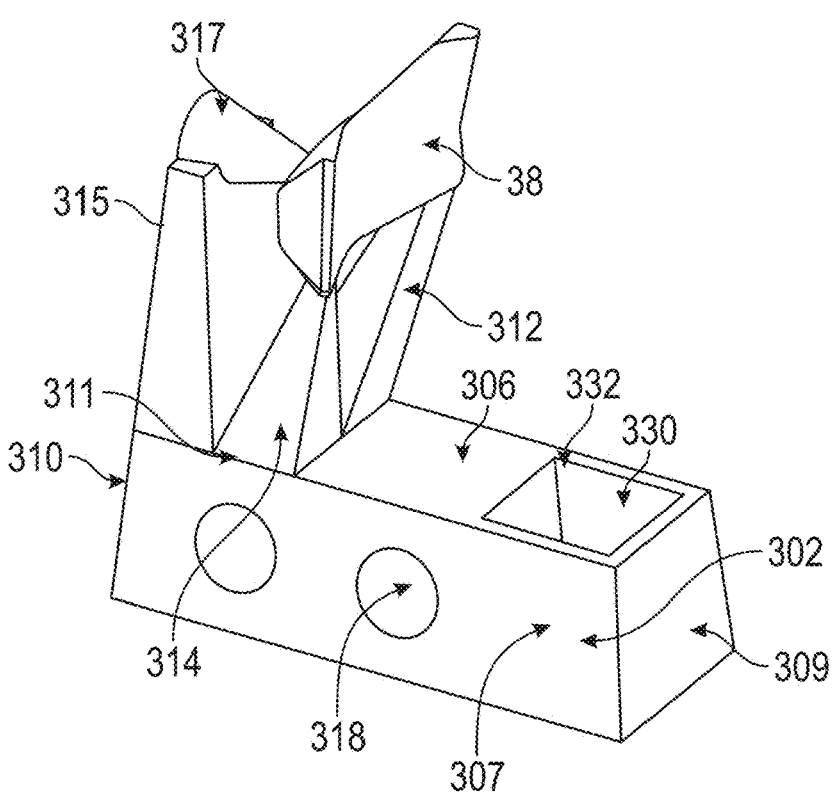
FIG. 10 is a perspective view of a carrier assembly according to embodiments of the present disclosure.
Figure 11:
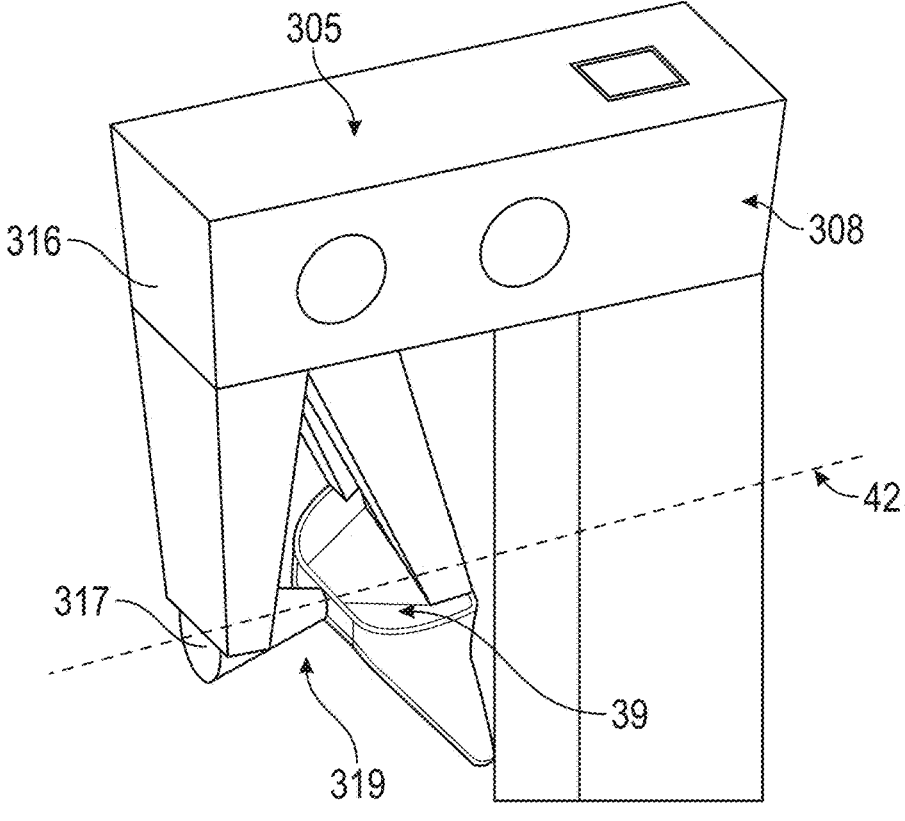
FIG. 11 is a perspective view of a carrier assembly of FIG. 10.

Another embodiment of carrier assembly 300 useful in creating the transfer apparatuses of the present disclosure is depicted in FIGS. 10 and 11. Like assembly 100, the carrier assembly 300 includes a crane body 302 with coupling arms 312, 314 projecting from a coupling region 311 towards an appliance 30. The crane body 302 includes a substantially L-shaped cross-section, with the coupling region 311 providing a base of the L proximate the front edge 310 of the body 302 in the form of a third coupling arm 315. A recess 320 for receipt of an alignment pin is disposed proximate the rear edge 309 of the body 302. Side surfaces 307, 308 feature opposing openings of retention apertures 318. Considerations for the appliance 30, coupling arms 312, 314, recess 330, opening 332, and retention apertures 318 are the same as the corresponding features in carrier assembly 100, and need not be repeated here.

The third coupling arm 315 is a compound structure including an occlusal-gingivally extending face 316 and a central sprue 317 arranged substantially normal to the face 316. The central sprue 317 has a frusto-concial shape and has a decreasing taper as the appliance 30 is approached. In other embodiments, the central sprue 317 may have other shapes and dimensions, similar to connecting arms 312, 314. The central sprue 317 is arranged along the central axis 42 of the appliance 30 and is designed to separate from or proximate to a central connection point 319 on the facial surface 39. To aid in the separation, the connection point 319 typically has an area between about 0.05 mm$^2$ and 0.075 mm$^2$, though the size of the connection area may change based on one or more of appliance body and coupling arm geometry. In alternative embodiments, only the third coupling arm 315 is primarily used to connect the appliance and crane body, without the need for one or both of the coupling arms 312, 314.

The crane body 302 includes substantially planar facing 306 and top 305 surfaces, each extending in a plane substantially parallel to the opposing surface. The side surfaces 307, 308 can be similarly, substantially planar. One or both side surface 307, 308 can be inclined relative to a plane tangent an edge of the facing surface at an acute draft angle. In presently preferred circumstances, the angle is between about 3 and about 10 degrees. The draft angle can be the same or different for each side surfaces 307, 308. The depicted construction of crane body 302 may thus allow the top surface 305 to be arranged in a plane parallel to a build platform of an additive manufacturing machine.

Figure 12:
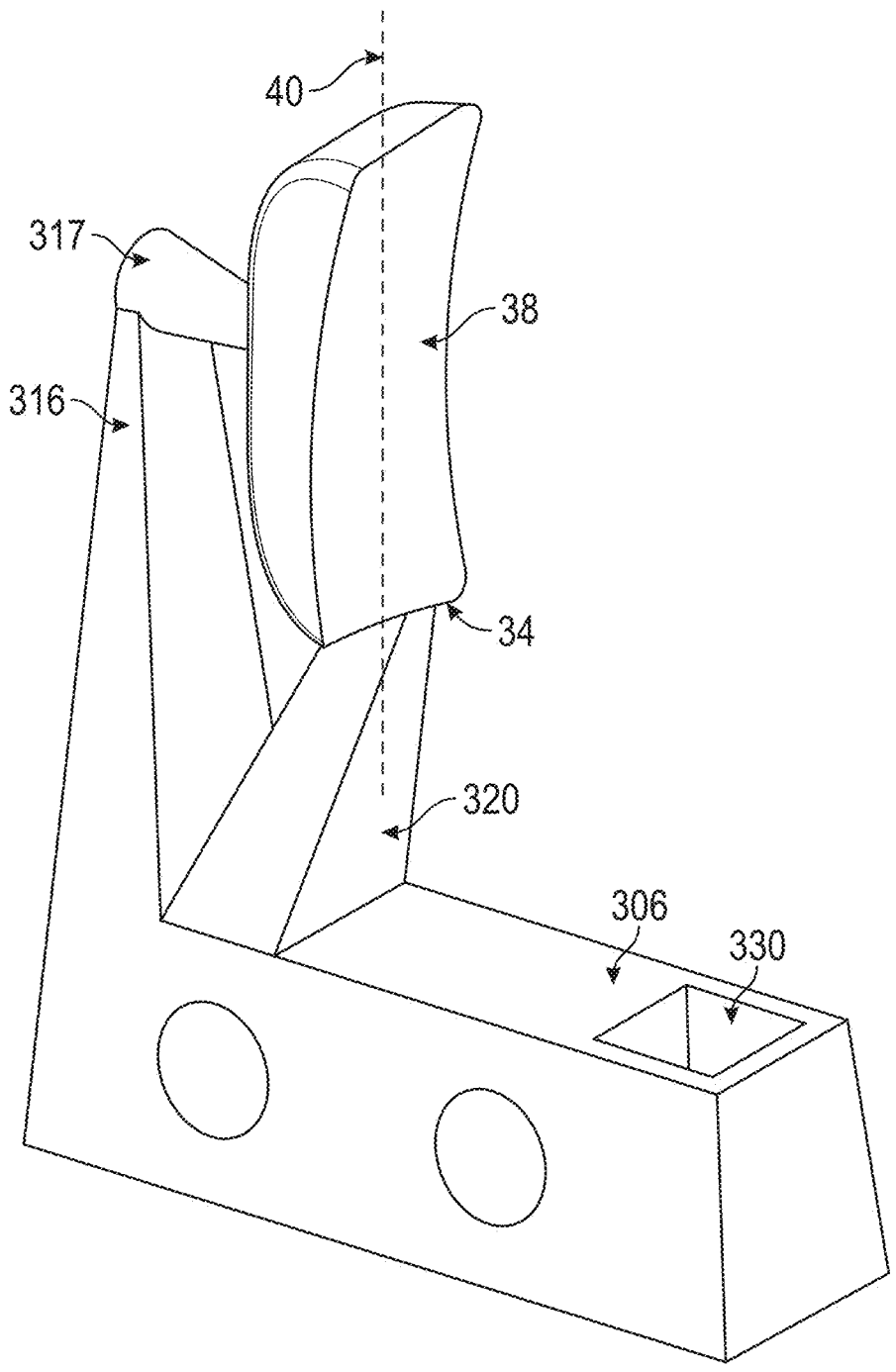
FIG. 12 is a perspective view of a carrier assembly according to another embodiment of the present disclosure.

The carrier assembly 300 depicted in FIG. 12 is similar in nearly all aspects to the assembly 300 depicted in FIGS. 10 and 11, except that the appliance 30 is oriented with a long axis 40 substantially parallel to the occlusal-gingivally extending face 316 and the vertical axis V when the assembly 300 is seated on the physical mockup 10. Accordingly, the carrier assembly 300 of FIG. 12 features a single coupling arm 320 extending from the facing surface 306 connecting to the short edge 34 of the body 31.

Figure 26A:
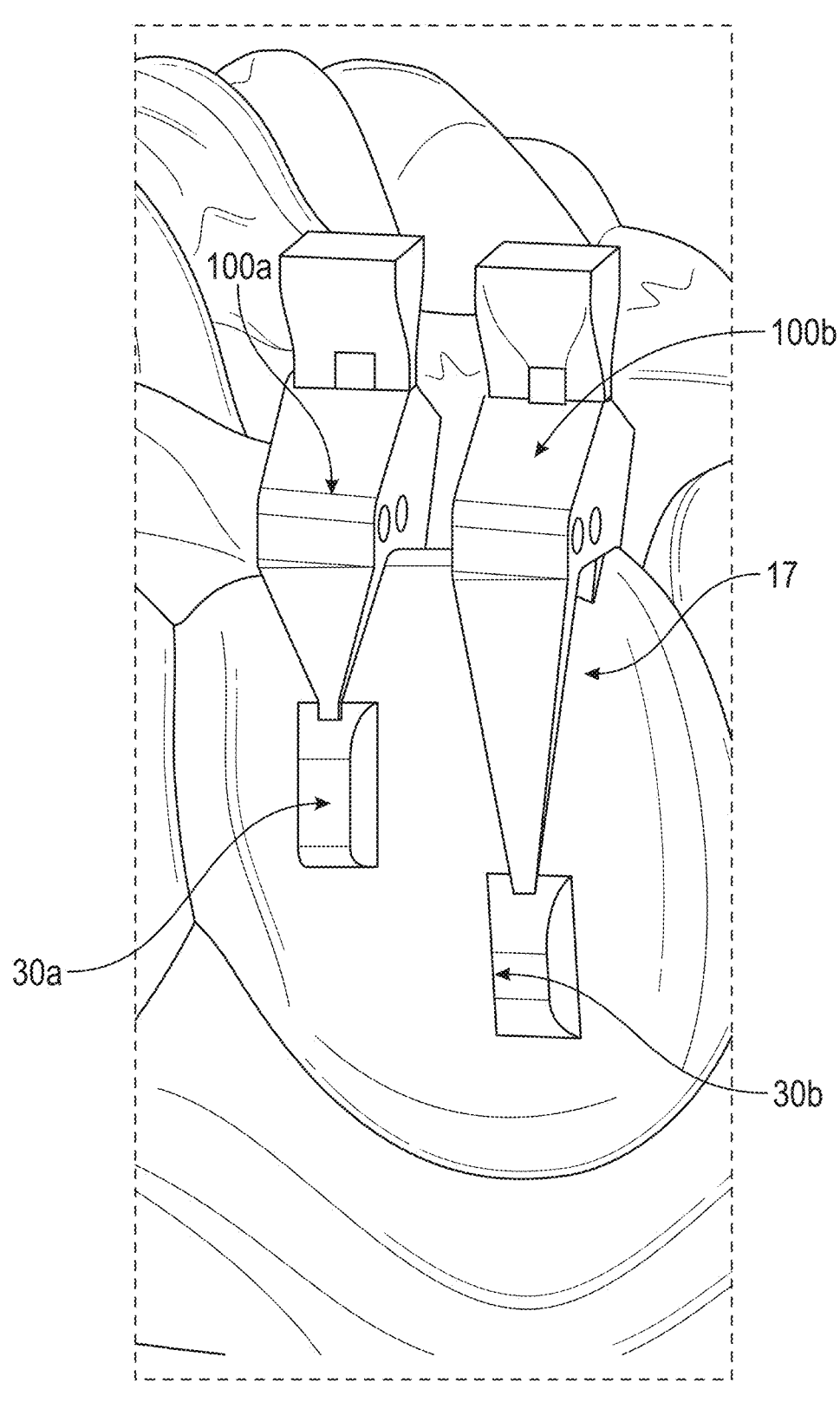
FIG. 26A is a perspective view of a carrier assembly according to embodiments of the present disclosure.
Figure 26B:
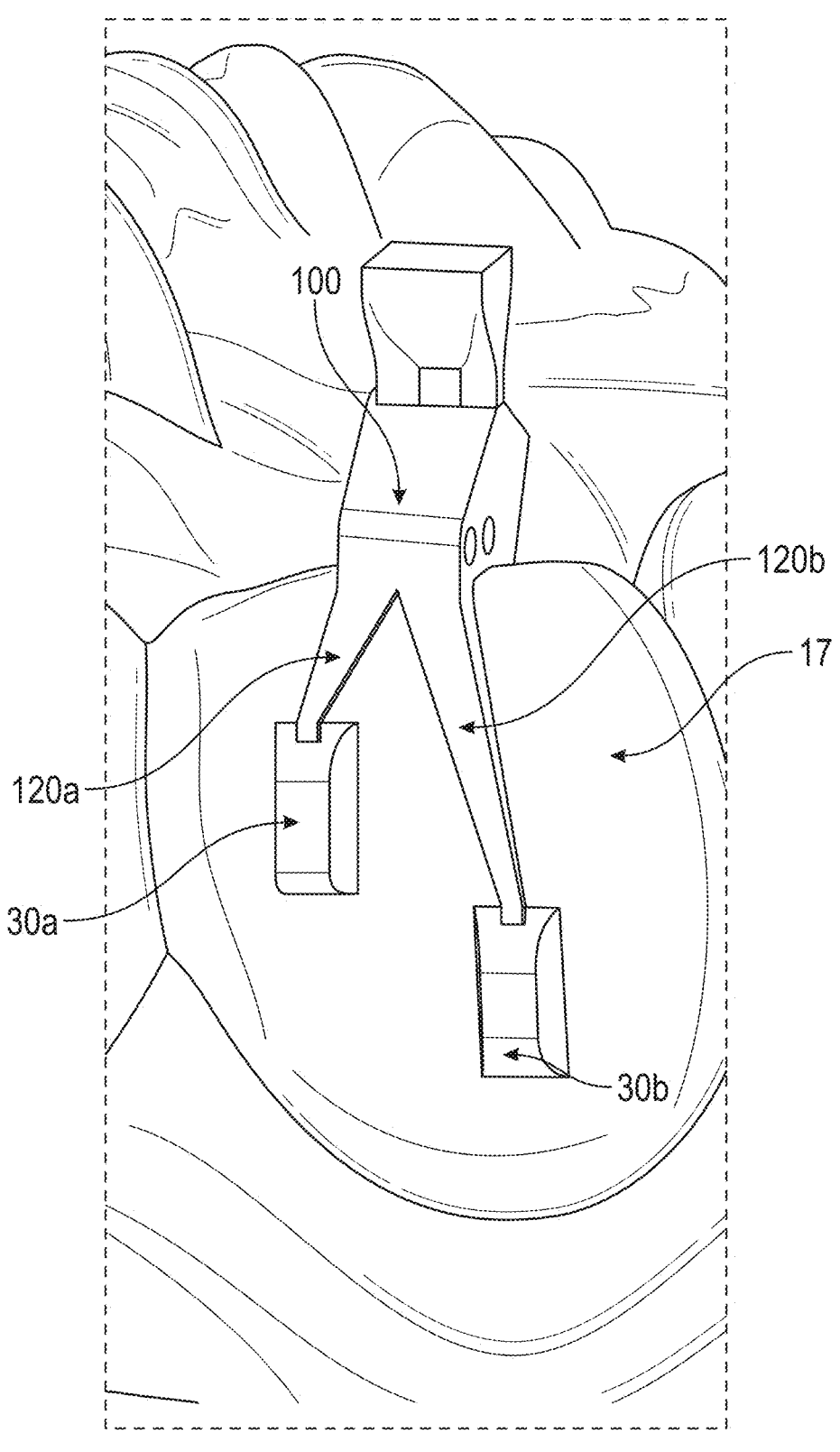
FIG. 26B is a perspective view of a carrier assembly according to embodiments of the present disclosure.
Figure 26C:
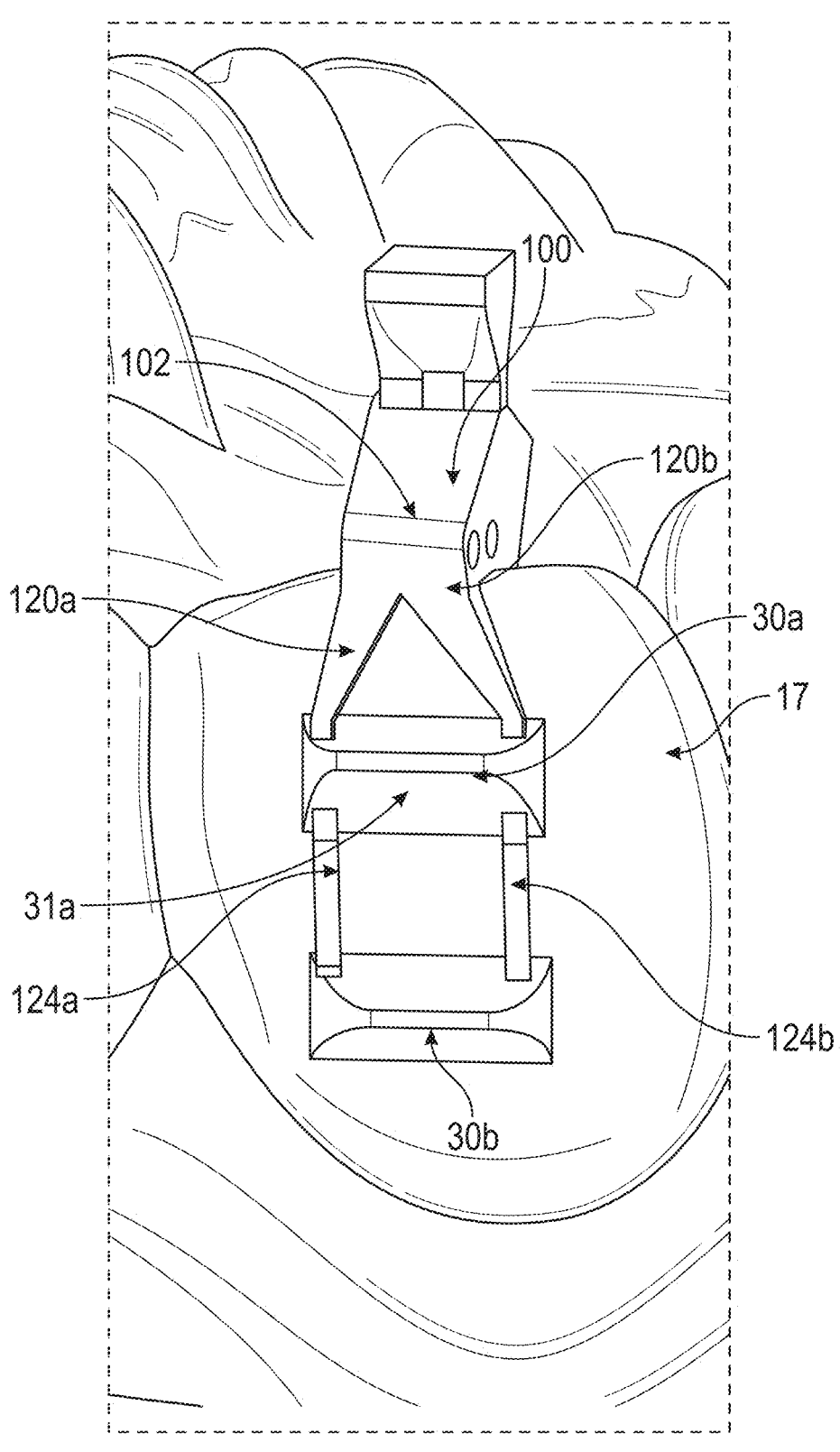
FIG. 26C is a perspective view of a carrier assembly according to embodiments of the present disclosure.

The above depictions and discussions focus primarily on the bonding of a single appliance to a single tooth surface. It is contemplated that more than one appliance may be bonded to a tooth surface according to the concepts of the present disclosure. FIGS. 26A-26C depict various alternatives for bonding multiple appliances 30*a*, 30*b* to a tooth surface 17. For instance and as depicted in FIG. 26A, each such appliance 30*a*, 30*b* may be bonded with a discrete carrier assembly 100*a*, 100*b*. Alternatively, and as depicted in FIG. 26B, each appliance 30*a*, 30*b* may be arranged relative to a single carrier assembly 100 and attached to a single associated coupling arm 120*a*, 120*b*. As yet another alternative, an appliance 30*b* located gingival to a more occlusal appliance 30*a* may be coupled to the body 31*a* via additional, frangible coupling arms 124*a*, 124*b*. Appliance 30*a* remains directly connected to the crane body 102 of the carrier assembly 100 via coupling arms 120*a*, 120*b*. Other combinations and modifications are possible and within the scope of the present disclosure.

The physical mockup 10 may be manufactured in discrete, integrally formed component parts. The two discrete components are typically a) the arch 12, including the mold body 15 and the alignment pins 200 (collectively a fixture model); and b) the carrier assemblies (100, 300). In other implementations, for example, the arch may be constructed with apertures for receipt of preformed alignment pins. As another alternative, the arch 12, mold body 15, alignment pins 200, crane body (102, 302), and coupling arms (120, 320) may be integrally formed as a single piece, with an appliance subsequently fixed relative to the coupling arms and appliance bonding surface.

Any component of the physical mockup 10 may be manufactured by additive manufacturing. Accordingly, the position of the carrier assembly and alignment pin relative to the dental arch 12 can be determined by computer aid and manual assembly tolerances can be avoided. Examples of suitable additive manufacturing processes include solid freeform fabrication such as 3D printing processes, stereolithography methods, fused deposition modeling, laminated object manufacturing, laser engineered net shaping, selective laser sintering, shape deposition manufacturing, selective laser melting, and solid ground curing.

A physical mockup, and any or all components thereof, can be made from the full range of 3D printed materials, molded polymeric material or CAD/CAM shaped polymeric materials having certain desired strength, flexibility, translucency, or color. For example, the material can be polymeric material that may be transparent, translucent, or opaque. In some embodiments, clear or substantially transparent polymeric material that may include, for example, one or more of amorphous thermoplastic polymers, semi-crystalline thermoplastic polymers, transparent thermoplastic polymers, and thermoset polymers. Thermoplastics can be chosen from polycarbonate, thermoplastic polyurethane, acrylic, polysulfone, polyprolylene, polypropylene/ethylene copolymer, cyclic olefin polymer/copolymer, poly-4-methyl-1pentene or polyester/polycarbonate copolymer, styrenic polymeric materials, polyamide, polymethylpentene, polyetheretherketone and combinations thereof. In another embodiment, the body material may be chosen from clear or substantially transparent semi-crystalline thermoplastic, crystalline thermoplastics and composites, such as polyamide, polyethylene terephthalate, polybutylene terephthalate, polyester/polycarbonate copolymer, polyolefin, cyclic olefin polymer, styrenic copolymer, polyetherimide, polyetheretherketone, polyethersulfone, polytrimethylene terephthalate, and mixtures and combinations thereof. In some embodiments, the body material is a polymeric material chosen from polyethylene terephthalate, polyethylene terephthalate glycol, poly cyclohexylenedimethylene terephthalate glycol, and mixtures and combinations thereof. In additional embodiments thermoset polymers include acrylics, urethanes, esters, silicones, thiolenes, epoxies, olefin metathesis and combinations thereof.

In certain presently preferred circumstances, the carrier assemblies are integrally formed as a unitary component as part of an additive manufacturing process or injection molding process. The carrier assemblies of the present disclosure may be made of metal (such as alloys of stainless steel or other metallic materials), ceramic materials (including monocrystalline and polycrystalline light-transmitting ceramics) and polymeric materials (such as fiber-reinforced polycarbonate). Suitable ceramic materials are described, for example, in U.S. Pat. No. 6,648,638 (Castro et al.). Suitable materials for use in additive manufacturing may include, but are not limited to, materials described in International Publication Nos. WO 2020/104873 (Chakraborty et al.), WO 2019/048963 (Parkar et al.), WO 2018/231583 (Herrmann et al.), WO 2016/191534 (Mayr et al.), WO 2016/191162 (Mayr et al.), and WO 2014/078537 (Sun et al.). Other material iterations and combinations are also possible.

Under presently advantageous circumstances, the carrier assembly, including the appliance. may be formed from a curable composition primarily featured for creating certain dental crowns. The curable composition includes a resin matrix comprising: polymerizable (meth)acrylate(s) not comprising a urethane moiety, polymerizable urethane (meth)acrylate(s), filler including nanocluster(s), and an initiator system. Such compositions include a viscosity below 150 Pa*s at 23° C. and a shear rate of 1 s$^{-1}$ and do not include a softener in an amount of more than 5 wt. %. The composition, in greater detail, may comprise the polymerizable (meth)acrylate(s) not comprising a urethane moiety in an amount of 40 to 85 wt. %, polymerizable urethane(meth) acrylate(s) in an amount from 1 to 35 wt. %, nanocluster in an amount of 5 to 40 wt. %, fumed silica in an amount of 0.5 to 5 wt. %, photoinitiator in an amount of 0.01 to 3 wt. %, and organic dye in an amount of 0.001 to 0.5 wt. %.

Such curable compositions can be characterized by a combination of specific properties such as high mechanical strength, high fracture resistance and high aesthetics including stain resistance. The cured article has typically the following properties alone or in combination: 1) flexural strength: 50 to 200 MPa or 80 to 150 MPa determined according to ISO 4049:2009 using a test bar having the dimensions 6*4*25 mm, while 6 mm is the width of the test bar; 2) E-modulus 1,000 to 4,000 MPa determined according DIN EN 843-2:2007 using the flexural strength method, while calculation of the modulus is done in the range of 20% and 50% of maximum force of the samples; and 3) impact strength: 5 to 15 KJ/m2 determined according to DIN 53453:175-05. Further details regarding these compositions may be found in European Patent No. 3638189 (Herrmann et al.). Other suitable compositions for additive manufacturing include, for example, a composition comprising a (meth) acrylate not comprising a urethane moiety, a urethane (meth)

acrylate, photo-initiator, additives, discrete filler particles having an average particle size in the range of 10 to 40 nm and having been surface treated with a silane surface treating agent selected from a silane surface treating agent comprising a (meth)acrylate moiety, a silane surface treating agent not comprising a (meth)acrylate moiety, and a mixture of both, the discrete filler particles being present in an amount of 20 wt. % or more, the curable composition not comprising the following components alone or in combination: aggregates of nano-sized particles, agglomerates of nano-sized particles, fumed silica, each in an amount of 2 wt. % or more, wt. % with respect to the whole composition. The cured article has typically the following properties alone or in combination: 1) flexural strength: 50 to 200 MPa, determined according to ISO 4049(2019); 2) E-modulus: 1 to 4 GPa, determined according to DIN EN 843-2:2007. Further details on such compositions may be found, for example, in co-owned application European Patent Application No. 22186138.8 entitled "Curable Composition for Producing Orthodontic Attachments", filed Jul. 21, 2022.

Commercially available resins suitable for appliances also include those listed below in Table 1:

TABLE 1

Exemplary Suitable Resins for Additively
Manufacturing Appliances

| Product name | Manufacturer |
| --- | --- |
| VarseoSmile Temp | BEGO USA, Inc. (Lincoln, RI) |
| GC Temp PRINT (light) | GC America (Alsip, IL) |
| GC Temp PRINT | GC America |
| IMPRIMO LC Temp | Scheu Dental Group GmbH (Iserlohn, Germany) |
| IMPRIMO LC Temp lt. | ScheuDental |
| FREEPRINT temp UV | Detax GmbH (Ettlingen, Germany) |
| Temporary Crown&Bridge | SprintRay Inc. (Los Angeles, CA) |
| NextDent C&B MFH | NextDent B.V. (The Netherlands) |
| saremco print CROWNTEC | SAREMCO Dental AG. (Rebstein, Switzerland) |
| Optiprint temp | dentona AG (Dortmund, Germany) |
| Denture Teeth Resin | Formlabs (Somerville, MA) |
| VarseoSmile Crown plus | BEGO USA, Inc. |

The appliance, crane body, and coupling arms can be formed of the same material or can be formed of different materials through one or more manufacturing processes. For example, a photopolymerizable material used to form a carrier assembly optionally includes a first composition and a second composition and making carrier assembly accordingly includes selectively curing the first composition to form the appliance 30 and selectively curing the second composition to form coupling arms and/or crane body. In some examples, the appliance may be formed of a material that has a higher ultimate strength than a material of which coupling arms are formed.

In some examples, the methods of the present disclosure may include a three-dimensional (3D) printing step in the creation of the model dental arch 12, the alignment pins 200, the carrier assembly (100, 300), the appliance 30, or any combination thereof. Three-dimensional printing may include, for example, forming the article from a plurality of layers of a photopolymerizable material described herein by selectively curing the photopolymerizable material in a layer-by-layer manner. In some examples, additive manufactured article may include a plurality of materials bonded to each other. The layers of the photopolymerizable material can be deposited according to an image of the three-dimensional article in a computer readable format. For example, the photopolymerizable material may be deposited according to preselected CAD parameters (e.g., a data file). In some examples, the photopolymerizable material is cured using actinic radiation, such as UV radiation, e-beam radiation, visible radiation, or combinations thereof.

The foregoing techniques can be repeated a selected number of times to provide the 3D article. For example, in some cases, this process can be repeated "n" number of times. Further, it is to be understood that one or more steps of a method described herein, such as a step of selectively applying energy to a layer of photopolymerizable composition, can be carried out according to an image of the 3D article in a computer-readable format. Suitable printers include the VIPER, from 3D Systems, the D30II or D90, available from Rapid Shape, Heimsheim, Germany; and the MOONRAY, available from SprintRay, Los Angeles, California.

Other techniques for three-dimensional manufacturing may be suitably adapted to the techniques described herein. More generally, three-dimensional fabrication techniques continue to become available and may be adapted to use with photopolymerizable compositions described herein, provided they offer compatible fabrication viscosities and resolutions for the specified article properties, for instance continuous additive manufacturing in which a build plate is (essentially) continuously moved through a vat of photopolymerizable material. In certain examples, an apparatus adapted to be used in a continuous mode may be employed, such as an apparatus commercially available from Carbon 3D, Inc. (Redwood City, CA), for instance as described in U.S. Pat. Nos. 9,205,601 and 9,360,757 (both to DeSimone et al.). For example, in any method described above, selective curing of a photopolymerizable material includes continuous photopolymerization of at least one of the first portion of the article or the second portion of the article. Further details of methods for additive manufacturing may be found in International Publication No. 2021/130624 (Cinader et al.), entitled Preformed Orthodontic Attachments.

Designing the Physical Mockup & Carrier Assemblies

The manufacturing of the physical mockup is typically based on a virtual mockup prepared in a computer system. Such a virtual mockup preferably corresponds to a mathematical representation of a three-dimensional shape which can be processed by a computer, for example by a CAD system. Further the virtual mockup is preferably available in the form of computer data which can be used to control an additive manufacturing machine for manufacturing the physical mockup as defined by the virtual mockup. The virtual mockup may be designed or generated from superimposing or merging a virtual dental arch of a patient with a set of virtual appliances, crane bodies, and alignment pins as further described below.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine. The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Often, computer readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a tablet, a smart phone, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to computer, such as another networked computer. Data can be communicated directly to an application, e.g., on a mobile device and/or directly to a cloud platform system via cellular connection, a Wi-Fi router or a hub.

In general, and as depicted in FIG. 13, the process 400 for designing a mockup begins with the acquisition of a virtual model of a patient's dental arch (step 410). The virtual dental arch model may be modified to create a solid virtual mold body (step 420). A plan for treatment may be accessed or generated based at least in part on the virtual model of the patient's dental arch (step 430). Virtual appliances are obtained and arranged on the teeth at treatment relevant locations, according to the treatment plan (step 440). Alignment pins and crane bodies are then placed on the arch relative to location of each appliance (step 450). One or more coupling arms are then extruded between the body of the appliance and the crane body (step 460). Optionally, the extrusion may occur at a draft angle relative to the body. The mold body and alignment pins are combined to create a virtual fixture model (step 480), while the crane body, coupling arms, and appliances are combined to form the carrier assemblies (step 470). The fixture model and carrier assemblies are maintained as separate objects for fabrication (step 490). Individual aspects of the process are discussed in further detail below.

The treatment planning step 430 typically includes receiving information regarding the orthodontic condition of a patient and/or practitioner preferences for treatment and subsequently generating an original treatment plan for repositioning the patient's teeth. This original treatment plan may represent the beginning of orthodontic treatment or may represent a new phase of treatment commenced after the patient has undergone some orthodontic or dental treatment. The treatment plan typically includes one or more phases of treatment depending on the desired treatment modality; with CTAs, the treatment plan will include multiple phases of treatment, each corresponding to an arrangement of teeth.

For traditional braces, the treatment plan may include a single phase, with a single target arrangement. The treatment plan is typically presented to a practitioner for modification and/or approval, though this is not strictly necessary. Appliances can be generated or selected based on the approved treatment plan, which will be provided to the practitioner and ultimately administered to the patient.

The process 400 can be used to generate mockups at any stage of the treatment. In one example, a mockup may be generated for each phase of the treatment (and attendant placement of appliances) at the commencement of treatment. In other examples, the creation of mockups may be phased to allow for confirmation of the patient's treatment progress, such that a new or updated model of the patient's dentition is acquired before beginning work on a subsequent mockup. At various stages, the process for generating the original treatment plan can include interaction with the treating practitioner responsible for the treatment of the patient. Practitioner interaction can be implemented using the network platform and any connected participant.

As an initial step in creating a virtual model of the patient's dental arch, a mold or a scan of patient's teeth (and potentially mouth tissue) is acquired (Step 410). This generally involves creating a representation of the patient's teeth and gums, and may involve taking wax bites, using impression materials, casting, direct contact scanning, x-ray imaging, tomographic imaging, sonographic imaging, and other techniques for obtaining information about the position and structure of the teeth, jaws, gums and other orthodontically relevant tissue. A digital data set can be derived from this data that represents a current arrangement of the patient's teeth and other tissues. A virtual model of the dentition may then be re-constructed based on the digital data.

One increasingly common technique for acquiring at least a portion of the initial arrangement (or any subsequent arrangement) is digital scanning. A virtual dental model representing the patient's dental structure can be captured using a digital intraoral scan or by digitally scanning an impression or other physical dental model. Scanning devices which allow for providing a virtual dental arch in digital data form are intra-oral scanners or intra-oral contact probes, such as the True Definition™ Scanner, available from Midmark or the TRIOS scanner available from 3Shape A/S. As another option, the digital data file may be obtained by scanning an impression of the patient's teeth. As still another option, the digital data may be obtained by scanning a physical model of the patient's teeth. The model used for scanning may be made by pouring a casting material (such as plaster of Paris or epoxy resin) into an impression of the patient's teeth and allowing the casting material to cure. Any suitable scanning technique may be used for scanning the model, such as X-ray, laser, computed tomography (CT), and magnetic resonance imaging.

The digital data may be "cleansed" by removing any data points that represent clear error. For example, files in STL format representing a tooth surface that include a data point significantly outside the normal expected geometrical relationship of adjacent data points could be fixed by STL-handling software to remove the erroneous data point. In addition, tooth data points that are missing could be added by STL-handling software to create realistic, smoothly curved tooth shapes. Alternatively, or in addition to, the data cleansing may be carried out on the data file before conversion of the data to an STL file. As an additional option, data may also be obtained of hidden features of the patient, such as the roots of the patient's teeth, the interproximal regions, and the jaw structure. For example, CT scanning techniques may be used to obtain data representative of the patient's entire tooth structure including the roots. The data obtained by CT scanning may then be "stitched together" with other data obtained by scanning the crowns of the patient's teeth with another scanning technique to provide a more comprehensive virtual representation.

Dentition surfaces may be segmented to produce one or more discrete, movable 3D tooth object models representing individual teeth. The tooth models may also be separated from the gingiva into separate objects. Segmentation allows a user to characterize and manipulate the teeth arrangement as a set of individual objects. Advantageously, the computer may derive diagnostic information such as arch length, bite setting, interstitial spacing between adjacent teeth, and American Board of Orthodontics (ABO) objective grading from these models.

A tooth coordinate system, defined by coordinate axes, can be defined for each discrete tooth surface in the virtual dental arch. The coordinate system may include a mesial-distal axis, a buccolabial-lingual axis, and an occlusal gingival axis for each tooth, with each axis computed as perpendicular to the other two axes. The coordinate system may be defined using computed or selected landmarks. Alternatively, the coordinate system may be created by defining a point on a virtual tooth, receiving axis input data that defines first and second axes associated with the virtual tooth, computing a substantially normal vector for a portion of the tooth surface surrounding the point, and computing the tooth coordinate system based on the axis input and the computed vector. Such methods, and well as other exemplary methods for creating tooth coordinate systems, are exemplified in U.S. Pat. No. 9,622,835 (Raby et al.). The tooth coordinate system allows for various modifications to one or more virtual teeth associated with the coordinate system. Aspects that may be adjusted or modified for each tooth include torque, tip, $1^{st}$ order rotation, mesial-distal movement (with or without interproximal reduction (IPR)), occlusal-gingival translation, and buccolabial-lingual translation. Each of these aspects relate to movement in one of the six degrees of freedom defined by the coordinate axes of the respective tooth surface. Such modification also includes the positioning and/or attachment of a virtual analog to a tooth.

One or both of the occlusal and midsagittal planes of the dentition may be specified for the virtual model. The occlusal plane is an imaginary surface that passes through the occlusion of the teeth and is generally approximated by a plane. The midsagittal plane is an imaginary plane passing longitudinally through the middle of the dental arch, dividing it into left and right halves. An initial approximation of the occlusal plane may be based on the shapes or coordinate systems of some or all of the tooth surfaces belonging to an individual arch of the dentition. For example, the occlusal plane may be defined by identifying three points that tangentially contact a plane superimposed on the dentition. For a given dental arch, the three points generally include at least one contact point from a left molar, one contact point from a right molar, and one contact point from a central or lateral tooth. In another embodiment, the occlusal plane is defined as a best-fit plane to the points representing the origins of the tooth coordinate systems, as previously defined. In effect, this plane represents the average of these origins, which are generally positioned at the incisal edges, single cusp tips, or buccal cusp tips of the teeth. The occlusal plane may also be used to calculate and define the vertical axis of the model. The vertical axis resides in a plane perpendicular to occlusal plane and can be used to gauge the orientation of appliances on the tooth and control the orientation of the crane bodies and alignment pins.

Similarly, the midsagittal plane may be derived based on the shape of the archform according to the coordinate systems of the tooth surfaces of the dentition. Manual adjustments of the occlusal and midsagittal planes to the locations and/or orientations relative to the dentition surface can be made as desired. Area below the teeth and/or gingiva may be extruded to a planar surface to create the virtual support body (step 420). Typically, the extrusion is performed along a path generally normal to the occlusal plane to a common plane spaced about 2 to about 30 mm from the either the occlusal plane or the gingival most point on the model before creation of the support body, as desired. The creation of the support body may be accomplished before or after the virtual appliances have been placed on the arch, but preferably before the addition of the alignment pins or crane bodies.

The method then proceeds to setting up a treatment plan for the modifying the dental arch (step 430). The treatment plan will be used to specify the dimensions, shapes, identity, and location of the appliances. The steps of the process for generating a treatment plan can be implemented as computer program modules for execution on one or more computer systems. Modeling software can provide a user interface that allows for manipulating digital representations of the teeth in 3D space relative to the digital representation of the dental arch of the patient. The treating professional generates treatment information, such as by selecting indications of the final positions of individual teeth of the patient, duration of a respective stage of treatment, or number of treatment stages, the direction or magnitude of forces on the teeth of the patient during a stage of treatment, or the like. Systems and methods for generating an orthodontic treatment plan can be found, for example, in U.S. Pat. No. 7,435,083 (Chisti et al.), U.S. Pat. No. 7,134,874 (Chisti et al.), U.S. Patent Publication Nos. 2009/0286196 (Wen et al.); 2010/0260405 (Cinader), U.S. Pat. No. 9,259,295 (Christoff et al.) and International Publication No. WO2021/245480 and WO2021/245484 (Cunliffe et al.). Further details on software and processes that may be used to derive a target dental arrangement are disclosed, e.g., in U.S. Pat. No. 6,739,870 (Lai et al.). U.S. Pat. Nos. 8,194,067; 7,291,011; 7,354,268; 7,869,983 and 7,726,968 (Raby et al.).

The treatment plan may be stored with other patient information in a patient dental health record (DHR). The DHR may be filled in via information from the patient and/or from treating professionals involved in the patient's care. For example, the DHR can include, but is not limited to including, patient medical information items including x-rays, 3D models of a dental patient's dentition, and/or pictures of the patient's smile. The DHR may also include other medical information, including current and past pharmaceutical prescriptions, health history, genomic information, etc. For patient identifying information, the DHR may include patient name, address, contact information (e.g., telephone number, fax number, electronic mail address), date of birth. gender, and/or dental insurance, among others. The DHR can also include personal treatment goals of the patient (e.g., gap closure, restoration, whitening). At each stage of treatment, the DHR may be updated to reflect treatment progress and include new 3D models of the patient's then-current dentition to aid in diagnosis and further treatment planning.

Desired final positions of the teeth, or tooth positions that are desired and/or intended end result of orthodontic treatment, can be received, e.g., from a treating professional in the form of a descriptive prescription, can be calculated using basic orthodontic prescriptions, or can be extrapolated computationally from a clinical prescription. With a specification of the desired final positions of the teeth and a digital representation of the teeth themselves, the final position and surface geometry of each tooth can be specified to form a complete model of the teeth at the desired end of treatment or treatment stage. The result of this step is a set of digital data structures that represents a desired and/or orthodontically correct repositioning of the modeled teeth relative to presumed-stable tissue. The teeth and surrounding tissue can both be represented as digital data.

Having both a beginning position and a final target position for each tooth, the process can next define a treatment path or tooth path for the motion of each tooth. This can include defining a plurality of planned successive tooth arrangements for moving teeth along a treatment path from an initial arrangement to a selected final arrangement. In one embodiment, the tooth paths are optimized in the aggregate so that the teeth are moved in the most efficient and clinically acceptable fashion to bring the teeth from their initial positions to their desired final positions. A movement pathway for each tooth between a beginning position and a desired final position may be calculated based on a number of parameters, including the total distance of tooth movement, the difficulty in moving the teeth (e.g., based on the surrounding structures, the types and locations of teeth being moved, etc.) and other patient-specific or practitioner-specific data that may be provided. Based on this sort of information, a user or a computer program may generate an appropriate number of intermediary steps (corresponding to a number of treatment steps). In some variations, the user may specify a number of steps, and the software can map different appliance configurations accordingly.

If the movement path requires that the teeth move more than a predetermined amount (e.g., 0.3 mm or less in X or Y translation), then the movement path may be divided up into multiple steps, where each step corresponds to a separate target arrangement. The predetermined amount is generally the amount that an appliance or appliance configuration can move a tooth in a particular direction in the time required for each treatment step. Each appliance configuration corresponds to a planned successive arrangement of the teeth and represents a step along the treatment path for the patient. For example, the steps can be defined and calculated so that each discrete position can follow by straight-line tooth movement or simple rotation from the tooth positions achieved by the preceding discrete step and so that the amount of repositioning required at each step involves an orthodontically optimal amount of force on the patient's dentition. The treatment plan can include a plurality of phases (1 through n) where at time=0, the initial treatment plan begins.

The user/treating professional may be offered several candidate treatment plans for selection as the original treatment plan. The candidate treatment plans can include simulations of treatment using only photographs supplied by the patient, or based on more comprehensive dental imaging (e.g., x-rays, digital scan, etc.) Candidate treatment plans may be generated using a rule-based approach, an optimization-based approach, a machine learning-based approach, or specific preferences (either patient or practitioner) as outlined in WO2021/245484 (Cunliffe et al.).

If the user or other professional is not entirely satisfied with the final predicted positions of the teeth, new final positions of the virtual teeth may be computed and displayed based on revised positions of either the virtual appliances or the virtual teeth. These steps can be repeated as many times as desired until all parties are satisfied. Data representing the selected positions of the teeth. along with identification data for each appliance (such as appliance type and bonding location) tooth identification data (such as tooth type and location in the oral cavity) and patient data (such as name and birth date, or a patient identification number) can be recorded in the DHR for further processing.

The methods of creating a mockup next proceeds to the step of obtaining and locating the virtual appliances relative to the virtual dental arch according to the desired treatment plan(s). Though discussion proceeds on the basis of the virtual appliance being a virtual attachment or virtual bracket, one skilled in the art will understand that other virtual appliances suitable for bonding to the surfaces of the teeth (e.g., molar tubes, buttons, cleats, sheaths, bite ramps, bite blocks, etc.) may be accessed and coupled to the virtual dental arch. In an exemplary implementation, the virtual appliance is obtained based on a physical appliance standardized by prescription and available "off-the-shelf". The person skilled in the art will however recognize that the present methods and systems may likewise be used in combination with appliances that may be customized for each tooth of each patient, or a combination of custom and standard appliances. In one implementation, virtual appliances can be selected from a library of pre-existing appliance constructions. Such fully-constructed appliances can be stored and accessible as CAD or STL (Standard Tessellation Language) files, for example. Appliances may be stored as rendered in an accessible library or generated subsequent to retrieval based on an intended location of the appliance on the dental arch. The virtual appliance may be placed on the virtual arch unmodified (i.e., that has not undergone any other shape adjustments) or may be modified after such placement.

The desired dimensions, shapes, and locations for the appliance on the model can be determined in any of a number of ways. Different considerations may influence the dimensions, shapes, and locations for orthodontic attachment compared to orthodontic brackets. For example, the final positions of individual teeth of the patient, duration of a respective stage of treatment, or number of treatment stages may affect the direction or magnitude of forces on the teeth of the patient at each stage of treatment. In some examples, orthodontic attachments may be used during at least one, but fewer than all stages of treatment. In some examples, the movements to be achieved, the forces applied, and the engagement of each tooth by each CTA may be determined by selecting the dimensions, shapes, and positions of an orthodontic attachment based on the treatment plan. Such analysis can be accomplished one or more times for a treatment plan. For example, it would be possible to have different attachments for each stage or possibly more, if desired. However, in many instances the attachment type, position, and/or orientation may be changed a few times during the treatment plan.

As another example, the attachments may be shaped and positioned to reduce intrusion of the tongue and/or the inside of the cheeks, particularly when a CTA is not in the mouth covering the attachments. The attachments also may be shaped and positioned to facilitate removal of the CTA from the teeth by enabling specific directional disengagement of the CTA with the attachments, e.g., which do not compromise the effectiveness of the treatment or retention of the CTA on the teeth. The attachments also may be shaped and positioned to, along with corresponding shells or aperture in the CTA, reduce visibility of the attachments when the CTA is worn by the patient. Through use of virtual modeling, attachments can be virtually tested and the best attachment type, shape, position, and/or orientation can be selected. From such analysis, different physical dental attachment placement apparatuses can be created from the virtual dental attachment placement apparatus data that would be utilized to create the attachments needed for the different stages.

In embodiments where the appliance is an orthodontic bracket, the virtual brackets can be connected to a virtual archwire, and the final positions of the teeth may be computed based on the positions of the brackets and the selected archwire. Assuming the final positions meet with approval, the virtual appliances may be placed at locations corresponding to the virtual brackets. As an alternative to moving appliances, a user may instead define the desired positions of teeth as described above, and the computer may include programming instructions to determine the suitable locations to place the appliances in order to move the teeth to those desired positions. Examples of virtual orthodontic treatment in this manner are disclosed in issued U.S. Pat. No. 6,739,869 (Kopelman et al) and U.S. Pat. No. 7,354,268 (Raby et al.).

As another option, orthodontic appliances may be placed on the virtual arch model based on standards or guidelines from an orthodontic treatment philosophy, such as for example that of Drs. MacLaughlin, Bennett, and Trevisi taught in textbook "Systemized Orthodontic Treatment Mechanics" 1st Edition by Richard P. Mclaughlin BS DDS, John C. Bennett FDS RCS, and Hugo Trevisi DDS. These standards or guidelines for appliance placement may be specific to each tooth in the model, and can call out the position of certain features (an occlusal-gingival height of an archwire slot, for example) with respect to the clinical crown of each tooth. The orthodontic appliances can also be placed in accordance with particular instructions provided by the treating professional. Again, these proposed orthodontic appliance locations are optionally based upon an orthodontic treatment philosophy or other known standards or guidelines in the art. Examples of automatically placing virtual brackets on teeth are described in U.S. Pat. No. 7,210,929 (Raby et al.), U.S. Pat. No. 8,517,727 (Raby et al.) and U.S. Pat. No. 7,940,258 (Stark et al.), all of which are hereby incorporated by reference.

The virtual appliances, whether created by the user or accessed from a virtual library, may be modified according to the treatment plan. In one embodiment, a modification step comprises increasing a three-dimensional volume represented by the virtual appliance by selectively modifying only a portion of the appliance. For example, the modification step may comprise a flattening or reduction of an indentation present in the appliance shape. The modification step may further comprise at least adding a virtual structure to the appliance shape, such as a connection points as described below. Undercuts may be minimized or removed. Further the modification step may comprise optionally reducing the three-dimensional volume by selectively modifying another portion of the appliance. The person skilled in the art will recognize various possibilities for modifying a shape, for example by change of an existing shape, adding or removing a shape, virtually copying, cutting, extending, reducing or another suitable technique. The skilled person will further be able to create a set of virtual appliances according to the treatment plan in any suitable manner.

Figure 14:
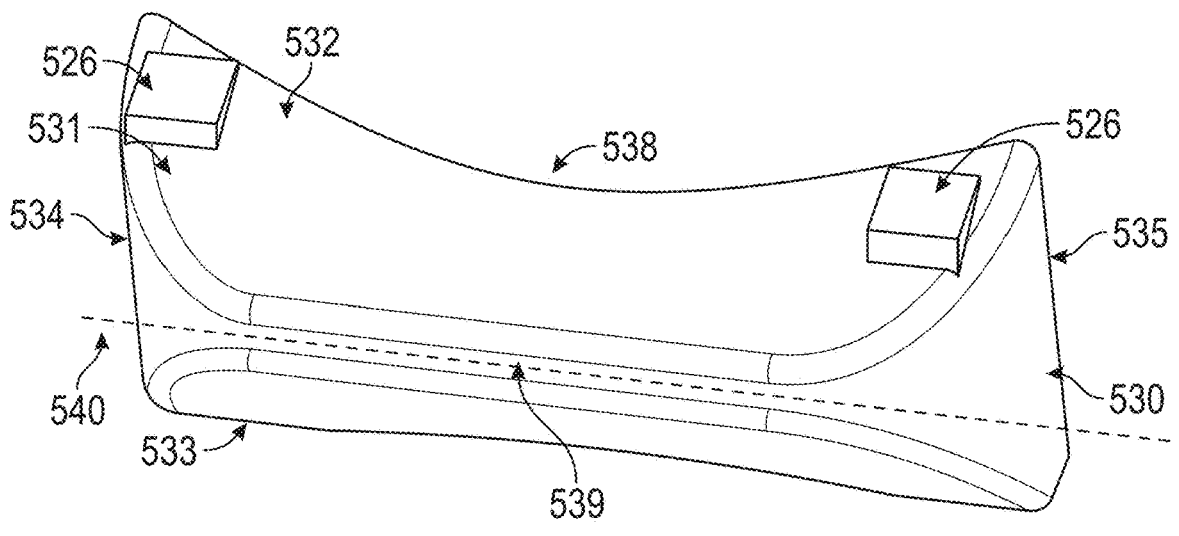
FIG. 14 is a perspective view of a virtual orthodontic appliance in the form of an attachment according to embodiments of the disclosure.

Connection points on the body of the virtual appliance for an eventual coupling arm may be created on the appliance before or after placement. In some implementations, the connection points are stored with the virtual appliance in the library. In other implementations, the connection points may be added during modification of the appliance or after the appliance has been positioned and oriented according to the treatment plan. FIG. 14 depicts a virtual appliance 530 with connection points 526 defined along a long edge 532. Virtual appliance 530 is similar in all respects to physical appliance 30. In presently preferred implementations, the connections 526 are spaced in the direction of the facing surface 539 from an edge of the bonding surface 538, providing adequate clearance for the coupling arms (not shown in FIG. 11) from the bonding tooth surface. The number and location of connection points typically follows the same considerations for coupling arms and can be dictated by at least one of (a) the orientation of the long axis of the appliance relative to an axis perpendicular to the base plane B; (b) the orientation of the long axis relative to vertical axis V; and (c) the dimensions of the appliance 30, all according to the treatment plan. Generally, but not exclusively, an appliance 530 oriented with a long axis 540 within no greater than 35 degrees of parallel to the vertical axis V (or the axis perpendicular to the base plane B) will feature a single connection point 526, while an appliance 530 having a long axis 540 oriented within greater than 35 degrees to 90 degrees of parallel to the vertical axis V (or the axis perpendicular to the base plane B) can include two or more connection points 526. The connection points 526 are typically arranged on one long edge 532, 533 of the body 531 at opposing corners. For carrier assemblies featuring a single coupling arm, the connection is typically arranged on one of the short edges 534, 535 at the occlusal-most point on the body 531 when located on the tooth according to the treatment plan. The connection points 526 have the cross-sectional shape (here, rectangular) generally matching the preferred cross-sectional shape of the eventual coupling arm; this allows the coupling arm to be extruded directly from the body 531 as further explored below.

Figure 15:
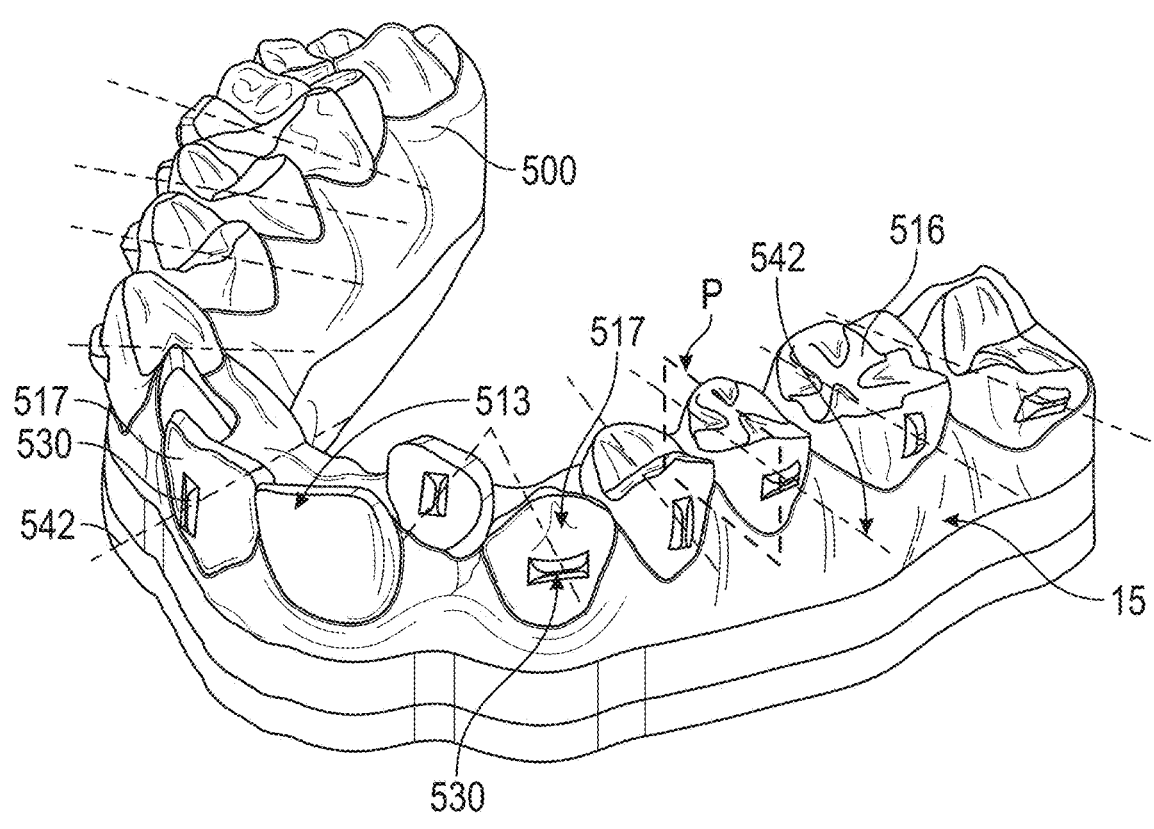
FIG. 15 is a perspective view of a virtual mockup including appliances placed on the virtual teeth according to embodiments of the disclosure.

Turning to FIG. 15, a virtual mold body 500 is depicted with virtual appliances 530 (here having all features of attachments 30) dimensioned, shaped, and located according to the treatment plan on labial tooth surfaces 517 of associated teeth 513. The central axis 542 of each appliance 530 is generally parallel to the base plane B. A vertical plane P for each appliance 530 may be defined by the central axis 542, the base plane B, and an occlusal surface of the associated tooth 513 directly occlusal to the central axis. As described above, the base plane B may be parallel to the occlusal plane, but this is not necessary. The vertical plane P for each appliance may be used to locate and place the remaining elements of a carrier assembly.

At any point in the process after an appliance location has been satisfactorily confirmed, the shape of the appliance perimeter may be used to create a depression in the bonding surface 517. For instance, the virtual attachment model can be modified according to the techniques above to have a uniform cross-sectional shape matching the perimeter of the bonding surface (e.g., the appliance base). This virtual appliance analog may be extruded in dimensions parallel to the central axis with an added offset height (e.g., 100 microns) equivalent to the desired depth of the recess. The analog may be merged with the arch model. The virtual analog can then be Boolean subtracted from the virtual tooth surface, leaving a recess having a shape matching the perimeter shape of the appliance bonding surface and a depth matching the selected offset height. Other methods for creating a depression having the shape of the appliance bonding surface will be apparent to the skilled artisan.

Similar processes may be used to extrude a capillary inhibiting wall, of the type demonstrated in FIGS. 31-33, from the requisite tooth surface (not shown in FIG. 15), which can be added to the virtual mold body before or after the appliances are placed. Alternatively, a virtual capillary inhibiting wall may be formed independent from the model and subsequently merged therewith.

Figure 16:
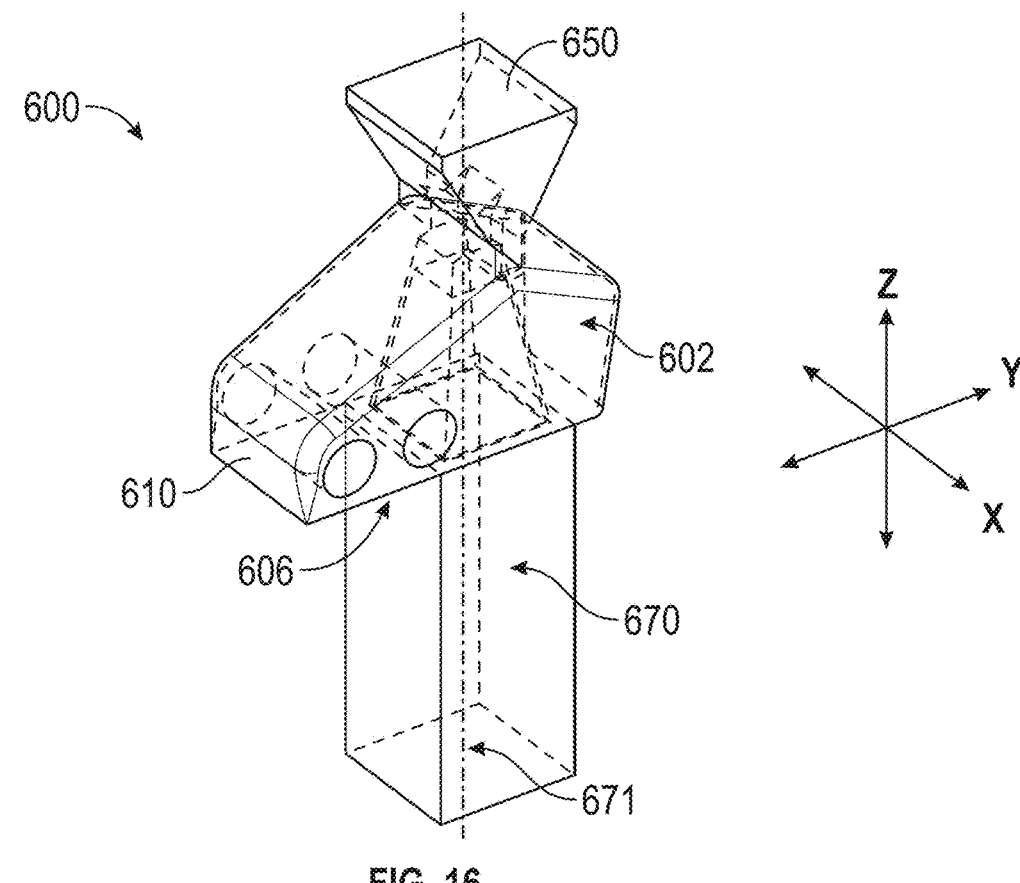
FIG. 16 is a perspective view of a virtual crane assembly including a crane body and alignment pin according to embodiments of the disclosure.

With at least one appliance placed at the planned position and orientation on the virtual arch, the alignment pins and crane bodies may be arranged relative to each such appliance. The crane body 602 and alignment pin 670 may be arranged as a combined virtual crane assembly 600, as seen in FIG. 16. The crane body 602 and alignment pin 670 in the combined assembly 600 can include any and all of the individual features of crane bodies 100, 300 and alignment pin 200, as described above. Such assemblies 600 can be stored and accessible as CAD or STL files, for example, similar to the virtual appliances 530.

The combined crane assembly 600 is arranged according to a Cartesian coordinate system, with the facing surface 606 extending from the alignment pin 670 towards the front edge 610 in the Y-direction, the alignment pin 670) and grasping element 650 extending in the Z-direction (parallel to the vertical axis 671 of the alignment pin), and the width of the crane body 602 along the X-direction. As arranged on the alignment pin 670), the facing surface 606 extends a sufficient distance from the front edge surface 678 of the alignment pin to allow for the crane body 602 to overhang the appliance 530 and tooth surface 517. In an exemplary implementation, this overhang of the facing surface 606 relative to the alignment pin edge 678 is about 1.4 mm.

The combined crane assembly 600 may be accessed from a virtual library or may be created by adding separate, virtual crane body objects to associated virtual alignment pin objects. The combined crane assemblies may be categorized in the virtual library by, e.g., appliance type, appliance geometry, intended bonding surface, and/or corresponding bonding location on the dental arch (e.g., posterior vs. anterior). Storing the combined crane assembly in virtual library can, in certain circumstances, allow for a standardized crane assembly having substantially similar geometry to be used for each tooth receiving an appliance. A standardized crane assembly can allow for more repeatable and reliable manufacturing (e.g., 3D printing) of the carrier assemblies, along with more repeatable placement of the attachment using the transfer apparatuses as embodied herein.

Either or both of the crane body and alignment pin may be modified relative to the geometry of the components accessed from the virtual library. For instance, any aspect of the combined assembly may be enlarged to account for larger appliances, larger teeth in the patient's arch, or particularly inclined bonding teeth. In another example, any aspect of the virtual assembly can be shrunk to accommodate a younger patient and/or smaller teeth. In other implementations envisioned by the present inventors, the selected crane body may be arranged on the dental arch independent of the alignment pin, and vice versa; the remaining discussion assumes the combined crane assembly 600 is used to initially position both constituent elements.

For each tooth including an appliance 530, a crane assembly 600 can be arranged near the occlusal surface 516 of the tooth. A virtual arch including arranged crane assemblies 600 and appliances 530 arranged for each of the bonding teeth is depicted if FIG. 17. Each crane assembly is preferably, but not exclusively, arranged according to one or more standard placement expectations. Such expectations can include 1) the Y-axis of the combined crane assembly is aligned substantially parallel with the central axis 542 of the appliance; 2) the midpoint of the crane body 602 along the X-axis is aligned with vertical appliance plane P; 3) the facing surface 606 is spaced a sufficient distance (e.g., 0.2 mm) from the occlusal surfaces 516 that the head and shoulder of the alignment pin 670 fully protrude from the said occlusal surfaces; and 4) the Z-axis (including vertical axis 671 of the alignment pin) is arranged normal to at least one of the base plane B of the mold body 500 or the occlusal plane of the dental arch 512; 6) the front edge 678 of the alignment pin 671 is set back from the apex of the bonding tooth surface 517; and 7) the front edge 678 is arranged substantially parallel to the long axis 540 of the appliance 530. Following one or more of the placement expectations for each combined crane assembly can allow for more rapid construction and easier user confirmation of the correct placement.

Figure 18:
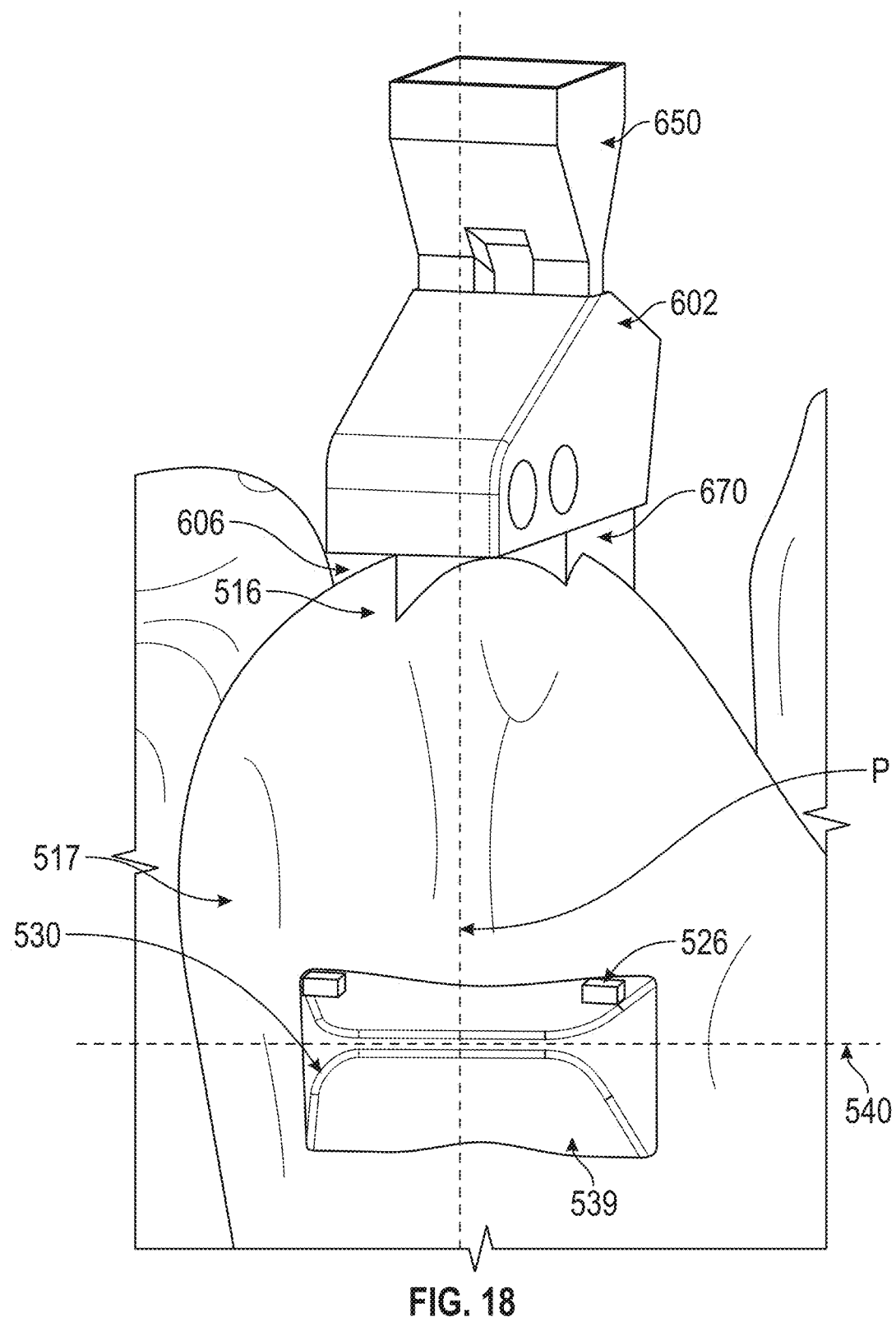
FIG. 18 is an enlarged perspective view of a crane assembly arranged above an appliance on a bonding tooth the virtual mockup of FIG. 17.
Figures 19, 20:
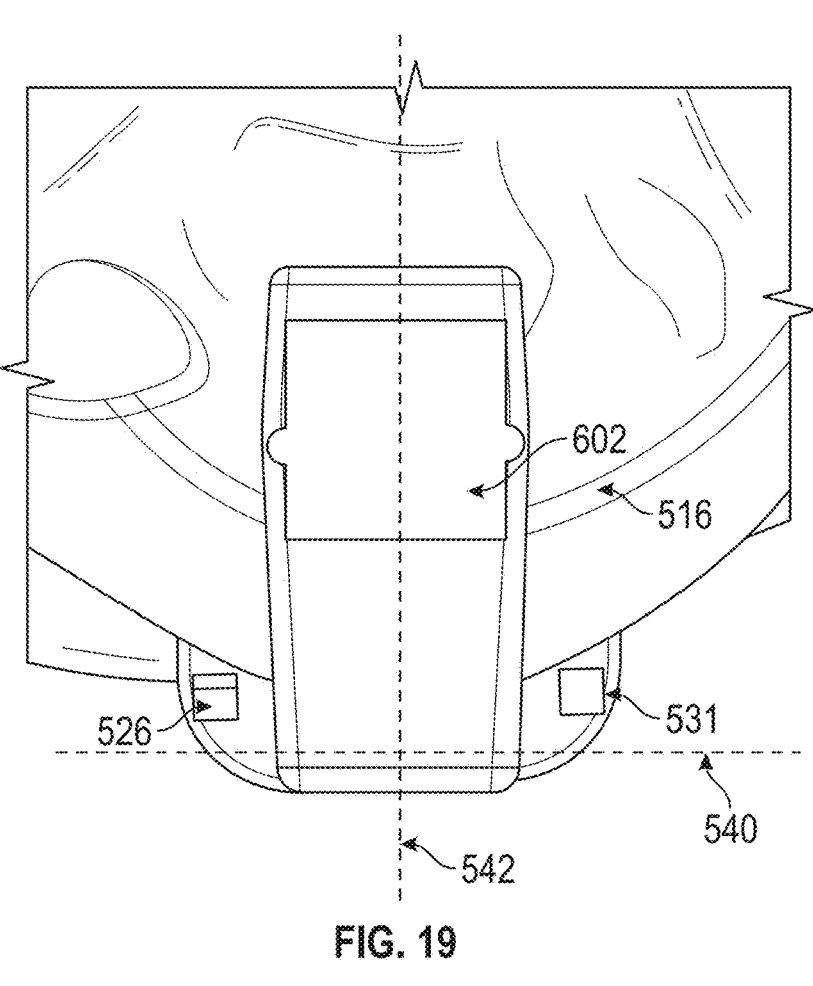
FIG. 19 is an occlusal view of the crane assembly and appliance of FIG. 18.
FIG. 20 is a schematic cross-sectional view of the crane assembly and appliance of FIGS. 18 and 19.

FIGS. 18-20 depict a combined crane assembly 600 located on the occlusal surface 516 of the tooth 513 according to the above placement expectations. As shown in FIG. 18, the mid-point of the crane body 602 along the X-axis is centered on the plane P. The facing surface 606 and a portion of the alignment pin 670 including the head 672 and shoulder 674 (shown clearly in FIG. 20) project in a vertical direction from the occlusal surface 516 such that the facing surface 606 does not contact the tooth. The Z-axis of the assembly 600 is substantially parallel to if now within the plane P and normal to the base plane of the mold body (not shown). The crane body 602 is located with its Y-axis aligned with the central axis 542 of the appliance 530, and the front edge 678 of the alignment pin 670 is substantially parallel with the long axis 540 (See FIG. 19). The alignment of the Y-axis and central axis 542 tends to place the crane body 602 symmetrically at the mesio-distal center of the appliance body 531.

The front edge 678 of the alignment pin 670 is set back from the bonding tooth surface 517, as depicted in the cross-sectional view of FIG. 20. The set-back distance is sufficient for the alignment pin 670 to avoid intersecting the virtual tooth surface and to place the front edge 610 of the crane body 602 in a facial direction from the facing surface 639 of appliance 630. Placing the front edge 610 facial (or lingual, if the bonding surface is lingual) to the facing surface 639 allows the coupling arms (not shown) to better avoid contacting the tooth surface 517. This arrangement allows the path of travel for the coupling arms to essentially come back to the tooth surface 517. A sufficient set back distance, for example, may be at least 0.6 mm and no greater than 1.0 mm.

Also as shown in FIG. 20, the head 672 and shoulder 674 of the alignment pin 670 are located above the occlusal cusps 516 at a sufficient height such that the facing surface 606 of the carrier will not contact or interfere with occlusal surface 516 of the tooth. The height may be determined relative to at least one of the tooth surfaces 516, the base plane, and the occlusal plane. For example, the crane assembly 600 may be located such that the shoulder 674 rises at least 0.2 mm above the occlusal surface 516. Additionally or alternatively, the combined assembly 600 can be arranged such that the facing surface 606 is rises at least 0.2 mm above the occlusal plane.

Figure 17:
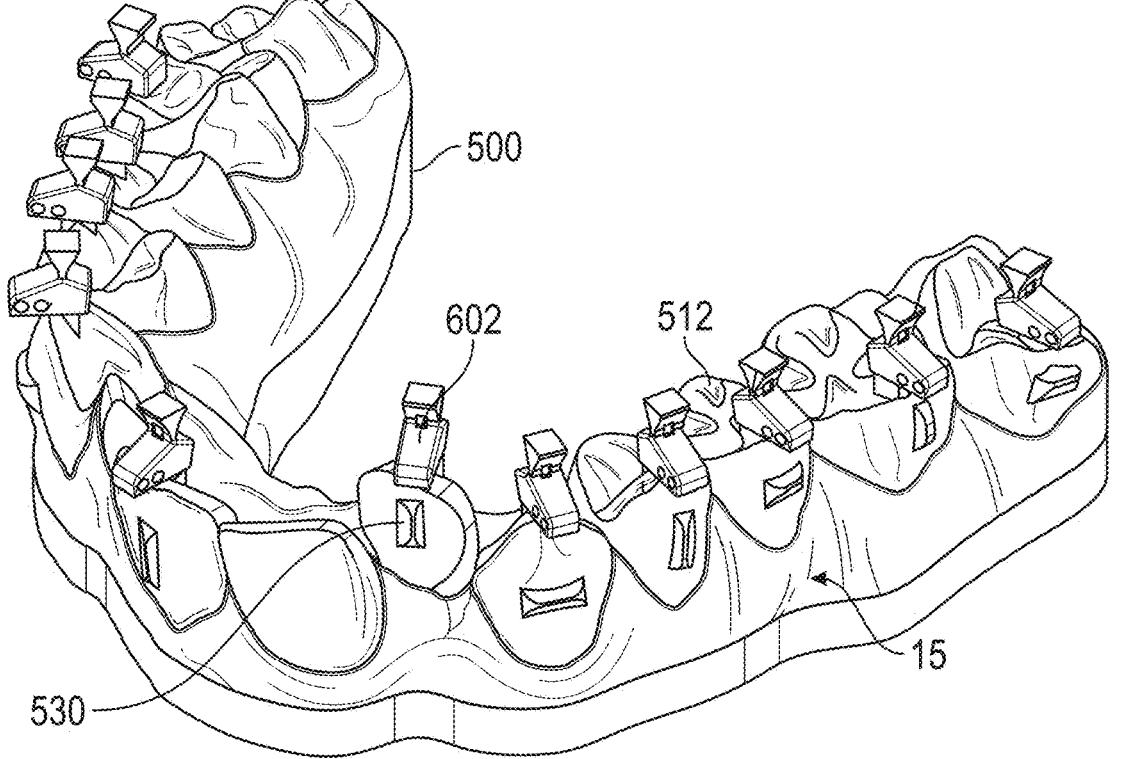
FIG. 17 is a perspective view of a virtual mockup of FIG. 15 including crane assemblies arranged relative to bonding teeth.

The process for locating the crane body and alignment pin, as combined crane assembly 600 or otherwise, is repeated for each tooth 513 receiving an appliance according to the treatment plan. A combined model is shown in FIG. 17, with a crane body 602 arranged adjacent the occlusal surface 516 of each tooth 513 receiving an appliance 530. The methods of the present disclosure then proceed to creating the one or more coupling arms connecting each appliance 530 and the crane body 602. As noted above, the number and location(s) of the one or more coupling arms 620 are dictated primarily by the type, size, and orientation of the associated appliance 530.

Figure 21:
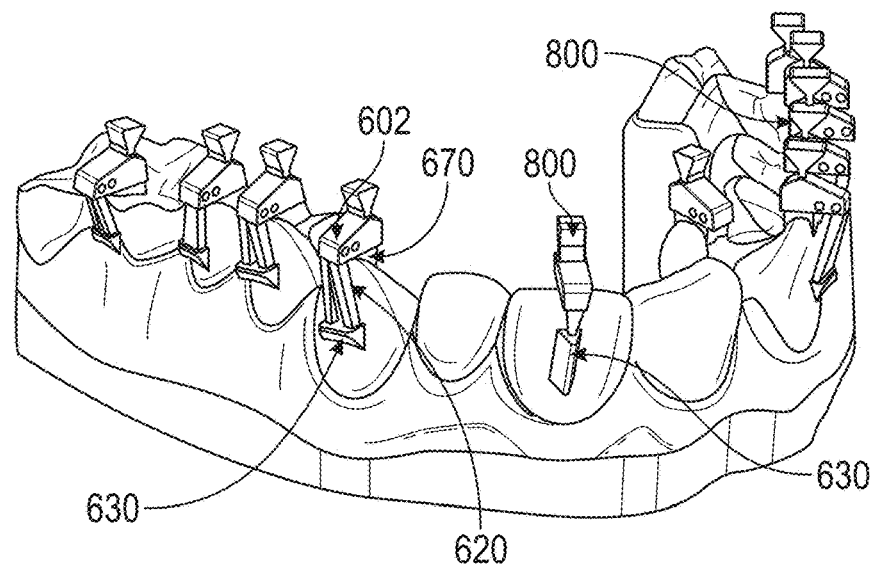
FIG. 21 is a perspective view of a virtual mockup having a set of carrier assemblies for orthodontic appliances according to embodiments of the disclosure.

Each coupling arm may be extruded in a generally occlusal-gingival direction between the connection points 526 and coupling region 611 (which may or may not be located on the facing surface 606). In presently preferred implementations, the coupling arms 620 are extruded from the connection points 526 in an occlusal-facial direction to the coupling region 611 on the facing surface 606. The coupling arms 620 generally retain the cross-sectional shape of connection points 526, if used, and may include a taper, each as noted above. Also as noted above, coupling arms 620 may be linear, arcuate along a single radius of curvature, include compound curvature, or include combinations of the same. Once each appliance 530 is attached via the requisite number of coupling arms 620 to the associated crane body 602, a complete virtual mockup 700 including finished carrier assemblies 800 is available for further manufacturing (see FIG. 21).

Figure 22:
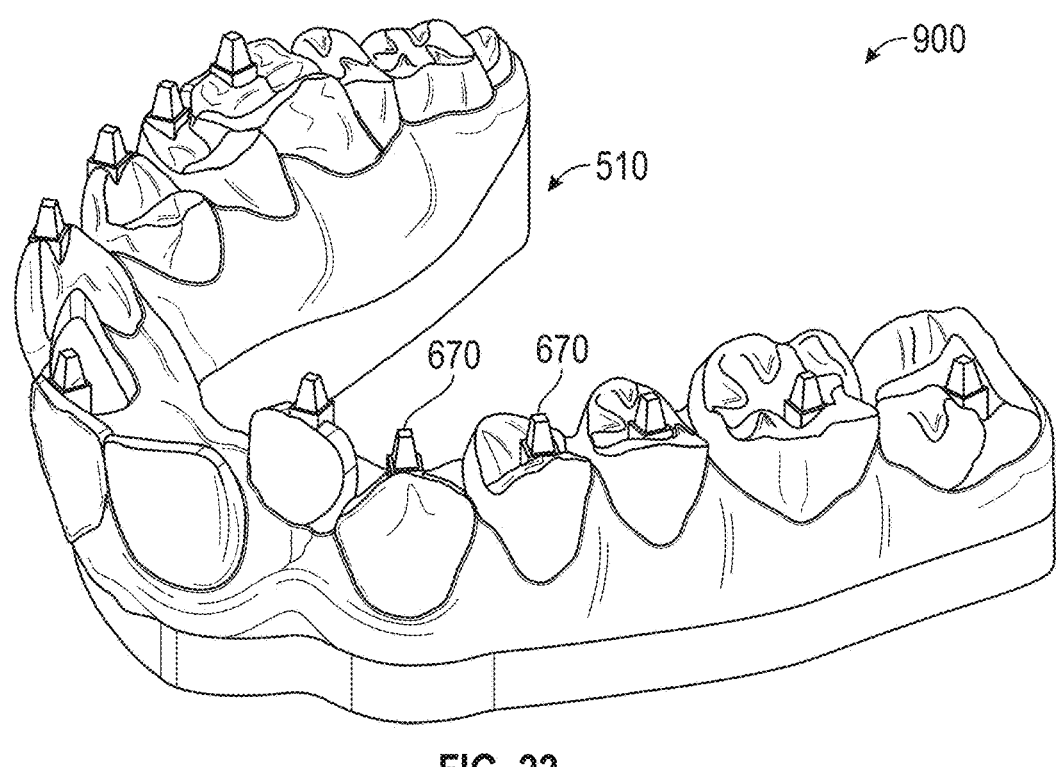
FIG. 22 is a perspective view of a virtual fixture model including a combined dental arch, mold body, and alignment pins.

With a complete virtual mockup 700 in place, the method proceeds to create at least two separate object models exportable for subsequent manufacturing: a) fixture model 900 comprising the combined alignment pins 670 and mold body 510 (See FIG. 22); and b) each carrier assembly 800 including the grouped appliance 630, coupling arms 620, and crane body 602. These components of the virtual mockup 700 are to be exported and fabricated separately, with the creation of the complete physical mockup 10 requiring the placement of each carrier assembly on the fixture model.

The fixture model 900 and carrier assembly 800 objects may each be provided by combining the virtual constituent elements, for example being merged or superimposed by computer aid. The virtual fixture model 900 and carrier assembly 800, can each be maintained in the form of a computer processable three-dimensional data file, may be transmitted to a fabrication machine which manufactures a physical representation thereof. Each carrier assembly 800 may be retained as a discrete object or may be joined at the grasping elements 650. The grasping elements 650 of all carrier assemblies on the mockup may be joined or carrier assemblies 800 may be joined in a single half arch, arch quadrant, or any other selected arch portion including two or more teeth. The joined carrier assemblies could aid in providing a planar build plate for additive manufacturing or in assembling the physical mockup.

In some examples, the fabrication of at least one of the fixture model and related carrier assemblies from the virtual mockup may include a 3D printing process. In presently preferred implementations, both the fixture model and carrier assemblies are created through 3D printing, with fixture model created from a first material and the carrier assemblies created through a second material. Suitable materials for each are described above.

Three-dimensional printing may include, for example, forming the carrier assembly or fixture model from a plurality of layers of a photopolymerizable material described herein by selectively curing the photopolymerizable material in a layer-by-layer manner. In some examples, an additive manufactured article may include a plurality of materials bonded to each other. The layers of the photopolymerizable material can be deposited according to an image of the three-dimensional article in a computer readable format. For example, the photopolymerizable material may be deposited according to preselected CAD parameters (e.g., a data file). In some examples, the photopolymerizable material is cured using actinic radiation, such as UV radiation, e-beam radiation, visible radiation, or combinations thereof.

Additionally, it is to be understood that methods of manufacturing a 3D article described herein can include stereolithography or vat polymerization. For example, the methods of the present disclosure may include retaining a photopolymerizable composition described herein in a fluid state in a container and selectively applying energy to the photopolymerizable composition in the container to solidify at least a portion of a fluid layer of the photopolymerizable composition, thereby forming a hardened layer that defines a cross-section of the 3D article. The methods also may include raising or lowering the hardened layer of photopolymerizable composition to provide a new or second fluid layer of unhardened photopolymerizable composition at the surface of the fluid in the container, followed by again selectively applying energy to the photopolymerizable composition in the container to solidify at least a portion of the new or second fluid layer of the photopolymerizable composition to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the photopolymerizable composition. Moreover, selectively applying energy to the photopolymerizable composition in the container can include applying actinic radiation, such as UV radiation, visible radiation, or e-beam radiation, having a sufficient energy to cure the photopolymerizable composition. The methods of creating the physical mockup also may include planarizing a new layer of fluid photopolymerizable composition provided by raising or lowering an elevator platform. Planarization can be carried out, for example, by utilizing a wiper or roller or a recoater. Planarization may correct the thickness of one or more layers prior to curing the material by evening the dispensed material to remove excess material and create a uniformly smooth exposed or flat up-facing surface on the support platform of the printer.

The foregoing techniques can be repeated a selected number of times to provide the 3D article. For example, in some cases, this process can be repeated "n" number of times. Further, it is to be understood that one or more steps of a method described herein, such as a step of selectively applying energy to a layer of photopolymerizable composition, can be carried out according to an image of the 3D article in a computer-readable format. Suitable printers include the Viper Pro SLA, available from 3D Systems, Rock Hill, South Carolina; the Asiga PICO PLUS 39, available from Asiga USA, Anaheim Hills, California; the D30, available from Rapid Shape, Heimsheim, Germany; and the Moonray, available from SprintRay, Los Angeles, California.

A related technology, vat polymerization with Digital Light Processing ("DLP"), also employs a container of curable polymer (e.g., photopolymerizable composition). However, in a DLP based system, a two-dimensional cross section is projected onto the curable material to cure the desired section of an entire plane transverse to the projected beam at one time. All such curable polymer systems as may be adapted to use with the photopolymerizable compositions described herein are intended to fall within the scope of the term "vat polymerization system" as used herein.

One or both of the carrier assemblies and fixture model may be created on a build platform of any suitable shape, though this can be more typical for the carrier assemblies. For example, the build platform may include a substantially planar plate, one or more elongate runners, or the like. Build platforms may also include frangible sprues which support mockup components fabricated on the build platform. For example, sprues may extend from the build platform to grasping element of the carrier assembly. In other examples, sprues may extend from the build platform to the crane body. Sprues, like coupling arms, are configured to break in response to a bending, twisting, compression, or tension. The build platform may include indicia identifying the physical mockup components thereon. The indicia may include text, symbols, coloring, or the like. For example, build the platform may be formed by the additive manufacturing techniques described herein to include text embossed on a surface of the build platform to indicate the patient or phase of treatment.

Other techniques for three-dimensional manufacturing, including but not limited to fused deposition modeling, selective laser sintering, and inkjet printing, may be suitably adapted to the methods described herein. More generally, three-dimensional fabrication techniques continue to become available and may be adapted to use with photopolymerizable compositions described herein, provided they offer compatible fabrication viscosities and resolutions for the specified article properties, for instance continuous additive manufacturing in which a build plate is (essentially) continuously moved through a vat of photopolymerizable material. In certain examples, an apparatus adapted to be used in a continuous mode may be employed, such as an apparatus commercially available from Carbon 3D, Inc. (Redwood City, CA), for instance as described in U.S. Pat. Nos. 9,205,601 and 9,360,757 (both to DeSimone et al.). For example, in any method described above, selective curing of a photopolymerizable material includes continuous photopolymerization of at least one of the first portion of the article or the second portion of the article.

After a three-dimensional article has been formed, it is typically removed from the additive manufacturing apparatus. At this stage, the three-dimensional article typically has sufficient green strength for handling in any remaining steps of the method. The article surface, as well as the bulk article itself, typically still retain uncured material, suggesting a need for further curing. Removing residual uncured photopolymerizable material is particularly useful when the article is going to subsequently be post-cured, to minimize uncured residual material from undesirably curing directly onto the article. A "cured" article can include a photopolymerizable material that has been at least partially polymerized and/or crosslinked. For instance, in some instances, an at least partially polymerized article is at least about 10% polymerized or crosslinked or at least about 30% polymerized or crosslinked. In some cases, an at least partially polymerized article is at least about 50%, at least about 70%, at least about 80%, or at least about 90% polymerized or crosslinked, for instance between about 10% and about 99% polymerized or crosslinked.

In some examples, removal of excess uncured photopolymerizable composition on the additive manufactured article is at least partially performed by washing with at least one solvent. Suitable solvents include, but are not limited to, propylene carbonate, isopropanol, methanol, di(ethylene glycol)ethyl ether, tripropylene glycol monomethyl ether, diethylene glycol monobutyl ether, a blend of dipropylene glycol monomethyl ether with [2-(2-methoxymethylethoxy) methylethoxy]propanol, and combinations thereof. In certain examples, the removal is performed at least partially by moving the additive manufactured article and thereby generating a mass inertial force in uncured photopolymerizable composition on the article, wherein the mass inertial force is generated using a centrifuge, a shaker, or a mixer that spins along one or more axes. Suitable ways of generating a mass inertial force are described, for instance, in International Publication No. 2020/157598 (Chakraborty et al.), incorporated herein by reference in its entirety. For instance, the source of the mass inertial force may be generated using a centrifuge, a shaker, or a mixer that spins along one or more axes. In some examples, the moving of the object is a rotation or spinning of the object. Accordingly, the mass inertial force may be generated by a centrifugal force. One suitable mixer that spins along more than one axis is a dual asymmetric centrifugal mixer, such as the DAC 400 FVZ available from Flacktek, Landrum, SC. A dual asymmetric centrifugal mixer provides simultaneous dual axis spinning that automatically reorients the article during spinning, which tends to pull uncured composition out of concave features of the article in a short period of time (e.g., 20, 15, or 10 seconds or less). Suitable cleaning solutions are also described in International Publication No. WO 2018/222395 (Jahns et al.)

The methods of the present disclosure also may include subjecting the additive manufactured article to actinic radiation, heat, or both to photopolymerize uncured photopolymerizable composition. Optionally, that can be followed by soaking the article with another solvent (e.g., diethylene glycol ethyl ether or ethanol). Exposure to actinic radiation can be accomplished with any convenient radiation source, generally UV radiation, visible radiation, and/or e-beam radiation, for a time ranging from about 10 seconds to over 60 minutes. Heating is generally carried out at a temperature in the range from about 35° C., to about 80° C., for a time ranging from about 10 to over 60 minutes in an inert atmosphere. In some examples, post-cure ovens, which combine UV radiation and thermal energy, may be used for post-cure processes. In some examples, post curing may improve the mechanical properties and stability of the three-dimensional article relative to the same three-dimensional article that is not post cured.

In some examples, the photopolymerizable material includes a ceramic material (e.g., ceramic particles and/or ceramic fibers), and the method further includes burning out polymerized material and sintering the additive manufactured article to form a ceramic article.

Regarding any method described above, the steps further optionally include polishing the additive manufactured article, to render at least a portion of a surface of the additive manufactured article smoother than prior to the polishing. Moreover, the methods may further include a treatment of the bonding surface 38 of one or more appliances 30 to improve surface roughness and mechanical retention. Such treatments may include etching, an organo-silane treatment, sandblasting, or any other known mechanical or chemical modification to enhance adhesive bonding between the base 38 and the bonding tooth. For sandblasting, treatment includes blasting the bonding surface with a silica-coated alumina sandblasting medium. A solution of silane (e.g., a silane in ethanol) can then be applied to the treated surface and allowed to dry at room temperature for at least 5 minutes. In the same or other implementations, the base may be bonded to compressible material to assist in filling gaps between the base and the tooth structure. Suitable compressible materials are described in U.S. Pat. No. 9,480,540 (Cinader).

Creating a Transfer Apparatus from an Assembled Physical Mockup

Figure 23:
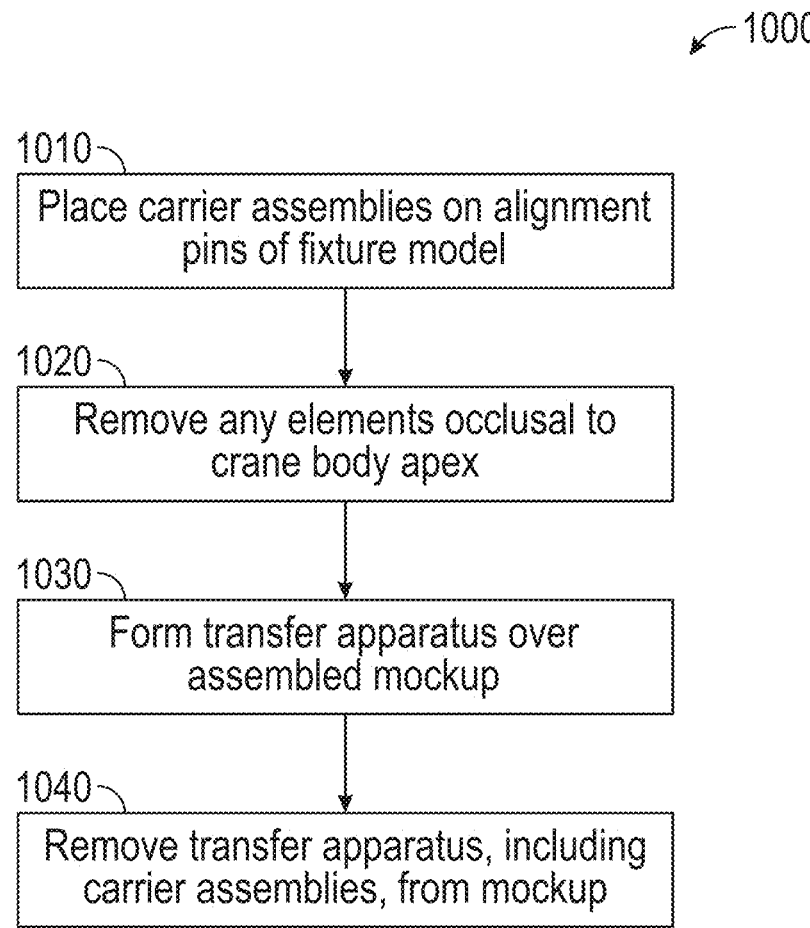
FIG. 23 is a workflow for assembling a physical mockup including carrier assemblies of the present disclosure.

A method (1000) for creating the transfer apparatus is outlined in FIG. 23. Once the components are fabricated and post-processed as desired, the methods move on to the joining of the fixture model and carrier assemblies to create the physical mockup 10 (Step 1010). This step may optionally include the deposition of a release agent on the fixture model. Suitable release agents include silicone fluids, PVA, sprays, and wax emulsions. Once the physical mockup is created, any grasping elements or joining elements occlusal to the crane body apex are removed from the carrier assemblies (Step 1020). With the grasping elements removed and the carrier assemblies discrete, a transfer apparatus may then be formed over at least a portion of the mockup (Step 1030). Once the apparatus has formed (e.g., hardened), the transfer apparatus is removed from the fixture model. along with each carrier assembly (step 1040). Advantageously, the removal may occur in a vertical direction, casing separation of the transfer apparatus from the fixture model.

Each carrier assembly (100, 300, 1300) is placed on an alignment pin (200, 1400) such that the receptable (130, 330, 1430) engages the /protrusion (210, 1310). The assembly (100, 300, 1300) is forced in a gingival direction until the facing surface engages the shoulder prior to contact with the occlusal surface of the bonding tooth. The carrier assemblies may be arranged one by one or joined and arranged in one or more groupings. Carrier assemblies may be placed manually by a technician using e.g., indicia on the carrier assembly and/or fixture, or according to guidelines specifying the location of a given carrier assembly based on e.g., appliance geometry or crane body geometry. For example, a clinician or technician may use a tool such as a tweezer, a retaining ring pliers, or other suitable tool to engage the crane body to arrange the carrier assembly on the fixture model. As an alternative to manual placement of carrier assemblies, a computer controlled robotic arm (e.g., a pick and place robot) may be used to grasp each appliance in sequence and place it on the associated tooth. For example, information regarding the placement of the combined crane assembly can be used in a set of instructions to control movement of the robotic arm such that the carrier assembly is placed on the corresponding, selected location of the fixture model.

Once any or all carrier assemblies are satisfactorily placed, any elements of the carrier assembly occlusal to the apex of the crane body are removed and optionally discarded (Step 1020). Elements, such as the grasping element can be removed at e.g., the frangible section. Removal of these elements allows an apparatus to be formed with a reduced height above the tooth surface, potentially improving patient comfort and reducing the amount of material necessary to form the apparatus. With each carrier assembly placed on the associated alignment pin, each appliance is predictably located at its intended bonding position and orientation on the bonding tooth surface.

If the physical mockup (i.e., joined carrier assemblies and fixture model) is generated to satisfaction, a transfer apparatus may be created over said mockup (Step 1030). This may include sending instructions to a pressure forming or thermoforming machine to cause one or more sheets of material to be pressure formed or thermoformed over the physical mockup to form a negative replica or shell. The sheet may be, for example, a sheet of deformable plastic (e.g., an elastic thermoplastic). The sheet of material may be heated to a temperature at which the sheet becomes pliable. Pressure may concurrently be applied to the sheet to form sheet around the mockup. Once the sheet cools, it will have a shape that conforms to the mockup. An interior shape of the plastic shell substantially conforms to the patient's current dental arch. A release agent can be applied to the mockup before forming the plastic shell to facilitate later removal of the mold from the plastic shell. The shell can be trimmed by laser or mechanical milling techniques to remove excess or unwanted material.

One exemplary method of making a transfer apparatus in the form of a tray includes the use of multiple sheet materials as described in U.S. Pat. No. 10,368,961 (Pachl et al.). The method includes placing elastic sheeting on top of the occlusal side of the teeth represented by the physical mockup, with a plastic sheeting arranged on top of the elastic sheeting. The elastic sheeting and the plastic sheeting are deformed in directions toward the physical mockup. This may be achieved by a vacuum generated beneath the elastic and plastic sheeting or a pressure above the elastic and plastic sheeting. At least the plastic sheeting maybe heated before and/or during the deformation. The plastic sheeting is typically allowed to solidify by cooling so as to provide it with a sufficient rigidity for handling.

The method can, in other embodiments, optionally include placing an elastomeric spacer over the physical mockup and thermoforming the hard layer of a transfer apparatus (such as, for example, PETG) over the mockup. The spacer material can be any one of a number of materials including dental putty, a thermoset material, thermoplastics (including nylons), a thermoplastic elastomer, and composites (e.g., glass-filled nylons). Further details regarding the spacer may be found in U.S. Pat. No. 7,762,815 (Cinader et al.)

Optionally, the transfer apparatus may be created having an occlusal stop member, also as described in U.S. Pat. No. 7,762,815. An occlusal stop member typically includes a flat top surface and a bottom surface with shapes such as recesses that match the shapes of the occlusal tips of the patient's dental arch. In certain implementations, the occlusal stop member has a recess or recesses corresponding to only some of the teeth in the dental arch, although it is also possible to construct an occlusal stop member that has one or more recesses corresponding to each tooth of the dental arch. Other variations are also possible. For example, the occlusal stop member may extend only along a portion of the dental arch instead of along the entire dental arch. A plurality of stop members may be provided, potentially spaced apart from each other and optionally connected. The occlusal stop member may be chemically or mechanically bonded to the plastic sheeting and/or the hardenable material.

It should be appreciated that the transfer tray may be formed only of one or more layers of deformable plastic sheeting, without an accompanying elastic sheeting or soft positioning layer. In such implementations, the plastic sheeting may be disposed directly proximate the occlusal surface of the physical mockup, without the spacing provided by elastic sheeting. The plastic sheeting accordingly directly embraces the teeth and carrier assemblies of the physical mockup upon deformation, directly creating receptacles used to removably retain carrier assemblies for subsequent bonding. In such streamlined transfer apparatus embodiments, the physical mockup may be coated with a release agent to assist in removal of the transfer tray from the mockup. Pursuant to typical methods used to create the transfer apparatus, the resulting tray represents a negative replica of at least a portion of the physical mockup.

Suitable materials for creating a thermoformed transfer apparatus are well known in the art and the selection of material is accordingly not critical. In exemplary implementations, the transfer apparatus is formed from COPYPLAST low density polyethylene, available from Scheu Dental Group, Iserlohn, Germany. Use of transparent materials for the component layers may facilitate confirmation of proper placement of the transfer apparatus and associated appliances on the teeth.

Alternatively, the transfer apparatus may comprise a dental impression material or a bite registration material. A dental impression material can be based on different chemical substances and crosslinked by various chemical reactions (including addition curing and condensation curing materials). Dental impression materials can be classified according to their curing mechanism (e.g., addition curing or condensation curing). Dental impression materials can also be classified according to their consistency. Besides low viscous dental impression materials, there exists highly viscous. so-called putty like dental impression materials. Examples of dental impression material include materials based on alginate(s), hydrocolloids, polysulfides, polyether technology, addition curable silicone materials (e.g., VPS materials) and condensation curable silicone materials. Dental impression materials are typically provided as two component systems that consist of a base paste and a catalyst paste and which are mixed prior to their application. The mixed pastes are typically applied with the help of syringe-type device.

Dental impression materials are typically characterized by at least one, more or all of the following features: Consistency (according to ISO 4823); comparable low viscosity behavior (consistency 3), a medium viscosity (consistency 1 or 2) or putty-like, highly viscous behavior (consistency 0); Setting time: within about 15 min after mixing at ambient conditions (e.g., 23° C.): Shore A hardness (according to ISO 4823; 24 h): at least about 20 or at least about 40; Tensile strength (according to DIN 53504): at least about 0.2 MPa or at least about 3.0 MPa; Elongation at break (according to DIN 53504): at least about 30% or at least about 150% or at least about 200%; Recovery from deformation (according to ISO 4823); at least about 90% or at least about 95% or at least about 98%. Suitable dental impression materials are also described in EP2072029 (Bissinger et al), U.S. Pat. No. 6,677,393 (Zech et al), EP1512724 (Zech et al), U.S. Pat. No. 6,127,449 (Lechner et al), U.S. Pat. No. 8,007,579 (Klettke et al.) and U.S. Pat. No. 5,569,691 (Guggenberger et al). Suitable dental impression materials are commercially available, e.g., from 3M ESPE under the brands IMP-REGUM or IMPRINT, as well as myriad other suppliers and brands.

After the transfer apparatus has cured or otherwise solidified, the apparatus is removed from the fixture model (Step 1040). The carrier assemblies are retained in the apparatus by virtue of at least intimate contact between the transfer apparatus material and the crane body. As noted above, this contact may be enhanced by retention features on the surfaces of the crane body. Due to the orientation of alignment pins on the fixture model, the transfer apparatus can be separated in a substantially vertical direction, potentially along the vertical axis V of the fixture model. The shell can be trimmed by laser or mechanical milling techniques to remove excess or unwanted material before or after removal.

Figure 24:
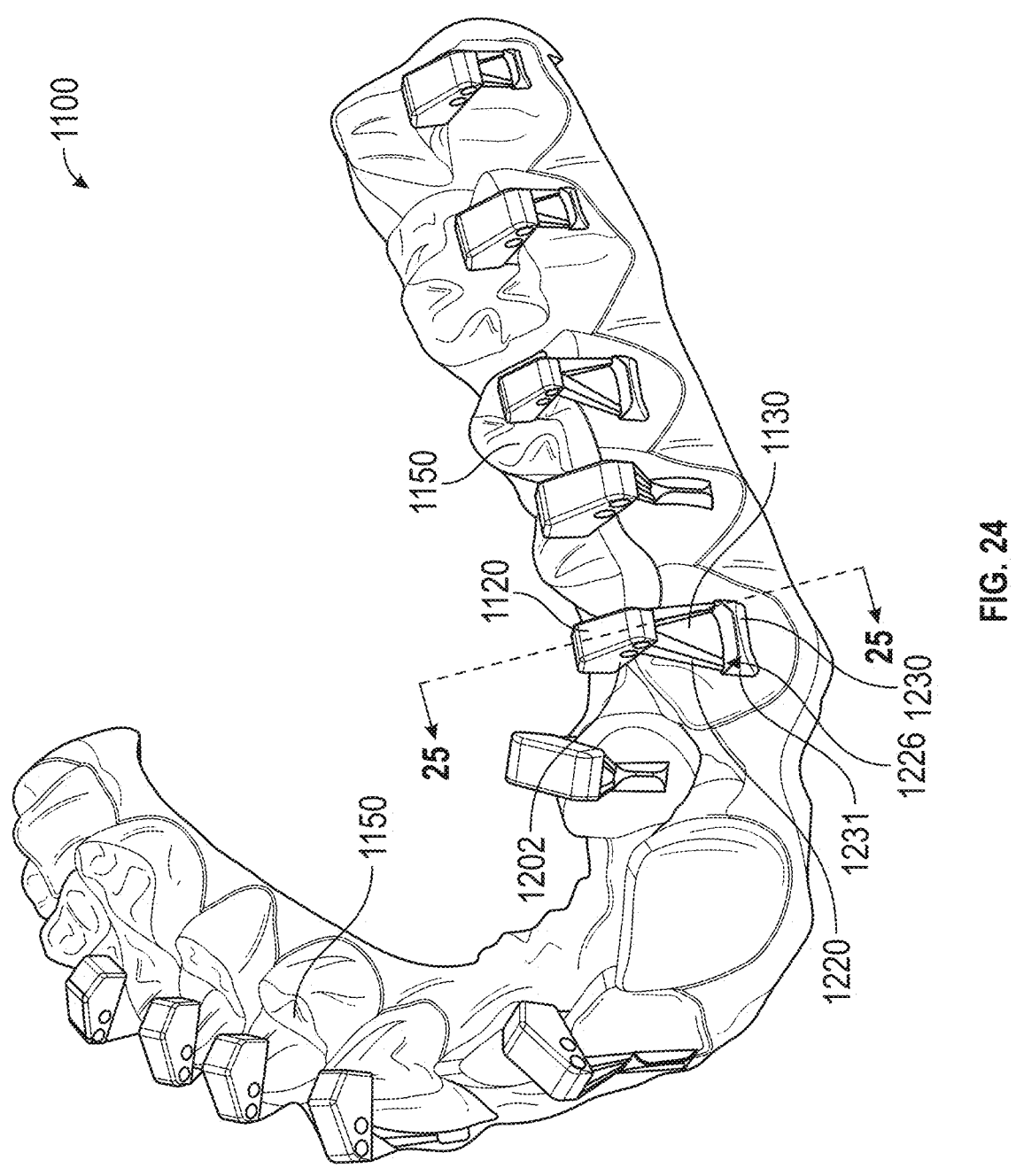
FIG. 24 is a perspective view of transfer tray created from a physical mockup of the present disclosure.
Figure 25:
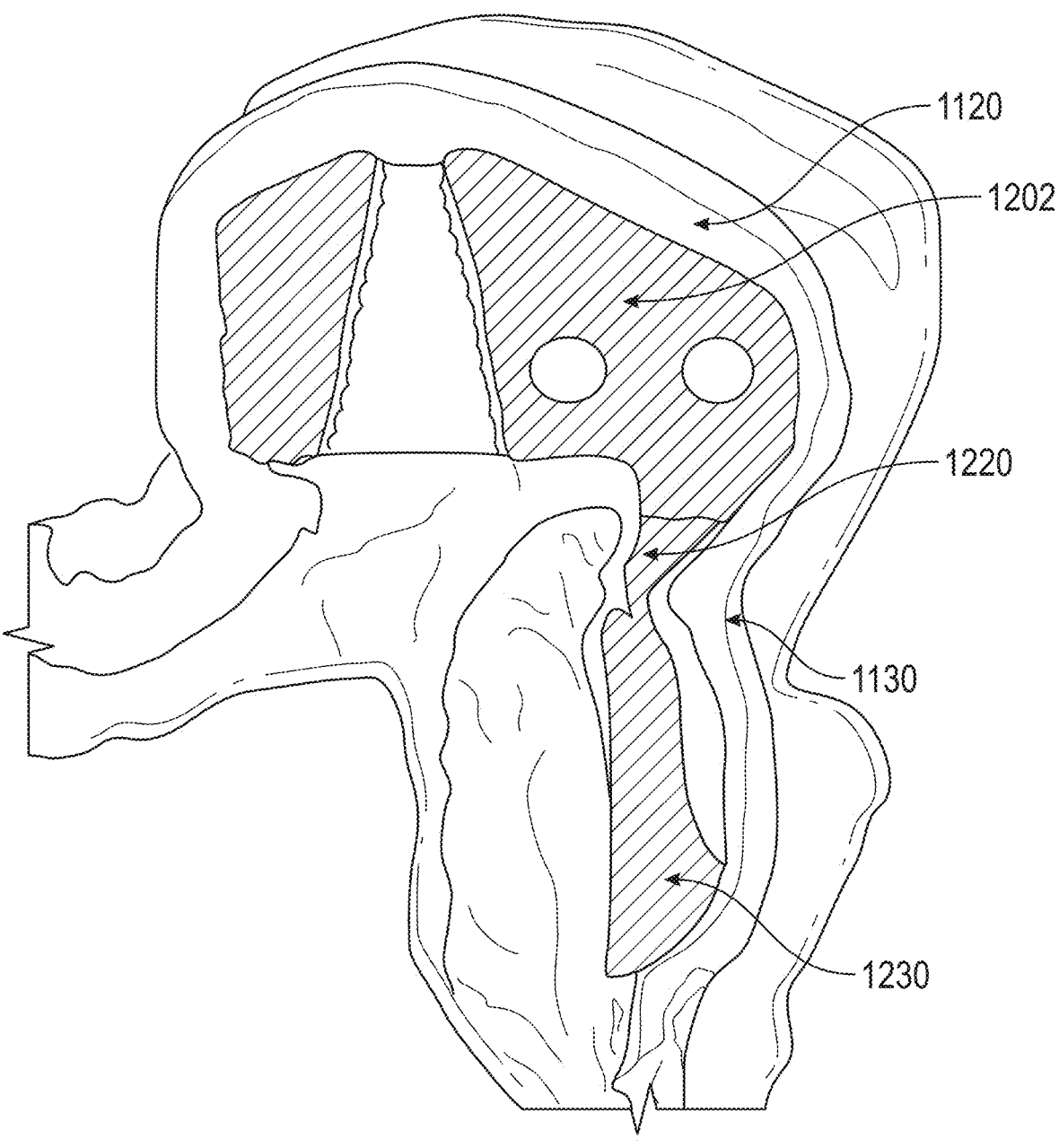
FIG. 25 is a cross-sectional view of the transfer tray of FIG. 24.

FIGS. 24-25 depict a finished transfer apparatus 1100. The formed transfer apparatus 1100 (here, a U-shaped tray)

substantially matches the teeth of the physical mockup. The apparatus includes a series of recesses comprising occlusal receptacles (represented by receptacles 1120) that substantially correspond to exterior surfaces of the crane body 1202 and channels (represented by channel 1130) that substantially correspond to exterior surfaces of the coupling arms 1220 and appliance 1230 (which can reflect any of carrier assemblies 100, 300, 1300). The occlusal receptacle and channel may be in fluid communication within recesses, but this is not strictly necessary. The inner wall sections will typically have contours that match the contours of the individual teeth of the patient, as well as an overall configuration that matches the orientation of each tooth relative to other teeth in the same dental arch. The inner wall sections will contact the labial, occlusal and lingual surfaces of the teeth when seated on the dental arch, though other construction may omit the surfaces that do not include receptacles and/or channels 1120, 1130.

The body of the transfer apparatus 1100 defines a plurality of shells 1150 (shells 1150). Each respective shell of shells 1150 is configured to receive an outer surface of a respective tooth. In this way, the transfer tray is configured to align with the dentition of a patient. Each shell of shells 1150 that aligns with a bonding tooth is configured to include a respective occlusal receptable 1120 and channel 1130 within shells 1150 that are collectively shaped to envelop at least a portion of the respective carrier assembly 1200.

The channels 1130 may have any suitable cross-sectional shape or combination of shapes (e.g., trapezoidal, dome-shaped, etc.). Each channel 1130 in the transfer apparatus may each have the same or different cross-sectional shape. In other embodiments, certain groups of channels 1130 may include the same cross-sectional shape amongst one another in the group, and have a different cross-sectional shape from the cross-sectional shape of a group situated in a different quadrant or location on the transfer apparatus 1100. In presently preferred circumstances, the apparatus lacks any interior surfaces in the channel 1130 disposed between the one or more coupling arms 1220 on the associated carrier assembly 1200 and the bonding tooth surface; this configuration may aid in the separation of the appliance 1230 from the transfer tray 1100.

A transfer apparatus need not extend over the surfaces of the coupling arms or the appliances. For instance, a recess may include an occlusal receptacle covering the crane body 1202 and a channel 1130 having a reduced length extending over a limited portion of coupling arms 1220. The connections 1226 and appliance 1230 remains exposed. Alternatively or additionally, a recess may include only an occlusal receptacle, with the coupling arms and appliance 1230 exposed. Furthermore, an occlusal receptacle need not encompass or envelop all surfaces of the crane body 1202. An apparatus may include a combination of such exposed appliances, partially exposed appliances, and appliances received in channels. Leaving the appliance 1230 at least partially exposed may, in certain implementations, case the separation of the appliance 1230 from the crane body 1202 when the appliance 1230 is adequately bonded to the bonding tooth.

Additionally, the transfer apparatus may be used for bonding only a single appliance to a patient's tooth. For example, a portion of the transfer apparatus described above may be used to bond a single appliance to a single tooth subsequent to the time that other appliances are bonded, such as in instances where access to the tooth is initially hindered by other teeth. As another example, a portion of the transfer apparatus described above may be used to re-bond one or more appliances that have unintentionally debonded from the tooth, or to bond a new appliance to a tooth to replace the original appliance.

Figure 35A:
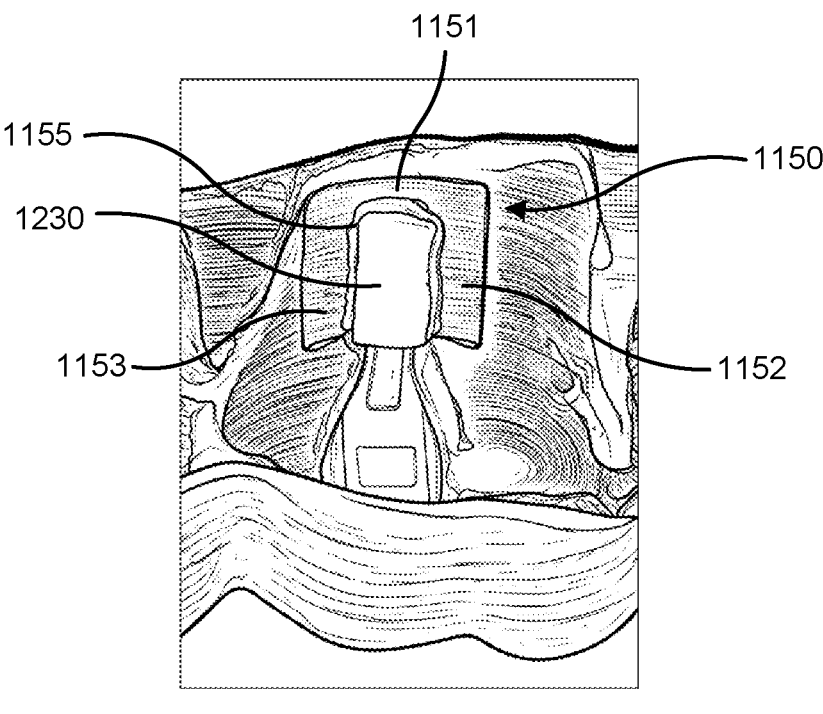
FIG. 35A is a view of the interior of a transfer tray created from a physical mockup of the FIG. 32, looking towards the occlusal and facial surfaces.
Figure 35B:
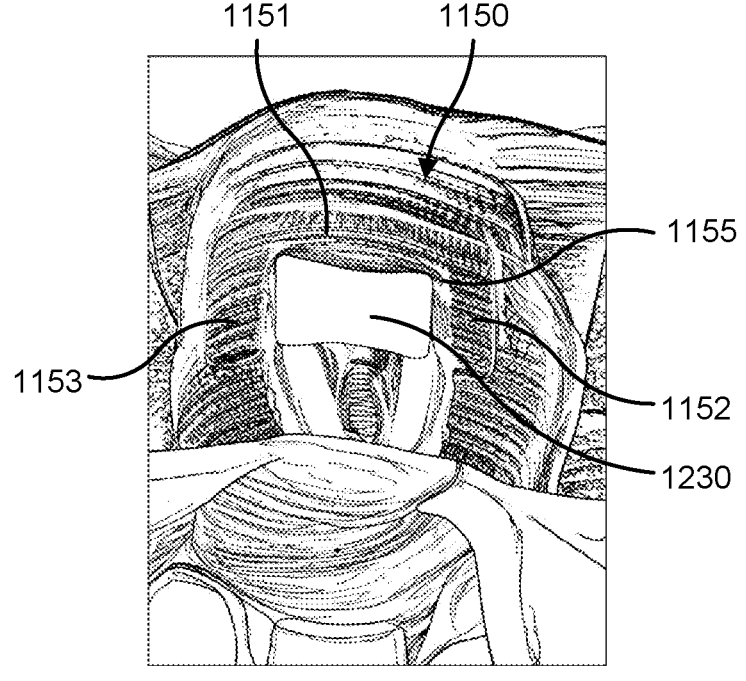
FIG. 35B is a view of the interior of a transfer tray created from a physical mockup of the FIG. 32, looking towards the occlusal and facial surfaces.

For transfer apparatuses created from a physical mockup 10 including one or more capillary inhibition walls 70 (as in FIGS. 32-34), the resulting shells (shown in FIGS. 35A and 35B) will also include anti-wicking channels 1150 that substantially correspond to the exterior surfaces of the wall 70 and surround the gingival, and at least portions of the mesial and distal edges of the appliance 1230. The channel 1150 is separated from the appliance 1230 by a thin wall section 1155 having dimensions commensurate with the gap 78.

The channel 1150 includes channel section 1151 corresponding to the base 71 and sections 1152, 1153 corresponding to the legs 72, 73 of the wall 70. These channel sections are typically in fluid communication. Each channel 1150 has a depth measured from bottom of the channel to the interior surface, and the depth is generally less than height of the appliance 1230 along a similar reference direction. Wall section 1155 and channel 1150 cooperate to ensure more (i.e., bonding agent) remains near the appliance by interrupting the capillary action that is likely to transport bonding agent away from the appliance. Increasing the amount of adhesive near the attachment increases the radius of the fillet between the appliance and the tooth, which tends to increase the shear bond strength between the appliance and the tooth surface. Moreover, keeping the adhesive near the appliance tends to increase the likelihood any gaps between the bonding base and the tooth will be filled with adhesive, leading to an improved first and lasting bond.

Adhesive may be applied to bonding surface of the appliances 1230 prior to seating on the patient's dental arch. In some examples, dental adhesive used may include a light-cure adhesive, a chemical cure adhesive, a dual cure adhesive, 3M RELYX Ultimate Adhesive Resin Cement, SCOTCHBOND Universal Adhesive, TRANSBOND XT Primer, TRANSBOND MIP Primer, or APC FLASH-FREE adhesive, all available from 3M Company (St. Paul, Minnesota), or the like. The adhesive may be selected for compatibility with the material used to fabricate the appliance to securely bond attachments onto teeth. After application of adhesive to bonding surfaces, transfer apparatus 1100 may be positioned on the teeth of a patient.

A clinician or any other treating professional may first position transfer apparatus 1100 on dentition. Then, in examples in which the dental adhesive includes a light cure adhesive, the clinician may direct a selected wavelength of radiation, e.g., actinic radiation, toward one or more of appliances 1230 to cause a light-activating resin to set, thereby bonding appliance 1230 to the bonding tooth surface. In other examples, the clinician may use an activator or other means to initiate curing of the adhesive immediately before positioning transfer apparatus 1100 on the arch or while transfer apparatus 1100 is positioned on the arch. The teeth may optionally be etched or primed before the transfer tray is seated on the arch.

Once the adhesive is suitably cured, each appliance 1230 may be separated from the associated crane body 1202, preferably proximate connection points on the appliance body. The apparatus is removed from the arch and patient's mouth. The treating professional may then remove any undesired vestiges of the coupling arms.

Kits and assemblies of the appliance described are also contemplated herein. For example, one or more of the attachments described herein may be pre-coated with a suitable orthodontic adhesive and packaged in a container or a series of containers, as described for example in U.S. Pat. No. 4,978,007 (Jacobs et al.); 5,015,180 (Randklev); 5,429,229 (Chester et al.); and 6,183,249 (Brennan, et al.), and U.S. Patent Publication No. 2008/0286710 (Cinader et al.).

Various techniques of this disclosure may be implemented in a wide variety of computer devices, such as servers (including the Cloud), laptop computers, desktop computers, notebook computers, tablet computers, hand-held computers, smart phones, and the like. Any components, modules or units have been described to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a non-transitory computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disk (CD), digital versatile disk (DVD), Blu-ray disk, holographic data storage media, or other non-volatile storage device. The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

The patents, patent documents, and patent applications cited herein are incorporated by reference in their entirety as if each were individually incorporated by reference. Although specific embodiments of the present disclosure have been shown and described herein, it is understood that these embodiments are merely illustrative of the many possible specific arrangements that can be devised in application of the principles of the present disclosure. Numerous and varied other arrangements can be devised in accordance with these principles by those of ordinary skill in the art without departing from the spirit and scope of the present disclosure. Thus, the scope of the present disclosure should not be limited to the structures described in this application, but only by the structures described by the language of the claims and the equivalents of those structures.

What is claimed is:

1. A system for indirect bonding of orthodontic appliances, the system comprising:

a transfer body defining a shell configured to receive an outer surface of a tooth of a dental arch and including an interior surface substantially conforming to the contour of at least one tooth of the dental arch, wherein the transfer body defines at least one recess having a receptacle within the shell; and at least one orthodontic appliance carrier arranged relative to the occlusal surface of the tooth and at least partially received in the receptacle, the carrier comprising:

a crane including a crane body having a tooth-facing surface, the facing surface configured to be arranged facing and spaced apart from an occlusal surface of the tooth when the transfer body is installed on the dental arch, the orthodontic appliance, the appliance including a base for bonding the appliance to the tooth and a body including a perimeter; and one or more coupling arms configured to connect the crane body to the appliance, wherein the coupling arms are frangible between the crane and the appliance.

2. The system of claim 1, wherein the transfer body defines a plurality of shells, each respective shell of the plurality of shells configured to receive a respective tooth of a plurality of teeth, and wherein the at least one orthodontic appliance carrier comprises a plurality of orthodontic appliance carriers, each carrier arranged in one of the plurality of shells.

3. The system of claim 1, wherein each recess receives at least the crane body.

4. The system of claim 1, wherein the crane body further includes opposing side surfaces and at least one canted surface opposed to the tooth facing surface.

5. The system of claim 4, wherein the interior surface of the receptacle is in contact with at least the at least one canted surface of the crane body.

6. The system of claim 4, wherein the interior surface of the receptacle is in contact with the at least one canted surface and at least one of the side surfaces.

7. The system of claim 1, wherein the facing surface includes a coupling region from which the coupling arms project, and wherein the coupling region is located in a labial or lingual direction from the tooth when the transfer body is seated on the dental arch.

8. The system of claim 7, and further including a channel formed in the transfer body and dimensioned to receive and substantially surround the one or more coupling arms and at least a portion of the appliance.

9. The system of claim 7, wherein the one or more coupling arms are configured to project from the facing surface in a direction back towards the tooth surface when the transfer body is seated on the dental arch.

10. The system of claim 1, wherein the appliance body has a shape of an orthodontic attachment configured to transfer a force from a clear tray aligner to the tooth.

11. The system of claim 1, wherein the appliance is an orthodontic bracket.

12. The system of claim 1, wherein the transfer body includes a thermoformed material or an impression material.

13. The system of claim 1, wherein the facing surface includes a coupling region from which the coupling arms project, wherein the coupling region projects outward in a labial direction, and wherein the appliance is configured to be bonded to a labial surface of the tooth.

14. The system of claim 1, wherein the shell includes a channel at least partially surrounding gingival, mesial, and distal edges of the appliance, wherein the channel is separated from the base of the appliance by a wall section of the transfer body.

15. A physical mockup for creating a transfer apparatus, the mockup comprising:

a representation of at least a portion of a dental arch, the dental arch including a plurality of teeth, each tooth including an occlusal surface, a lingual surface, and a labial surface;

wherein one or more teeth include an alignment pin projecting upward from the occlusal surface;

an appliance carrier on each alignment pin of the one or more alignment pins, the appliance carrier comprising:

a crane including a crane body having a tooth-facing surface, the facing surface configured to be arranged above but configured to not contact the occlusal surface of the tooth, the orthodontic appliance, the appliance including a base for bonding the appliance to the tooth and a body including a perimeter; and one or more coupling arms configured to connect the crane to the appliance, wherein the coupling arms are frangible between the crane and the appliance.

16. The mockup of claim 15, wherein the mockup includes a first and a second alignment pin, each alignment pin including a head having a shape, and wherein the dimensions of the cross-sectional shape are substantially the same for each of the alignment pins.

17. The mockup of claim 15, wherein each alignment pin includes head having a shape, wherein the shape or dimensions of the first alignment pin head is different than the shape or dimensions of the second alignment pin head.

18. The mockup of claim 15, wherein at least one alignment pin includes a shoulder adjacent the occlusal surface of the tooth, the shoulder resulting in a substantially planar occlusal surface at a base of the alignment pin.

19. The mockup of claim 15, wherein the proximal region of the carrier includes a recess configured for receipt of the alignment pin, the recess including a shape complemental to the alignment pin and inhibiting rotation of the carrier about a long axis of the pin.

20. A method for creating a transfer tray for one or more orthodontic appliances, the method comprising:

providing a physical mockup comprising: a representation of at least a portion of a dental arch, the dental arch including a plurality of teeth, each tooth including an occlusal surface, a lingual surface, and a labial surface;

wherein one or more teeth include an alignment pin projecting upward from the occlusal surface;

installing, for each tooth including an alignment pin, an appliance carrier on the alignment pin, the carrier comprising:

a crane including a crane body having a tooth-facing surface, the facing surface configured to be arranged above but not contact an occlusal surface of the tooth when the transfer body is installed on the dental arch, the orthodontic appliance, the appliance including a base for bonding the appliance to the tooth and a body including a perimeter;

one or more coupling arms configured to connect the crane to the appliance, wherein the coupling arms are frangible between the crane and the appliance; and forming a tray over the mockup and the carrier.

* * * * *